US010049605B2

(12) United States Patent
Funami et al.

(10) Patent No.: US 10,049,605 B2
(45) Date of Patent: Aug. 14, 2018

(54) DISPLAY APPARATUS, DISPLAY CONTROL METHOD, AND DISPLAY SYSTEM

(71) Applicants: Atsushi Funami, Tokyo (JP); Nobuyuki Kishi, Tokyo (JP)

(72) Inventors: Atsushi Funami, Tokyo (JP); Nobuyuki Kishi, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/705,366

(22) Filed: Sep. 15, 2017

(65) Prior Publication Data

US 2018/0005555 A1    Jan. 4, 2018

Related U.S. Application Data

(63) Continuation of application No. PCT/JP2016/057043, filed on Mar. 7, 2016.

(30) Foreign Application Priority Data

Mar. 20, 2015    (JP) .................................. 2015-058418

(51) Int. Cl.
*G09G 3/00*    (2006.01)
*G06T 7/70*    (2017.01)
(Continued)

(52) U.S. Cl.
CPC .............. *G09G 3/003* (2013.01); *G06T 7/254* (2017.01); *G06T 7/70* (2017.01); *G06F 3/017* (2013.01);
(Continued)

(58) Field of Classification Search
CPC ...................................................... G06T 19/00
(Continued)

(56) References Cited

U.S. PATENT DOCUMENTS 5,854,634 A  * 12/1998  Kroitor .................... G06T 13/00
                                                                    345/473
2009/0175496 A1 *  7/2009  Kondo ...................... G06K 9/32
                                                                    382/103
(Continued)

FOREIGN PATENT DOCUMENTS

JP          2006-185224         7/2006
JP            4161325           8/2008
(Continued)

OTHER PUBLICATIONS

International Search Report dated Apr. 12, 2016 in PCT/JP2016/057043 filed on Mar. 7, 2016.
(Continued)

*Primary Examiner* — Paulos M Natnael
(74) *Attorney, Agent, or Firm* — Harness, Dickey & Pierce, P.L.C.

(57) ABSTRACT

A display apparatus includes an image acquisition unit, an image extraction unit, a registration unit, a display control unit, a coordinate generation unit, and a motion detection unit. The coordinate generation unit generates, based on a detection result of a detection unit configured to detect the position of an object in a three-dimensional space, coordinates of the object in a screen. The motion detection unit detects a motion of the object based the coordinates in the screen generated by the coordinate generation unit. The display control unit displays a first image on the screen. When the motion is detected by the motion detection unit, the display control unit further displays a second image on the screen based on coordinates corresponding to the detected motion, and changes the display of the first image.

11 Claims, 41 Drawing Sheets

(51) Int. Cl.
  *G06T 7/254* (2017.01)
  *G06F 3/01* (2006.01)
  *G06T 13/40* (2011.01)

(52) U.S. Cl.
  CPC .......... *G06T 13/40* (2013.01); *G09G 2354/00* (2013.01)

(58) Field of Classification Search
  USPC ........................................................ 348/745
  See application file for complete search history.

(56) References Cited

U.S. PATENT DOCUMENTS

| | | | | |
|---|---|---|---|---|
| 2012/0094773 | A1* | 4/2012 | Suzuki | A63F 13/655 463/43 |
| 2014/0123081 | A1* | 5/2014 | Park | G06F 21/36 715/863 |
| 2018/0005555 | A1* | 1/2018 | Funami | G09G 3/003 |
| 2018/0047209 | A1* | 2/2018 | Funami | G06T 19/00 |

FOREIGN PATENT DOCUMENTS

| | | |
|---|---|---|
| JP | 2009-087026 | 4/2009 |
| JP | 2014-128692 | 7/2014 |

OTHER PUBLICATIONS

Higashiyama Zoo & Botanical Gardens, Feed Pitcher for polar bears, [online], May 9, 2014, retrieval date on Mar. 31, 2016, Internet:, URL:http://www.higashiyama.city.nagoya.jp/17_blog/index.php?ID=3093.

Newb: The People's Nerd: "Newb Plays: Sims 4 (48 hour Demo Play)," youtube, p. 1, Jan. 24, 2015.

Wang, M., "Eye of Judgement PS3 Video Review," youtube, p. 1, Oct. 13, 2007.

Extended European Search Report dated Mar. 21, 2018.

* cited by examiner

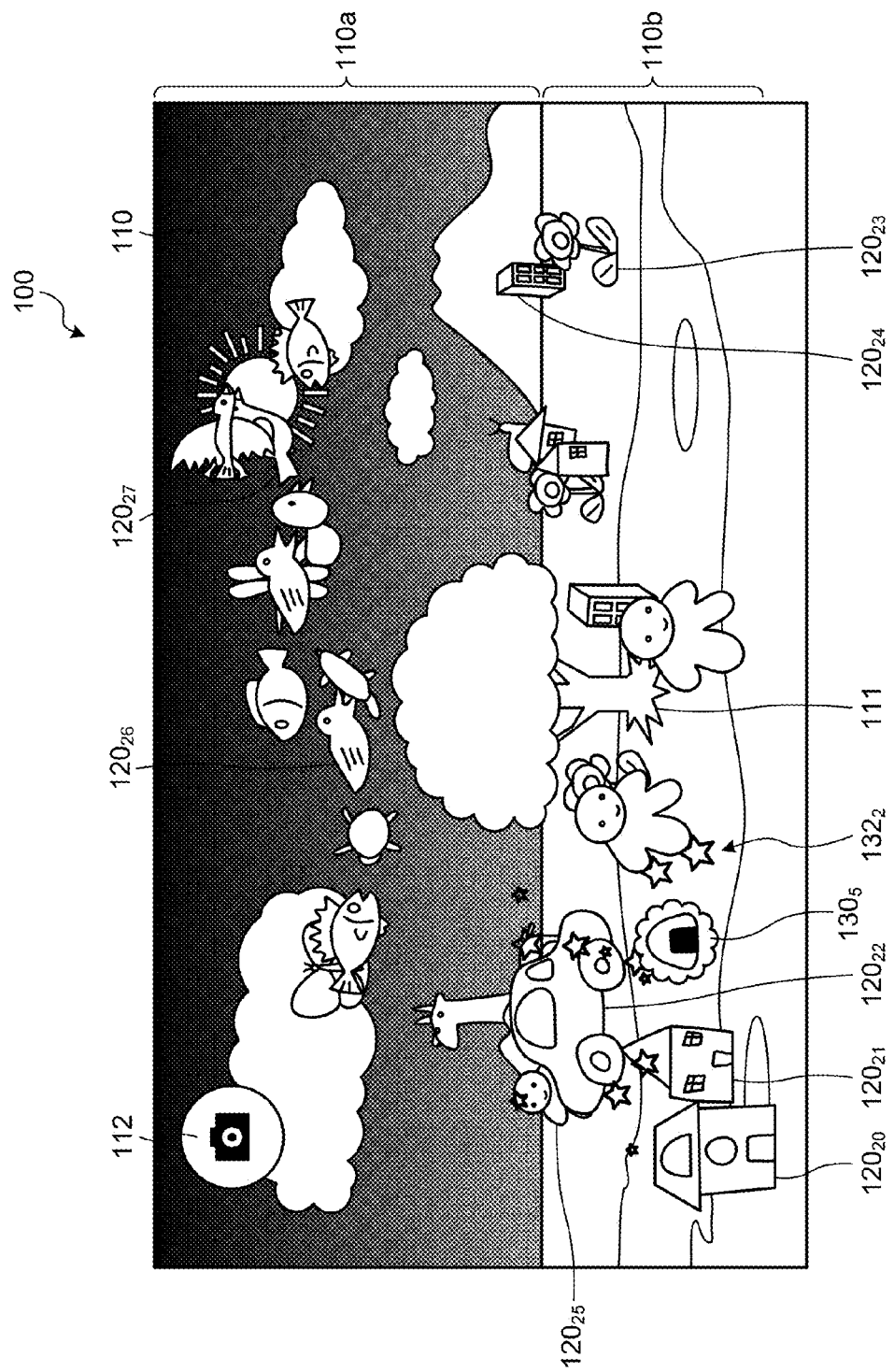

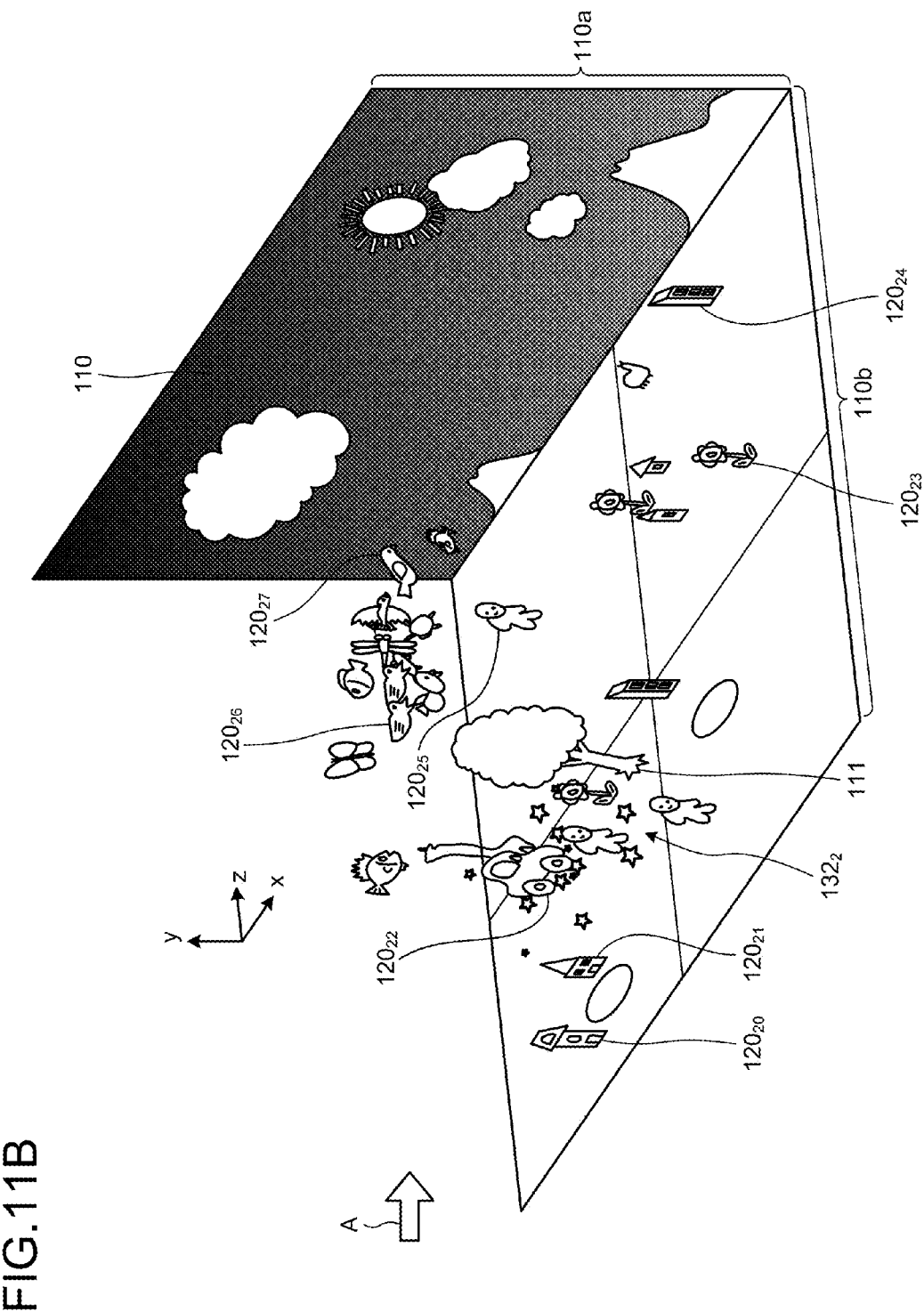

FIG.21

| IDENTIFICATION INFORMATION | IMAGE DATA | ATTRIBUTE INFORMATION |
|---|---|---|
| A001 | abc001 | Type#1 |
| | abc002 | Type#1 |
| | def001 | Type#2 |
| | xyz001 | Type#3 |
| B021 | cde010 | Type#4 |
| | fgh020 | Type#3 |
| | ijk021 | Type#4 |

| ATTRIBUTE | ARRANGEMENT REGION | MOVEMENT SPEED |
|---|---|---|
| Type#1 | WALK | REGION b | LOW |
| Type#2 | GO FORWARD | REGION b | HIGH |
| Type#3 | FLY | REGION a | MIDDLE |
| Type#4 | PLANT | REGION b | NOT MOVE |
| Type#5 | BUILDING | REGION b | NOT MOVE |
| Type#6 | SWIM | REGION c | MIDDLE |

FIG.29

| ICON IMAGE | CORRESPONDING ATTRIBUTE | EFFECT |
|---|---|---|
| Icon#1 | APPLE | Type#1,Type#2 | SPEED-UP |
| Icon#2 | GRAPE | Type#3 | SPEED-UP |
| Icon#3 | RICE BALL | (ALL) | SPEED-UP, ENLARGEMENT |
| Icon#4 | WATERING POT | Type#4 | ENLARGEMENT |
| Icon#5 | PAINT | Type#5 | ENLARGEMENT |
| Icon#6 | FEED | Type#6 | SPEED-UP |

DISPLAY APPARATUS, DISPLAY CONTROL METHOD, AND DISPLAY SYSTEM

CROSS-REFERENCE TO RELATED APPLICATIONS

This application is a continuation of PCT international application Ser. No. PCT/JP2016/057043 filed on Mar. 7, 2016 which designates the United States, incorporated herein by reference, and which claims the benefit of priority from Japanese Patent Applications No. 2015-058418, filed on Mar. 20, 2015, incorporated herein by reference.

BACKGROUND OF THE INVENTION

1. Field of the Invention

Embodiments relate to a display apparatus, a display control method, and a display system.

2. Description of the Related Art

Recent performance improvements to computer devices have enabled images to be easily displayed by computer graphics using three-dimensional coordinates (hereinafter abbreviated as "3DCG"). In 3DCG, it is a common practice to set a regular or random motion to each object arranged in a three-dimensional coordinate space so that the objects are displayed as a moving image. In the moving image, the objects can be represented as if they moved independently in the three-dimensional coordinate space.

Japanese Patent No. 4161325 discloses a technology of giving a motion to an image created by an animation creator by handwriting on an image by 3DCG and combining the image with a background image prepared in advance to be displayed.

A technology that enables a user image created by an ordinary user by handwriting to be easily displayed in a screen by 3DCG has been sought after. In the case where a user image is displayed in a screen by 3DCG, it is preferred that the motion of an object, such as the body of a user, in a three-dimensional space be reflected to operation of the user image displayed in the screen, because the level of amusement is further improved. Conventionally, however, it is difficult to reflect the motion of the body of a user to the operation of a user image displayed in a screen.

SUMMARY OF THE INVENTION

According to an embodiment, a display apparatus includes an image acquisition unit, an image extraction unit, a registration unit, a display control unit, a coordinate generation unit, and a motion detection unit. The image acquisition unit is configured to acquire an image including a drawing region drawn by a user. The image extraction unit is configured to extract, from the acquired image, a first image being an image in the drawing region. The registration unit is configured to register attribute information indicating attributes that is set with respect to the extracted first image and is used for controlling of moving the first image on a screen. The display control unit is configured to control display on the screen. The coordinate generation unit is configured to generate, based on a detection result of a detection unit configured to detect a position of an object in a three-dimensional space, coordinates of the object in the screen. The motion detection unit is configured to detect a motion of the object based on the coordinates. And, the display control unit is configured to further display, when the motion is detected by the motion detection unit, a second image on the screen based on the coordinates corresponding to the detected motion, and change the display of the first image to which attribute information of a certain attribute among the attributes of the first image displayed on the screen is set.

BRIEF DESCRIPTION OF THE DRAWINGS

FIG. 11A is a diagram for describing an example of an image configuration according to the first embodiment;

FIG. 11B is a diagram for describing an example of the image configuration according to the first embodiment;

FIG. 21 is a diagram for describing how to generate management information by associating attribute information and a user image with identification information;

FIG. 29 is a diagram illustrating an example of association between an attribute and an icon image according to the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
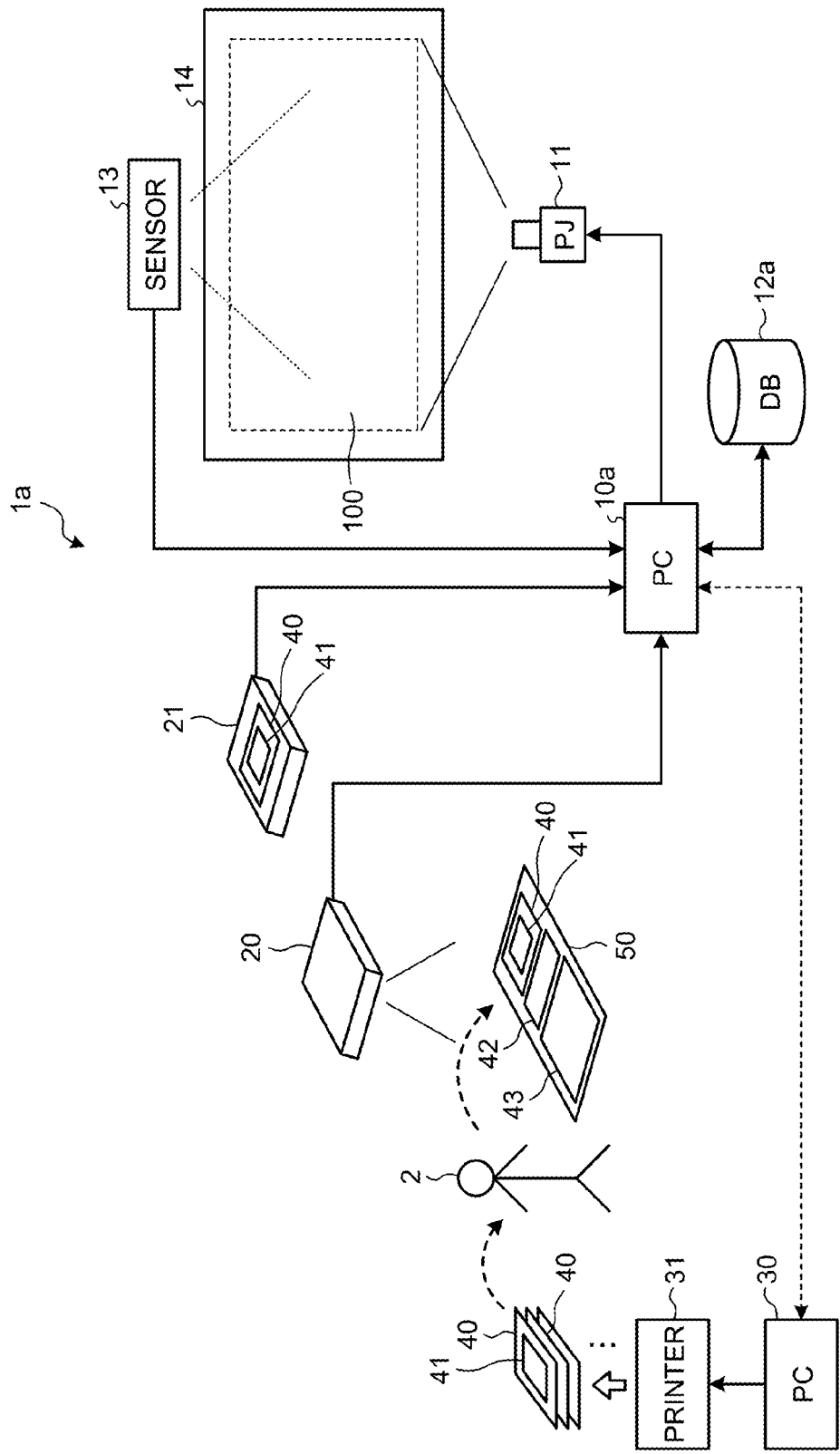
FIG. 1 is a diagram illustrating a configuration of an example of a display system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to enable the motion of an object in a three-dimensional space to be reflected to operation of a user image displayed in a screen. Referring to the accompanying drawings, a display apparatus, a display control method, and a display system according to embodiments are described in detail below.

Schematic Configuration According to First Embodiment

FIG. 1 illustrates an exemplary configuration of a display system according to a first embodiment. In FIG. 1, a display system 1a includes a computer (PC) 10a, a projector (PJ) 11, a database (DB) 12a, a sensor 13, an image acquisition device 20, and an identification image reading device 21. The PC 10a has an image management program according to the first embodiment installed thereon, and controls the operation of the display system 1a in accordance with the image management program. The PJ 11 projects an image 100 onto a projection medium 14 in accordance with an image signal output from the PC 10a.

The sensor 13 detects the position of an object. For example, the sensor 13 has a camera incorporated therein, and can detect, on the basis of an image of a target object included in a taken image acquired by the camera, the distance to the target object and the position of the target object. The sensor 13 is placed on the projection surface side of the projection medium 14. The sensor 13 may be placed on the projection surface side of the projection medium 14 at either an upper part or a lower part of the projection medium 14 or placed at any of the top, bottom, left or right. Detection results of the sensor 13 are supplied to the PC 10a.

For example, Kinect (trademark) by Microsoft Corporation can be used for the sensor 13. The sensor 13 is not limited to this example, and an imaging unit and an image processing unit may be combined to detect the position of a moving target object by analyzing a taken image by the image processing unit or to detect the position of a moving target object by using infrared rays or ultrasonic waves.

The DB 12a includes databases, and stores therein, for example, images (image data) to be used for the PC 10a to project on the projection medium 14 by the PJ 11.

The image acquisition device 20 includes, for example, a camera. The image acquisition device 20 uses the camera to image a sheet 50 set at a predetermined position, and acquires an image of the sheet 50. In a more specific example, the image acquisition device 20 includes a camera, an imaging stage for placing the sheet 50 thereon, and a jig configured to fix the camera at a predetermined distance and a predetermined position with respect to the imaging stage. For example, when the sheet 50 is placed on the imaging stage, and a predetermined operation is performed on the image acquisition device 20, an image of the sheet 50 is taken by the camera, and the taken image is output from the camera. The image acquisition device 20 supplies the acquired image to the PC 10a. The image acquisition device 20 is not limited to the camera, and may be a scanner device configured to scan an image by an image sensor to acquire the image.

The identification image reading device 21 acquires an image of a medium 40, reads an identification image 41 displayed on the medium 40 from the acquired image, and supplies the read identification image 41 to the PC 10a.

A printing medium that is printable, such as paper and a resin film, can be used as the medium 40. For example, a service provider who provides a service using the display system 1a uses a PC 30 to generate an identification image on the basis of identification information set in accordance with a predetermined format, and uses a printer 31 to print the generated identification image on the medium 40. In this case, media 40, 40 . . . on which different identification images 41 are printed can be created.

The medium 40 is not limited to a printing medium. For example, what is called a tablet device, which has a central processing unit (CPU) and a data communication function and is capable of displaying an image on a thin display integrally formed with a casing, can be used as the medium 40. In this case, for example, an identification image transmitted from the outside is received by the data communication function, and. in accordance with the received identification image, the identification image is displayed on the display.

For the identification image 41, for example, an image obtained by encoding identification information consisting of a character string can be used. Examples of the identification image 41 that can be used include a two-dimensional code, such as QR code (trademark). Without being limited thereto, a character string indicating identification information may be directly printed and used as the identification image 41, or a code obtained by converting identification information into an image in a format different from QR code (trademark) may be used.

Identification information used for the identification image 41 can be generated by the following Expression (1), for example. In Expression (1), addition symbol "+" represents the merge of character strings.

$$\text{identification information} = \text{fixed code} + \text{time information indicating time at which identification information is generated} \quad (1)$$

In Expression (1), the fixed code is, for example, a code determined for each service provider. Without being limited thereto, the fixed code may be configured by combining a first fixed code and a second fixed code. In this case, for example, the first fixed code may be used as a code indicating a provider of the display system 1a, and the second fixed code may be used as a code determined for each service provider. In this case, the second fixed code may be notified in advance from the PC 30 to the PC 10a.

For the time information, time in an environment where the identification image 41 is generated (for example, time measured by the PC 30) can be used. In one example, when the identification image 41 is formed by being printed on the medium 40, the PC 30 may acquire time information indicating time at which processing of printing the identification image 41 on the medium 40 is performed. In this case, the time information is acquired as information of six digits including at least hour, minute, and second. The time information may include another finer unit, or include units such as day and month.

The identification information is not limited to the example of Expression (1). For example, identification information may be configured by using only time information indicating time at which identification information is generated.

On the sheet 50 in this example, a hand-drawing region 43 used for a user 2 to draw a picture by hand and an attribute setting region 42 for setting attributes for the picture drawn in the hand-drawing region 43 are displayed. On the sheet 50, a region in which the medium 40 can be placed without being overlapped with the attribute setting region 42 and the hand-drawing region 43 is provided.

Figure 2:
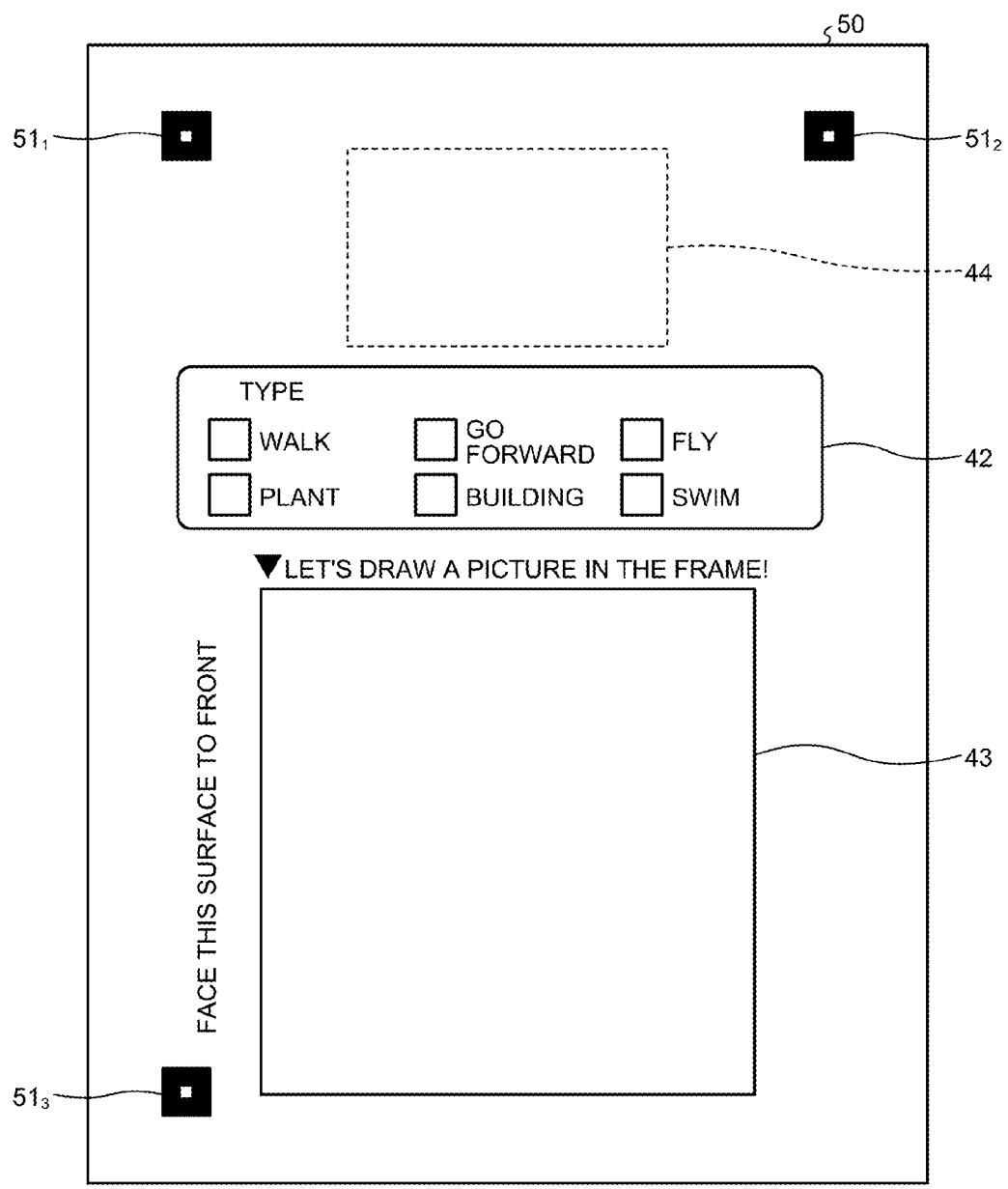
FIG. 2 is a diagram illustrating an example of a sheet that can be applied to the first embodiment.

FIG. 2 illustrates an example of the sheet 50 that can be applied in the first embodiment. In the sheet 50 illustrated in FIG. 2, the hand-drawing region 43 used to draw a picture by hand, the attribute setting region 42 for setting attributes for the picture drawn in the hand-drawing region 43, and a placement region 44 for placing the medium 40 therein are arranged. In the example in FIG. 2, the placement region 44 is displayed with a border to make it easier for a user to recognize. In the example in FIG. 2, the attribute setting region 42 can set six attributes: "walk", "go forward", "fly", "plant", "building", and "swim".

Markers $51_1$; $51_2$, and $51_3$ are arranged at three of the four corners of the sheet 50. Detecting the markers $51_1$, $51_2$, and $51_3$ from an original image obtained by acquiring an image of the sheet 50 with the image acquisition device 20 enables the orientation and the size of the sheet 50 to be known.

Figure 3:
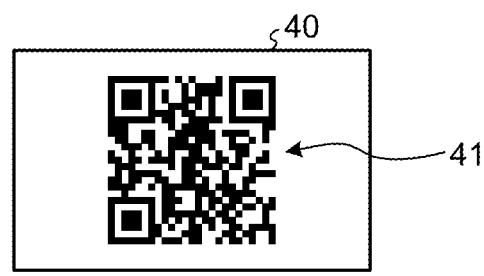
FIG. 3 is a diagram illustrating a display example of a medium according to the first embodiment.

FIG. 3 illustrates a display example of the medium 40 according to the first embodiment. As illustrated in FIG. 3, an identification image 41 is displayed on the medium 40. In the example in FIG. 3, the identification image 41 is displayed at substantially the center of the medium 40, but without being limited to this example, the identification image 41 can be displayed at a desired position on the medium 40. In the first embodiment, the identification image 41 only needs to be displayed on the medium 40. However, another information (such as logo image) may be displayed on the medium 40 together with the identification image 41.

Schematic Operation of Display System According to First Embodiment

Next, the operation of the display system 1a according to the first embodiment is schematically described with reference to FIG. 1. For description, the display system 1a is installed in a venue of an event hosted by a service provider. The service provider uses the PC 30 and the printer 31 in advance or in the venue to prepare media 40, 40, . . . on which identification images 41 based on different pieces of identification information are printed. The service provider also prepares sheets 50, 50, . . . .

A user 2 who has visited the venue receives the medium 40 and the sheet 50 from the service provider. The user 2 draws a picture in the hand-drawing region 43 on the sheet 50, and sets attributes in the attribute setting region 42 for the drawn picture. The user 2 sets the sheet 50 on the image acquisition device 20, and places the medium 40 in the placement region 44 on the sheet 50 such that the identification image 41 s displayed on the front surface side.

Figure 4:
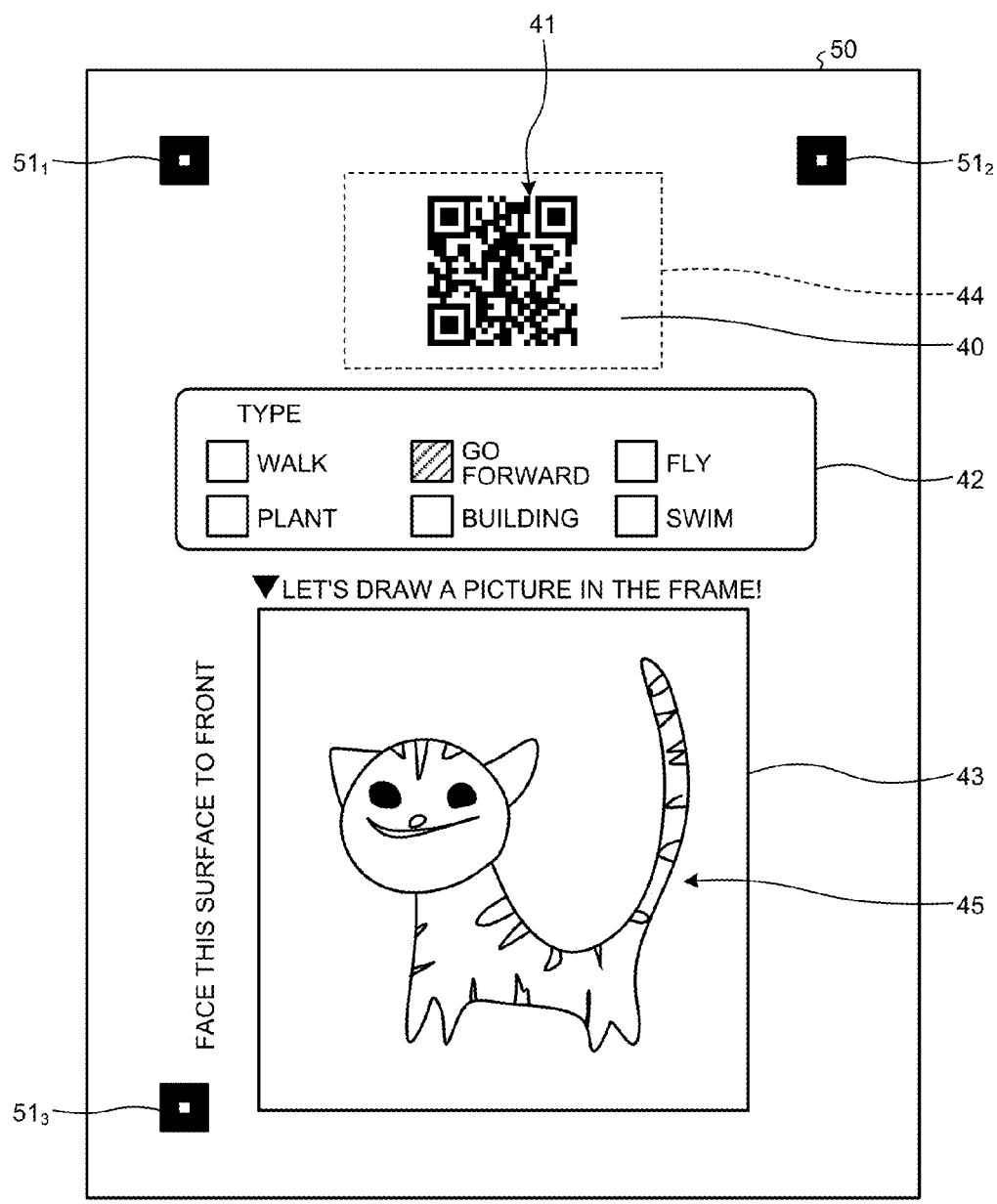
FIG. 4 is a diagram illustrating an example of a sheet set on an image acquisition device.

FIG. 4 illustrates an example of the sheet 50 set on the image acquisition device 20. In FIG. 4 a picture 45 is drawn in the hand-drawing region 43 on the sheet 50. The picture 45 is not limited to the one directly drawn on the sheet 50, and a seal having a picture 45 drawn thereon in advance may be attached or placed, or an image created by another PC may be printed in the hand-drawing region 43 on the sheet 50.

In the example in FIG. 4, in the attribute setting region 42, the second frame on the upper row for the attribute "go forward" is filled out, and it is understood that the attribute "go forward" has been set for the picture 45. Furthermore, the medium 40 is placed in the placement region 44.

In this manner, in the state in which the sheet 50 is set -with respect to the image acquisition device 20, for example, the user 2 performs an operation of instructing the image acquisition device 20 to acquire an image of the sheet 50. The image acquisition device 20 images the sheet 50 in response to the operation, and outputs the image of the sheet 50 acquired by the imaging. The image output from the image acquisition device 20 is supplied to the PC 10a.

The PC 10a analyzes the image supplied from the image acquisition device 20 to acquire an identification image 41 included in the image, an image in the attribute setting region 42, and an image in the hand-drawing region 43. The PC 10a analyzes the acquired identification image 41 to extract identification information from the identification image 41. The PC 10a analyzes the image in the attribute setting region 42 to acquire the set attribute. The PC 10a extracts an image of a picture 45 from the hand-drawing region 43. The image of the picture 45 is hereinafter referred to as "user image".

The PC 10a stores the user image and the attribute acquired from the image on the sheet 50 in the DB 12a in association with the identification information extracted from the image on the sheet 50. At the same time, the PC 10a transmits the user image to the projector 11 so that the user image is projected on the projection medium 14. In this case, the PC 10a provides the user image with parameters for a motion and coordinates on the basis of the attribute. The PC 10a further provides the user image with parameters for a motion and coordinates on the basis of the user image itself.

By drawing different pictures 45 on sheets 50 and repeating the above-mentioned processing following the image acquisition of the sheet 50 by the image acquisition device 20 on each sheet 50, the user 2 can display user images on the projection medium 14. In this case, an identification image 41 is acquired from the medium 40 placed on the sheet 50, and hence the identification image 41 common to the different sheets 50 can be acquired. Thus, common identification information can be associated with user images.

Display Example of User Image

Figure 5:
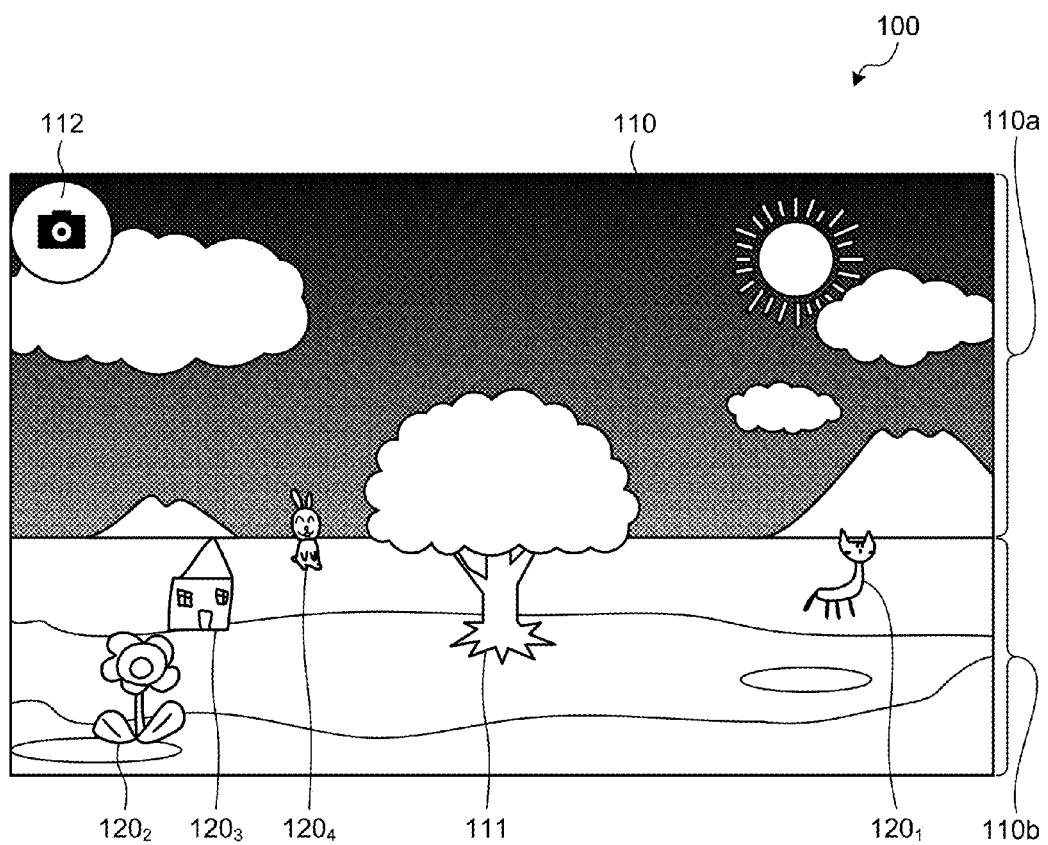
FIG. 5 is a diagram illustrating an example of an image projected on a projection medium according to the first embodiment.

Next, an example of display of user images that can be applied in common to embodiments is described. FIG. 5 illustrates an example of an image projected on the projection medium 14 according to the first embodiment. In FIG. 5, an image 100 is projected on the projection medium 14. In this example, the image 100 includes a background image 110 and an image (fixed object) 111 formed of a fixed object.

In the example in FIG. 5, the background, image 110 includes a sky region 110a and a land region 110b, and the land region 110b is an image having a depth from the lower end of the image 100 toward a boundary between the land region 110b and the sky region 110a. Specifically, the image 100 has coordinate axes (x axis, y axis) indicating the positions in the horizontal direction and the vertical direction, respectively, and a z axis that is a coordinate axis indicating the position in the depth direction. Thus, the position of each image displayed in the image 100 is indicated by coordinates (x, y, z) consisting of the three coordinate axes (x axis, y axis, z axis).

In FIG. 5 an icon image 112 displayed at the upper left corner of the image 100 is arranged in order to acquire a screenshot of the image 100.

The image 100 can further display images $120_1$ to $120_4$ based on user images. Images based on the user images that are displayed in the image 100 are hereinafter referred to as "user objects". In this example, the user objects $120_1$ to $120_4$ are associated with common identification information. The user objects $120_2$ and $120_3$ are displayed in the image 100 such that the positions thereof are fixed on the basis of the attribute acquired from the attribute setting region 42. On the other hand, the user objects $120_1$ and $120_4$ are displayed in the image 100 while moving in the land region 110b at predetermined speeds on the basis of the attribute.

Figure 6:
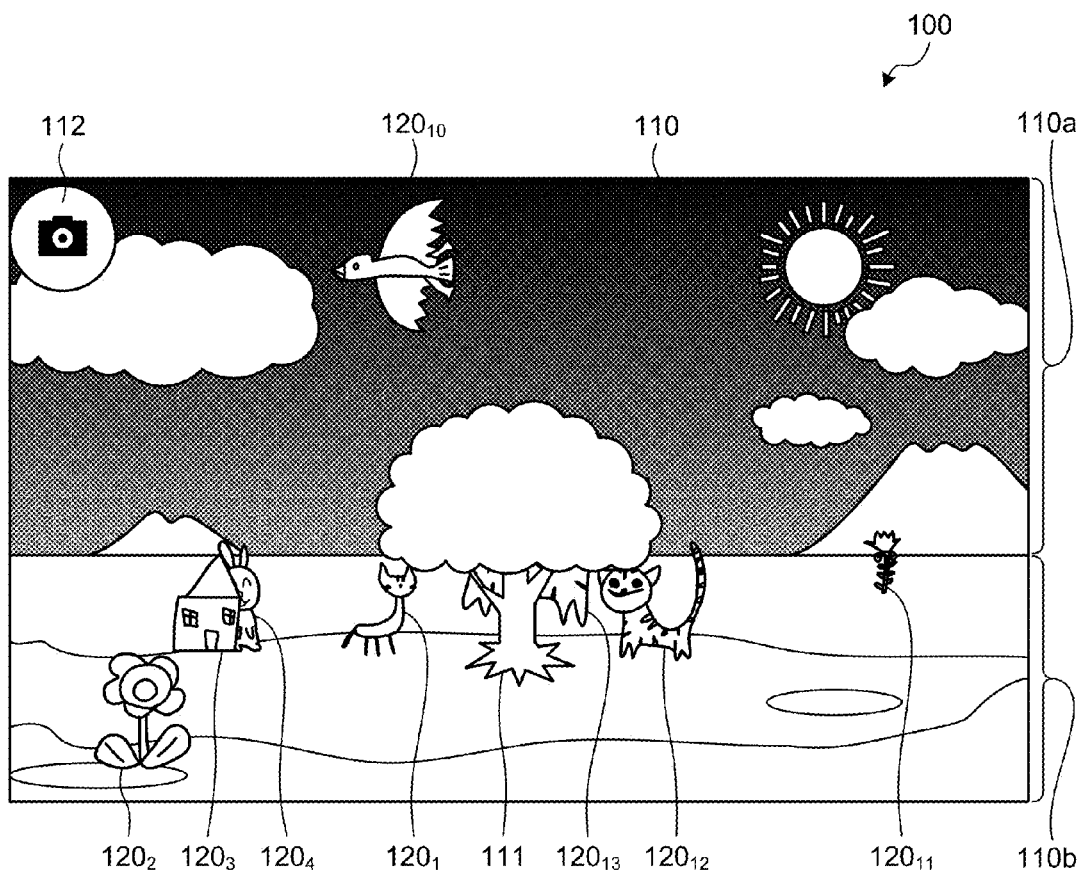
FIG. 6 is a diagram illustrating an example of an image in which a user object is further added according to the first embodiment.

As illustrated in FIG. 6, another user object can be added to the above-mentioned state in which the user objects $120_1$ to $120_4$ are displayed on the image 100. The image 100 in FIG. 6 is obtained by adding user objects $120_{10}$ to $120_{13}$ to the image 100 in FIG. 5.

For example, a user (referred to as "second user") different from the user (referred to as "first user") who displayed the above-mentioned user objects $120_1$ to $120_4$ uses a medium 40 on which identification information 41 different from the identification information 41 displayed on the medium 40 carried by the first user is displayed to cause the image acquisition device 20 to acquire images of sheets 50, 50, . . . on each of which the picture 45 is drawn. In this manner, the user objects $120_{10}$ to $120_{13}$ based on the respective user images are displayed in the image 100, and each user image and its attribute are added and stored in the DB 12a in association with the identification information 41.

In the example in FIG. 6, the user object $120_{10}$ is displayed in the image 100 while moving in the sky region 110a at a predetermined speed on the basis of the attribute acquired from the attribute setting region 42 on the sheet 50. The user objects $120_{12}$ and $120_{13}$ are displayed in the image 100 while moving in the land region 110b at predetermined speeds on the basis of the attribute. The user object $120_{11}$ is displayed in the image 100 such that the position thereof is fixed on the basis of the attribute. In FIG. 6, the user objects $120_1$ and $120_4$ are displayed in the image 100 such that the positions thereof have moved from the state in FIG. 5.

In the above description, the image acquisition device 20 is used to acquire an image of the sheet 50, and an image based on a user image included in the sheet 50 is displayed in the image 100. In the first embodiment, an image based on a user image stored in the DB 12a can be further displayed in the image 100.

In one example, identification information and user images corresponding to the user objects $120_{10}$ to $120_{13}$ and their attributes are stored in the DB 12a in association with one another by the above-mentioned second user. As exemplified in FIG. 5, the user objects $120_1$ to $120_4$ by the first user have already been displayed in the image 100.

In this state, the second user places, on the identification image reading device 21, the medium 40 that was used to acquire each of the images corresponding to the user objects $120_{10}$ to $120_{13}$ from the sheets 50, and instructs the identification image reading device 21 to read an identification image 41. The identification image reading device 21 reads the identification image 41 on the medium 40 in accordance with the instruction, and transmits the read identification image 41 to the PC 10a.

The PC 10a analyzes the identification image 41 transmitted from the identification image reading device 21 to acquire identification information. The PC 10a searches the DB 12a on the basis of the acquired identification information to acquire a user image and an attribute associated with the acquired identification information. The PC 10a displays the user image thus acquired from the DB 12a in the image 100 in accordance with the attribute. In this manner, similarly to FIG. 6, the user objects $120_{10}$ to $120_{13}$ by the second user are added to the user objects $120_1$ to $120_4$ by the first user in the image 100.

As described above, by holding an identification image 41 used to store a user image in the DB 12a, the second user can read a user image created in the past from the DB 12a and display the user image in the image 100.

Specifically, the display system 1a according to the first embodiment is configured such that an image of a medium 40 on which an identification image 41 is displayed is placed on a sheet 50, and the image of the sheet 50 including the medium 40 is acquired, thereby being capable of managing a user image based on a picture provided by a user in association with identification information indicated by the identification image 41. The identification image 41 is displayed on the medium 40, which is independent of the sheet 50, and hence the user can successively apply the medium 40 to sheets 50 such that a large number of pictures can be managed as user images in groups by using identification information.

Operation Example Depending on User Motion

Next, a change of display in response to the motion of a user that can be applied in common to the embodiments is described. In the first embodiment, the sensor 13 can detect some motion of a user during the display of the image 100, and the state of the image 100 and the state of each user object in the image 100 can be changed.

For example, the user performs an operation of moving the position of an object within a detection range of the sensor 13, such as throwing out the arm to the front or swinging the arm, in front of the projection medium 14 on which the image 100 is being displayed. This operation is referred to as "motion". The sensor 13 detects the motion, that is, detects an object in the detection range, and outputs positional information indicating the position at which the motion is detected. The positional information is supplied to the PC 10a. The PC 10a generates coordinates in the image 100 on the basis of the positional information supplied from the sensor 13. In the following, the coordinates are referred to as "motion coordinates". The PC 10a can classify the motion into types of actions on the basis of a detection result of the sensor 13.

In the DB 12a, images to be displayed on the image 100 in response to the motion of the user are stored in advance. Unless otherwise described, the image is hereinafter referred to as "icon image". For example, the icon image is stored in the DB 12a in association with each region in the image 100. For example, the sky region 110a and the land region 110b described above with reference to FIG. 5 can be applied to regions in the image 100. The regions are not limited to the sky region 110a and the land region 110b, and another region such as a water region corresponding to a waterfront may be further added. The icon image can be associated with regions.

The PC 10a determines whether which of the regions in the image 100 the generated motion coordinates are included in. On the basis of the determination result, the PC 10a reads an icon image associated with the region in which the motion coordinates are included from the DB 12a. The PC 10a displays the icon image read from the DB 12a at a position indicated by the motion coordinates in the image 100.

Figure 7:
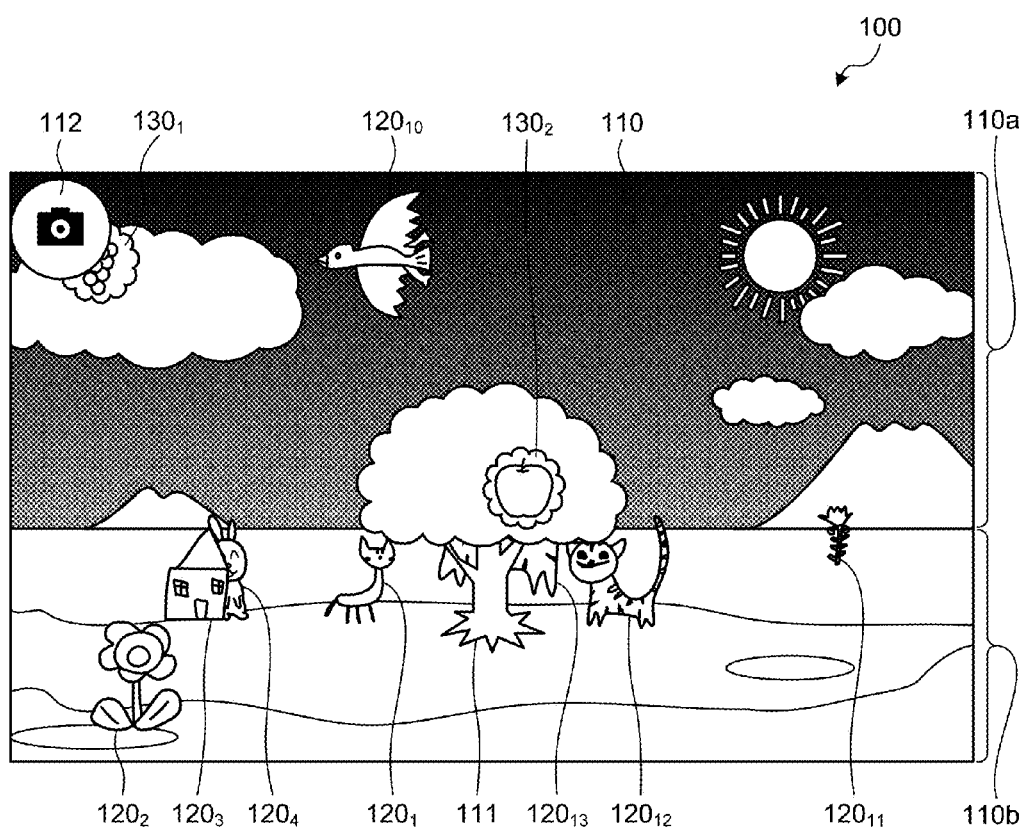
FIG. 7 is a diagram illustrating an example of an image in which an icon image is displayed according to the first embodiment.

FIG. 7 illustrates an example of the image 100 in which the icon images are displayed in the manner described above. In the example in FIG. 7, icon images $130_1$ and $130_2$ are displayed at the upper left corner and in the vicinity of the center in the image 100, respectively. Specifically, an icon image $130_1$ associated with the sky region 110a is displayed in response to the motion of the user at the upper left corner of the image 100. Similarly, an icon image $130_2$ associated with the land region 110b is displayed in response to the motion of the user near the center of the image 100.

The icon images $130_1$ and $130_2$ are displayed preferentially over the background image 110, the fixed object 111, and each of the user objects $120_1$ to $120_4$ and $120_{10}$ to $120_{13}$.

When icon images are associated with a region in which motion coordinates are included, the PC 10a randomly selects one icon image from among the icon images in accordance with a predetermined motion of the user, and displays the selected icon image in the image 100. When the user wants to switch the displayed icon image to another icon image, the user makes a motion again at the same position. The PC 10a randomly selects one icon image from the icon images associated with the region, deletes the currently displayed icon image, and displays the selected icon image. In this case, the number of times by which the user makes a predetermined motion at the same position may be measured, and only the operation of deleting the icon may be performed every predetermined number of times. For another example, the icon image may be moved when the motion is performed continuously for a given period or longer.

The state of a user object that has already been displayed on the image 100 can be changed depending on the display of an icon image on the image 100. The change in state of the user object depending on the display of the icon image is described with reference to FIG. 8 and FIG. 6 referred to above.

The user makes a motion to display an icon image at a desired position on the image 100 in the state in FIG. 6. The motion is detected by the sensor 13. The PC 10a generates motion coordinates on the basis of the detection result of the sensor 13, and displays, at the position of the generated motion coordinates, an icon image corresponding to a region in which the motion coordinates are included.

Figure 8:
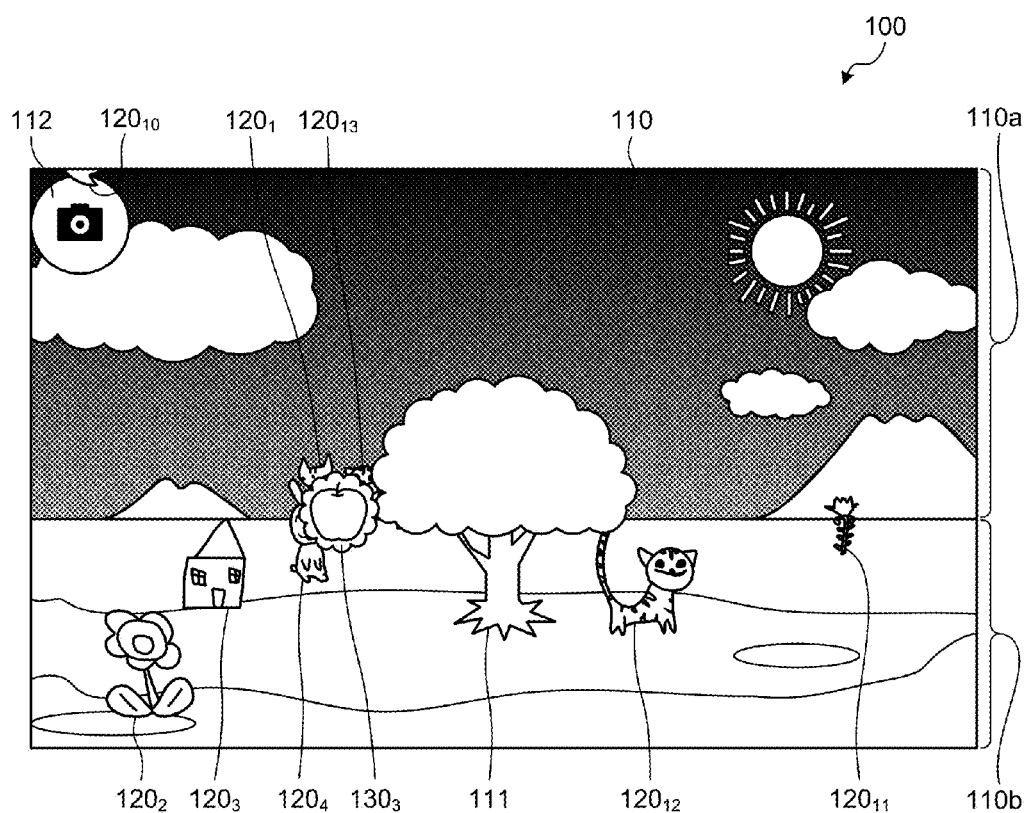
FIG. 8 is a diagram illustrating an example where a motion for displaying an icon image on an image is performed according to the first embodiment.

When a user object is present near the motion coordinates, the PC 10a controls the display of the user object such that the user object moves toward the motion coordinates in accordance with the display of the icon image. FIG. 8 illustrates an example where the user makes a motion to display an icon image at a position to the left from the center in the image 100 in the state in FIG. 6. It is understood from the example in FIG. 8 that an icon image $130_3$ is displayed at a position to the left from the center in the image 100, and the user objects $120_1$, $120_4$, and $120_{13}$ displayed near the position of the icon image $130_3$ in the state in FIG. 6 have moved toward the position of the icon image $130_3$.

The change in state of a user object in response to a motion is not limited to the movement of the display position of the user object. For example, when motion coordinates are included in an image range of a user object, the PC 10a can display the user object with emphasis. For example, the image range of the user object can be defined by the y coordinates of the upper and lower ends of the user object and the x coordinates of the right and left ends of the user object. For example, the PC 10a determines whether the motion contacts with the user object on the basis of the motion coordinates, and when determining that the motion has contacted with the user object, displays the user object with emphasis. Examples of the emphasized display of the user object include displaying the user object on an enlarged scale and vibrating the user object.

Figure 9:
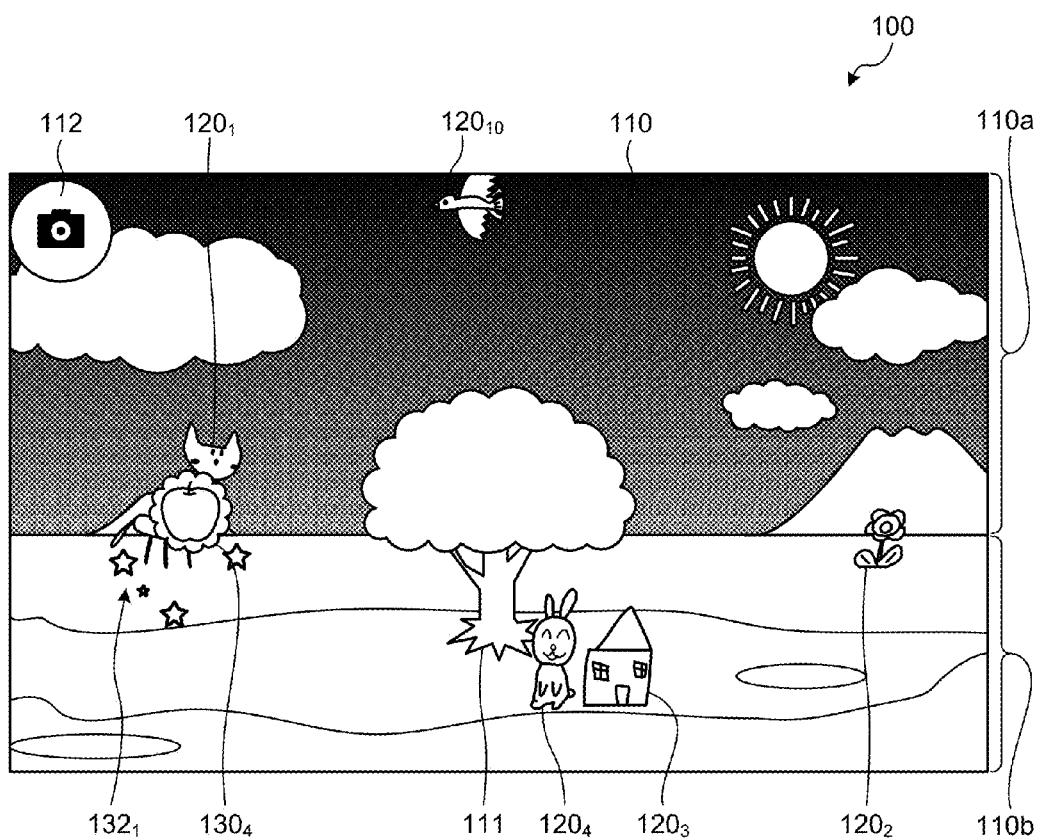
FIG. 9 is a diagram illustrating another example of emphasized display according to the first embodiment.

Another example of the emphasized display is that, as exemplified in FIG. 9, when the image range of the user object $120_1$ includes the motion coordinates, for example, the PC 10a displays an icon image $130_4$ at the position of the motion coordinates, and displays an effect image $132_1$ near the icon image $130_4$. In the example in FIG. 9, the effect image $132_1$ uses an image representing that star images are scattered around the icon image $130_4$. For example, the effect image $132_1$ is stored in the DB 12a in advance.

Figure 10:
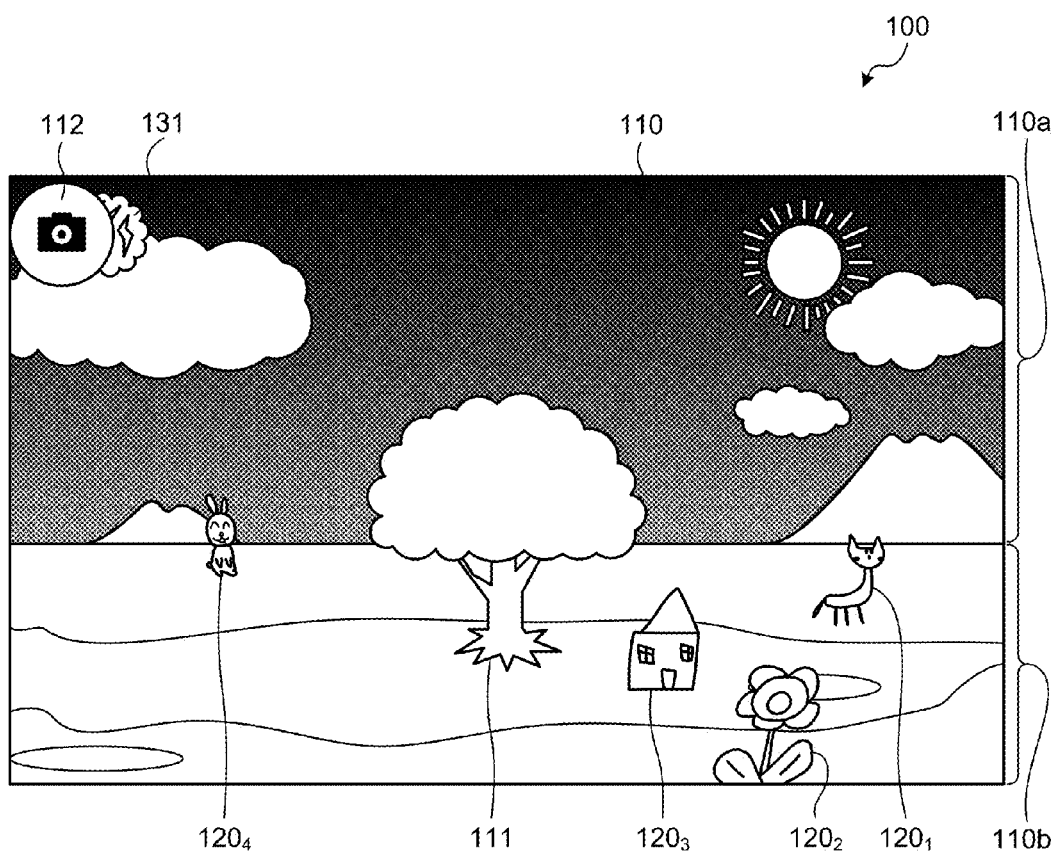
FIG. 10 is a diagram illustrating an example where an icon image indicating a screenshot is displayed at a position of motion coordinates according to the first embodiment.

The PC 10a can store a screenshot of the image 100 in response to the motion of the user. For example, the PC 10a determines whether motion coordinates corresponding to the motion of the user are included in an image range of a screenshot icon image 112 displayed at the upper left corner position of the image 100. When the PC 10a determines that the motion coordinates are included in the image range of the icon image 112, as exemplified in FIG. 10, the PC 10a displays an icon image 131 indicating a screenshot at the position of the motion coordinates. The PC 10a stores the image 100, in which each user object and icon images at the time at which the motion coordinates are determined to be included in the image range of the icon image 112 are reflected, in a memory as a screenshot image.

As described above, the PC 10a holds information on the image 100 to be projected to the projection medium 14 as coordinate information on the z axis in the depth direction. Specifically, the image 100 is an image obtained by projecting information on a three-dimensional space represented by the x axis, the y axis, and the z axis onto a two-dimensional space (plane) represented by the x axis and the y axis.

Referring to FIG. 11A and FIG. 11B, an example of the configuration of the image 100 in the PC 10a is described. For example, an image 100 is displayed on the projection medium 14 as illustrated in FIG. 11A. In the example in FIG. 11A, the image 100 includes a background image 110 including a sky region 110a and a land region 110b, a fixed object 111, user objects $120_{20}$, $120_{21}$, $120_{22}$, $120_{23}$, $120_{24}$, $120_{25}$, $120_{26}$, $120_{27}$, ..., an icon image $130_5$, and an effect image $132_2$.

The image 100 illustrated in FIG. 11A is displayed by using only the x axis and the y axis among the x axis, the y axis, and the z axis, and the z axis is ignored.

In FIG. 11A, for example, the user objects $120_{20}$, $120_{21}$, and $120_{22}$ included in the land region 110b are displayed such that the user object $120_{20}$ is displayed foremost and the user object $120_{22}$ is displayed rearmost depending on the degrees of overlapping. Similarly, the user objects $120_{23}$ and $120_{24}$ included in the land region 110b are displayed such that the user object $120_{23}$ is displayed on the front side and the user object $120_{24}$ is displayed on the back side.

For a first set of the user objects $120_{20}$ or $120_{21}$, and $120_{22}$ and a second set of the user objects $120_{23}$ and $120_{24}$, the second set is seen so as to be displayed behind the first set on the basis of the positions in the land region 110b.

The user object $120_{26}$ and user object $120_{27}$ included in the sky region 110a and the user object $120_{25}$ included in the land region 110b have no portions overlapping with each other in the state in FIG. 11A, and hence it is difficult to determine the perspective from the display of the image 100.

FIG. 11B is an overhead view of a three-dimensional space obtained by adding z-axis information to the image 100 in FIG. 11A from a virtual viewpoint at the upper right on the front side of the image 100. In FIG. 11B, the vertical direction corresponds to the y axis, the direction from the upper left toward the lower right corresponds to the x axis, and the direction from the left to the right slightly upward right corresponds to the z axis. The sky region 110a is displayed as an xy plane in which the coordinate z is 0. The land region 110b is displayed as an xz plane in which the coordinate y is 0. In FIG. 11B, the left end of the line of intersection between the sky region 110a and the land region 110b has a coordinate x of 0.

The image 100 in FIG. 11A corresponds to an image obtained by viewing the three-dimensional space from the line of sight fixed in the direction along the z axis as indicated by the arrow A in FIG. 11B. The PC 10a determines in advance a region that can be displayed in the three-dimensional space represented by the x axis, the y axis, and the z axis. A region determined as the region that can be represented is referred to as "defined region".

Each of the user objects $120_{20}$ to $120_{25}$ included in the land region 110b is displayed such that, for example, the value of the coordinate z at the lower end of the image range is fixed to 0. Each of the user objects $120_{26}$ and $120_{27}$ included in the sky region 110a can be displayed such that the value of each of the coordinates x, y, and z is freely set within a defined region.

In FIG. 11B, the coordinate z becomes larger from the left to right in the figure. As illustrated in FIG. 11B, in the user objects $120_{20}$, $120_{21}$, and $120_{22}$, the value of the coordinate z is the smallest for the user object $120_{20}$ and the largest for the user object $120_{22}$. Thus, when the user objects $120_{20}$, $120_{21}$, and $120_{22}$ are partially superimposed on one another on the xy plane, the user objects are superimposed and displayed on the image 100 in the order of the user object $120_{22}$, the user object $120_{21}$, and the user object $120_{20}$.

For a set of the user object $120_{23}$ and $120_{24}$ (second set), the values of the coordinate z are larger than those of a set of the user objects $120_{20}$ to $120_{22}$ (first set), and the user object $120_{23}$ and $120_{24}$ are displayed on the deeper side on the xz plane. Thus, when the three-dimensional space is viewed in the direction indicated by the arrow A with respect to the xz plane in the defined region, the user object $120_{23}$ and $120_{24}$ are displayed on the upper side (the side closer to a boundary between the sky region 110a and the land region 110b) in the image 100.

For the user objects $120_{25}$ to $120_{27}$, the user object $120_{26}$ has the smallest value of the coordinate z and is displayed on the front side, and the user object $120_{27}$ has the largest value of the coordinate z and is displayed on the back side. For user objects of the same size, a user object having a smaller value of the coordinate z is displayed on a larger scale (for example, user objects $120_{23}$ and $120_{24}$).

Each of the user objects $120_{20}$ to $120_{25}$ included in the land region 110b can freely move on the xz plane within a defined region. Each of the user objects $120_{26}$ and $120_{27}$ included in the sky region 110a can freely move on the xyz plane within a defined region. In this case, the value of the coordinate y of each of the user objects $120_{25}$ and $120_{27}$ included in the sky region 110a can be limited to a given value or more.

Configuration that can be Applied in First Embodiment

Figure 12:
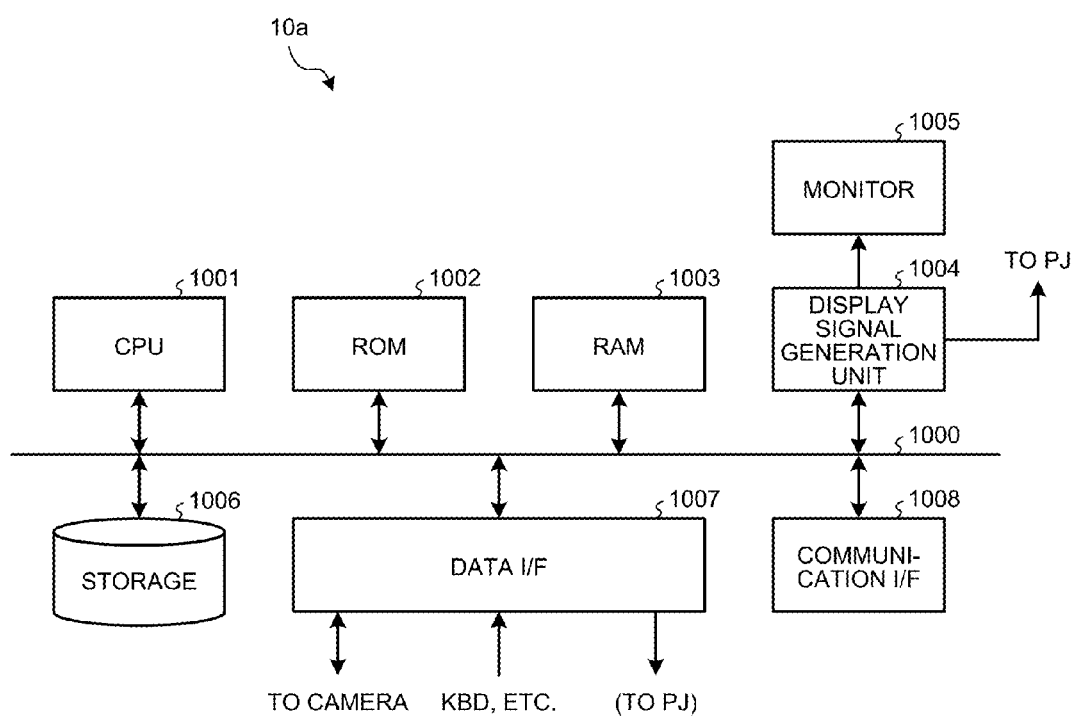
FIG. 12 is a block diagram illustrating a configuration of an example of a PC that can be applied in the first embodiment.

FIG. 12 illustrates an exemplary configuration of the PC 10a that can be applied in the first embodiment. In the PC 10a in FIG. 12, a central processing unit (CPU) 1001, a read only memory (ROM) 1002, a random access memory (RAM) 1003, and a display signal generation unit 1004 are connected to a bus 1000. In the PC 10a, a storage 1006, a data I/F 1007, and a communication I/F 1008 are further connected to the bus 1000.

The CPU 1001 uses the RAM 1003 as a work memory to control the overall PC 10 in accordance with computer programs stored in the ROM 1002 and the storage 1006 in advance. The display signal generation unit 1004 is connected to a monitor 1005, and converts a display control signal generated by the CPU 1001 into a signal that can be displayed by the monitor 1005, and outputs the resultant. The display signal generation unit 1004 can convert the display control signal into a signal that can be displayed by the projector (PJ) 11, and output the resultant.

The storage 1006 is a storage medium capable of storing therein data in a non-volatile manner, and, for example, a hard disk drive is used. Without being limited thereto, a non-volatile semiconductor memory such as a flash memory may be used as the storage 1006. The storage 1006 stores therein computer programs to be executed by the CPU 1001 and various kinds of data.

The data I/F 1007 controls input and output of data to and from an external device. For example, the data I/F 1007 is used as an interface for the image acquisition device 20. The data I/F 1007 inputs signals from a pointing device such as a mouse and a keyboard (KBD) (not shown), The display control signal generated by the CPU 1001 may be output from the data I/F 1007, and supplied to the projector 11, for example. For the data I/F 1007, an interface such as a universal serial bus (USB) and Bluetooth (trademark) can be applied.

The communication I/F 1008 controls communication via a network such as the Internet and a local area network (LAN).

Figure 13:
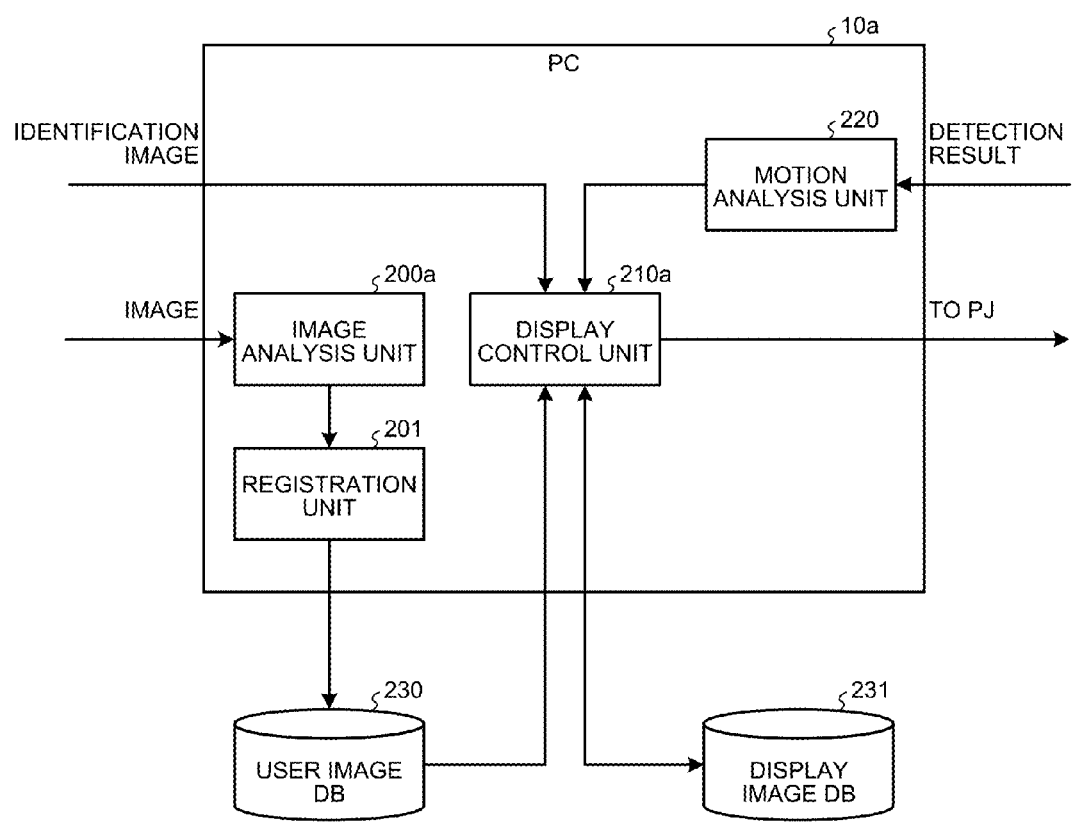
FIG. 13 is a function block diagram illustrating an example of functions of the PC that can be applied in the first embodiment.

FIG. 13 is an exemplary function block diagram illustrating the function of the PC 10a that can be applied in the first embodiment. In FIG. 13, the PC 10a includes an image analysis unit 200a, a registration unit 201, a display control unit 210a, and a motion analysis unit 220. The image analysis unit 200a, the registration unit 201, the display control unit 210a, and the motion analysis unit 220 are implemented by computer programs running on the CPU 1001. Without being limited thereto, a part or whole of the image analysis unit 200a, the registration unit 201, the display control unit 210a, and the motion analysis unit 220 may be formed by independent pieces of hardware.

A user image DB 230 and a display image DB 231 are connected to the PC 10a. The user image DB 230 and the display image DB 231 are included in the above-mentioned DB 12a. The user image DB 230 and the display image DB 231 are configured by using a storage medium externally connected to the PC 10a or a predetermined region in the storage 1006 in the PC 10a.

The image analysis unit 200a is supplied with images acquired by the image acquisition device 20. The image analysis unit 200a analyzes an image supplied from the image acquisition device 20 to acquire identification information, a user image, and information representing attributes from the image. The registration unit 201 stores the identification information, the user image, and the attribute information acquired by the image analysis unit 200a in the user image DB 230 in association with one another. For example, the user image DB 230 can store therein icon images and effect images in addition to user images.

The motion analysis unit 220 is supplied with a detection result output from the sensor 13. The motion analysis unit 220 outputs motion information on the basis of the supplied detection result. For example, the motion information includes coordinate information based on the detection result of the sensor 13. The motion analysis unit 220 may further include time information indicating time corresponding to the timing at which coordinate information is detected in the motion information.

The display control unit 210a is supplied with an identification image 41 from the identification image reading device 21. The display control unit 210a acquires identification information from the supplied identification image 41. The display control unit 210a acquires the user image from the user image DB 230, combines the acquired user image with a background image 110 to generate an image 100, and outputs the image 100. For example, the image 100 output from the display control unit 210a is supplied to the projector (PJ) 11 and projected on the projection medium 14.

In this case, the display control unit 210a successively acquires user images that are stored in the user image DB 230 by the registration unit 201. The display control unit 210a acquires, from the user image DB 230, a user image associated with identification information based on an identification image 41 supplied from the identification image reading device 21. The display control unit 210a stores the acquired user image in the display image DB 231 in association with the identification information. The display control unit 210a combines each user image stored in the display image DB 231 with the background image 110, and outputs the combined image.

The display control unit 210a can further combine the image 100 with a predetermined icon image or effect image on the basis of the motion information supplied from the motion analysis unit 220. The display control unit 210a can change each user image included in the image 100 on the basis of the motion information supplied from the motion analysis unit 220.

The image analysis unit 200a, the registration unit 201, the display control unit 210a, and the motion analysis unit 220 included in the PC 10a described above is implemented by, for example a computer program stored in the storage 1006 and running on the CPU 1001. The computer program is recorded in a computer-readable recording medium, such as a compact disc (CD), a flexible disk (FD), and a digital versatile disc (DVD), as a file in an installable format or an executable format, and provided.

A computer program to be executed by the PC 10*a* in the first embodiment may be stored on a computer connected to a network such as the Internet, and provided by being downloaded via the network. A computer program to be executed by the PC 10*a* in the first embodiment may be provided or distributed via a network such as the Internet. A computer program in the first embodiment may be provided by being incorporated in the ROM 1002 in advance.

A computer program executed by the PC 10*a* in the first embodiment has a module configuration including each of the above-mentioned units (image analysis unit 200*a*, registration unit 201, display control unit 210*a*, and motion analysis unit 220). Actual hardware is configured such that the CPU 1001 reads a computer program from a storage medium such as the storage 1006 and the ROM 1002 and executes the read computer program, and each of the above-mentioned units is loaded on a main storage device such as the RAM 1003 so that the image analysis unit 200*a*, the registration unit 201, the display control unit 210*a*, and the motion analysis unit 220 are generated on the main storage device.

Figure 14:
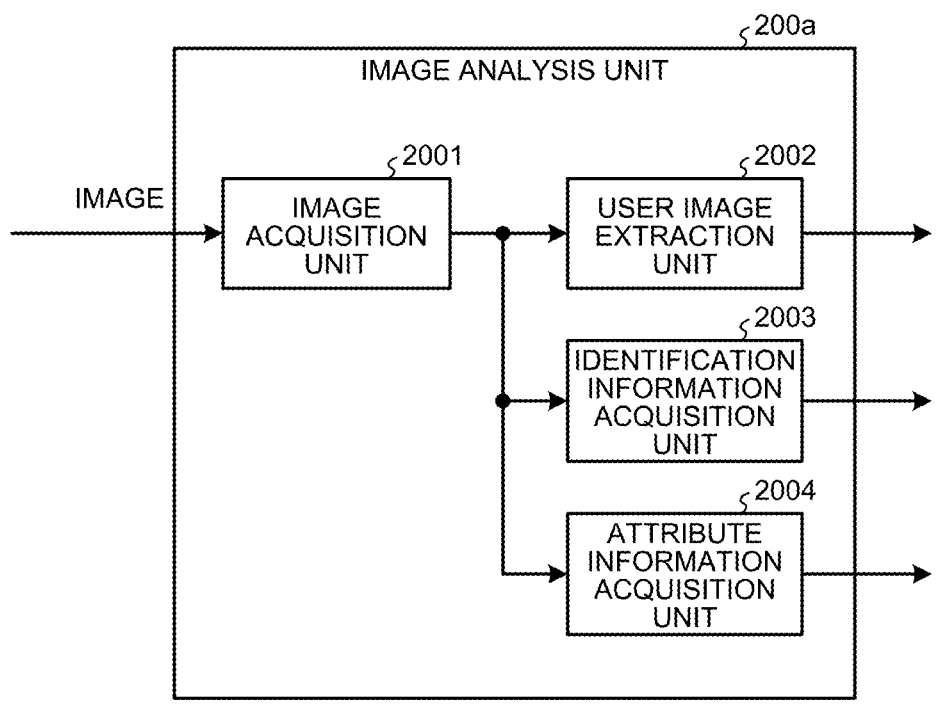
FIG. 14 is an exemplary function block diagram illustrating the function of an image analysis unit according to the first embodiment.

FIG. 14 is an exemplary function block diagram illustrating the function of the image analysis unit 200*a* according to the first embodiment. In FIG. 14, the image analysis unit 200*a* includes an image acquisition unit 2001, a user image extraction unit 2002, an identification information acquisition unit 2003, and an attribute information acquisition unit 2004.

The image acquisition unit 2001 acquires an image supplied from the image acquisition device 20. The user image extraction unit 2002 detects a hand-drawing region 43 from the image acquired by the image acquisition unit 2001, and extracts a user image from an image in the detected hand-drawing region 43. The identification information acquisition unit 2003 extracts an identification image 41 from the image acquired by the image acquisition unit 2001, and decodes the extracted identification image 41 to acquire identification information. The attribute information acquisition unit 2004 detects an attribute setting region 42 from the image acquired by the image acquisition unit 2001, and acquires attribute information from the detected attribute setting region 42.

Figure 15:
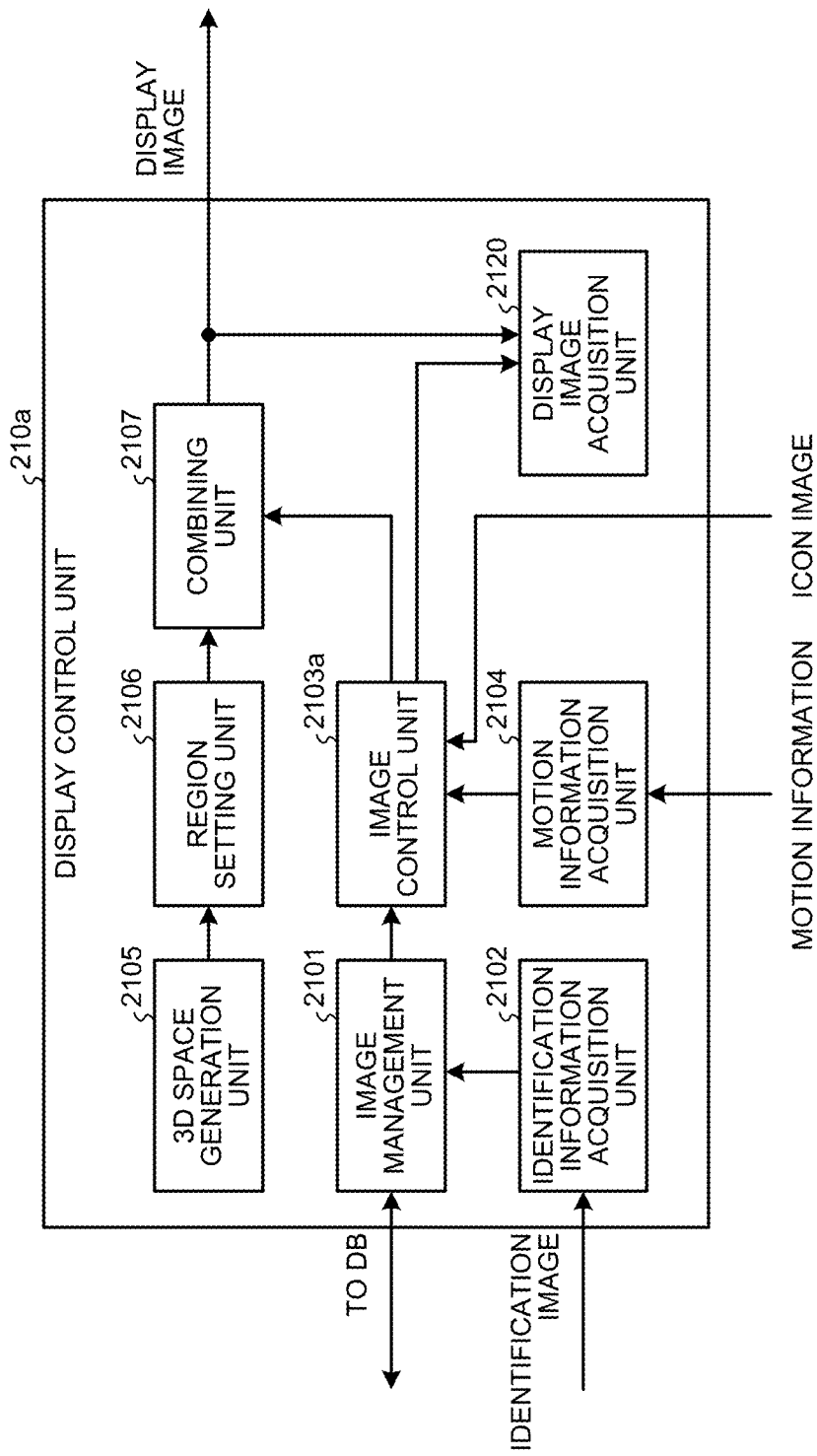
FIG. 15 is an exemplary function block diagram illustrating the function of a display control unit according to the first embodiment.

FIG. 15 is an exemplary function block diagram illustrating the function of the display control unit 210*a* according to the first embodiment. In FIG. 15, the display control unit 210*a* includes an image management unit 2101, an identification information acquisition unit 2102, an image control unit 2103*a*, a motion information acquisition unit 2104, a 3D space generation unit 2105, a region setting unit 2106, a combining unit 2107, and a display image acquisition unit 2120.

The identification information acquisition unit 2102 decodes an identification image 41 supplied from the identification image reading device 21 to acquire identification information. The image management unit 2101 acquires a user image and attribute information associated with the identification information from the user image DB 230, supplies the identification information, the user image, and the attribute information to the image control unit 2103*a*, and stores the identification information, the user image, and the attribute information in the display image DB 231. In response to the storage of the user image in the user image DB 230 by the registration unit 201, the image management unit 2101 acquires the user image and identification information and attribute information associated with the user image from the user image DB 230, and supplies the acquired user image, identification information, and attribute information to the image control unit 2103*a*.

The motion information acquisition unit 2104 acquires motion information output from the motion analysis unit 220, and supplies the acquired motion information to the image control unit 2103*a*.

The image control unit 2103*a* is supplied with the user image, the attribute information, and the identification information acquired by the image management unit 2101. For example, the image control unit 2103*a* generates, on the basis of the user image and the attribute information, parameters for controlling the display of the user image, and applies the generated parameters to the user image. The user image applied with the parameters is supplied to the combining unit 2107.

For example, when the image control unit 2103*a* is supplied with the motion information from the motion information acquisition unit 2104, the image control unit 2103*a* changes parameters applied to the user image in response to the motion information. When the image control unit 2103*a* is supplied with the motion information from the motion information acquisition unit 2104, for example, the image control unit 2103*a* acquires an icon image from the user image DB 230, and supplies the acquired icon image to the combining unit 2107 in association with coordinate information included in the motion information. The 3D space generation unit 2105 generates a three-dimensional image data space represented by the x axis, the y axis, and the z axis described above with reference to FIG. 11A and FIG. 11B. For example, the 3D space generation unit 2105 generates a three-dimensional image data space as an address space on the RAM 1003. The region setting unit 2106 sets a defined region for the three-dimensional image data space in accordance with values determined in advance for the x axis, the y axis, and the z axis. An image in the defined region is displayed as the image 100. A user image and icon images are displayed in the image 100 when coordinates thereof are included in the defined region. The region setting unit 2106 supplies information indicating the defined region to the combining unit 2107.

On the basis of the defined region, the combining unit 2107 combines the background image 110 and the fixed object 111 prepared in advance and the user image and the icon image supplied from the image control unit 2103*a* with a two-dimensional image obtained by viewing the defined region from the line of sight as the direction along the z axis, and outputs the combined image as the image 100 (see FIG. 11A and FIG. 11B).

The background image 110 and the fixed object 111 can be stored in a predetermined region in the DB 12*a* in advance. The background image 110 and the fixed object 111 may be stored in a predetermined region in the storage 1006.

Under control of the image control unit 2103*a*, the display image acquisition unit 2120 acquires the image 100 output from the combining unit 2107. For example, the image control unit 2103*a* instructs the display image acquisition unit 2120 to acquire the image 100 in accordance with predetermined motion information. The display image acquisition unit 2120 acquires the image 100 in response to the instruction, and stores the acquired image 100 in the storage 1006, for example.

Figure 16:
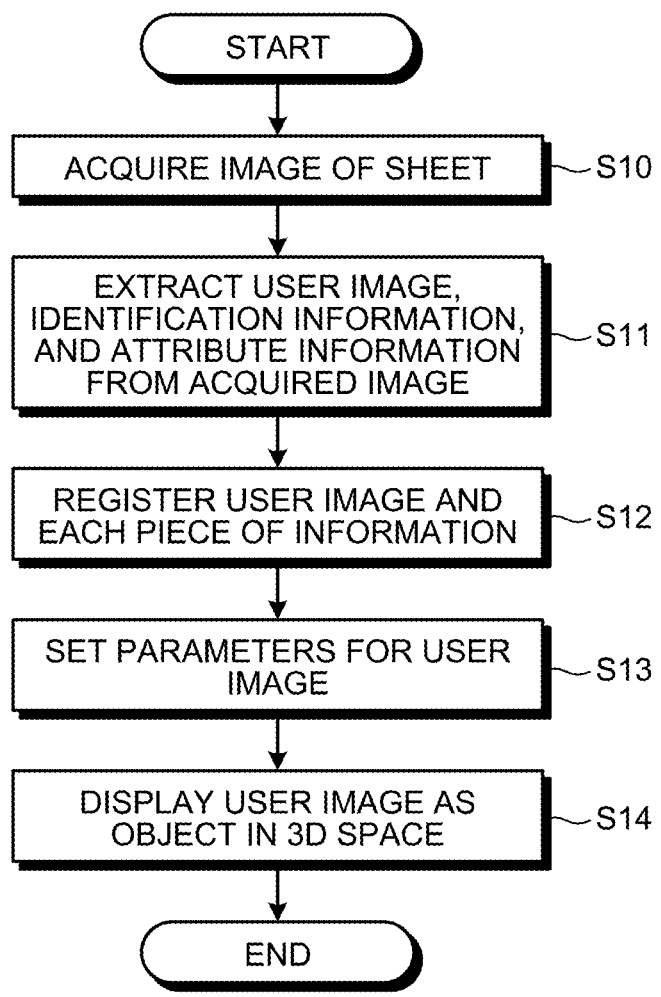
FIG. 16 is an exemplary flowchart schematically illustrating processing for displaying an image acquired by an image acquisition device according to the first embodiment.

FIG. 16 is an exemplary flowchart schematically illustrating processing for displaying an image acquired by the image acquisition device 20 according to the first embodiment. Prior to the processing in the flowchart in FIG. 16, a user prepares a medium 40 on which an identification image 41 is displayed and a sheet 50. The user draws a picture 45 in a hand-drawing region 43 on the sheet 50, checks desired attributes in an attribute setting region 42, sets the sheet 50 on the image acquisition device 20, places the medium 40 in a placement region 44, and causes the image acquisition device 20 to start image acquisition processing. The image acquisition device 20 transmits the acquired image to the PC 10a.

The image transmitted from the image acquisition device 20 to the PC 10a is received by the PC 10a and supplied to the image analysis unit 200a. The image analysis unit 200a acquires the supplied image (Step S10). At the next Step S11, the image analysis unit 200a detects the hand-drawing region 43 and the attribute setting region 42 from the supplied image, and extracts a user image and attribute information from the detected regions. The image analysis unit 200a extracts an identification image from the supplied image, and decodes the extracted identification image to acquire identification information.

At the next Step S12, the registration unit 201 stores the user image and the attribute information extracted at Step S11 in the user image DB 230 in association with the identification information, and registers the user image. The processing proceeds to Step S13. At Step S13, the display control unit 210a sets parameters p for controlling display of the user image.

Now, the parameters p that can be applied in the first embodiment are described. The display control unit 210a determines, for example, the following eight kinds of parameters $p_0$ to $p_7$ for each user image, that is, for each user object.

(1) $p_0$: maximum speed $v_{max}$ in travel direction
(2) $p_1$: acceleration a in travel direction
(3) $p_2$: maximum value $\alpha_{hmax}$ of angular acceleration in horizontal direction
(4) $p_3$: maximum value $\alpha_{vmax}$ of angular acceleration in vertical direction
(5) $p_4$: maximum value $dR_{umax}$ of random number width (maximum random number width) in upward angle
(6) $p_5$: maximum random number width $dR_{dmax}$ in downward angle
(7) $p_6$: maximum, random number width $dR_{rmax}$ in rightward
(8) $p_7$: maximum random number width $dR_{lmax}$ in leftward angle Of those, the maximum speed $v_{max}$ in the travel direction and the acceleration a in the travel direction as the parameters $p_0$ and $p_1$ are parameters for controlling the speed of a user object in a defined space in the travel direction. The maximum value $\alpha_{hmax}$ of the angular acceleration in the horizontal direction and the maximum value $\alpha_{vmax}$ of the angular acceleration in the vertical direction as the parameters $p_2$ and $p_3$ are parameters for rotating the user object in the horizontal direction and the vertical direction.

The maximum random number widths $dR_{umax}$ and $dR_{dmax}$ in the upward and downward directions as the parameters $p_4$ and $p_5$ are parameters for giving the ranges of angular acceleration with, respect to the rotation operation of the user object in the vertical direction, that is, in the upward and downward directions with respect to the travel direction. The angular accelerations given by the parameters $p_4$ and $p_5$ are limited by the maximum value $\alpha_{vmax}$ of the angular acceleration in the vertical direction as the parameter $p_3$.

The maximum random number widths $dR_{rmax}$ and $dR_{lmax}$ in the leftward direction and the rightward direction as the parameters $p_6$ and $p_7$ are parameters for giving the ranges of angular acceleration with respect to the rotation operation of the user object in the horizontal direction, that is, in the leftward and rightward directions with respect to the travel direction.

For example, the display control unit 210a generates, on the basis of a user image and attribute information, the parameters $p_0$ to $p_7$ for determining the performance related to the motion of a user object for the user image. For example, the display control unit 210a determines the values of the parameters $p_0$ to $p_7$ in accordance with the attribute information corresponding to the user image, and further sets the range where each of the determined parameters $p_0$ to $p_7$ can be changed on the basis of the color used for the user image and the shape and size of the user image.

At the next Step S14, the display control unit 210a sets coordinates in a defined region for the user image for which the parameters p have been set, and combines the user image with a background image 110 to generate an image 100. In this manner, the user image is displayed as a user object in a 3D space defined as the defined region. The coordinates of the initial position of the user object may be fixed or may be determined randomly on the basis of attribute information.

Figure 17:
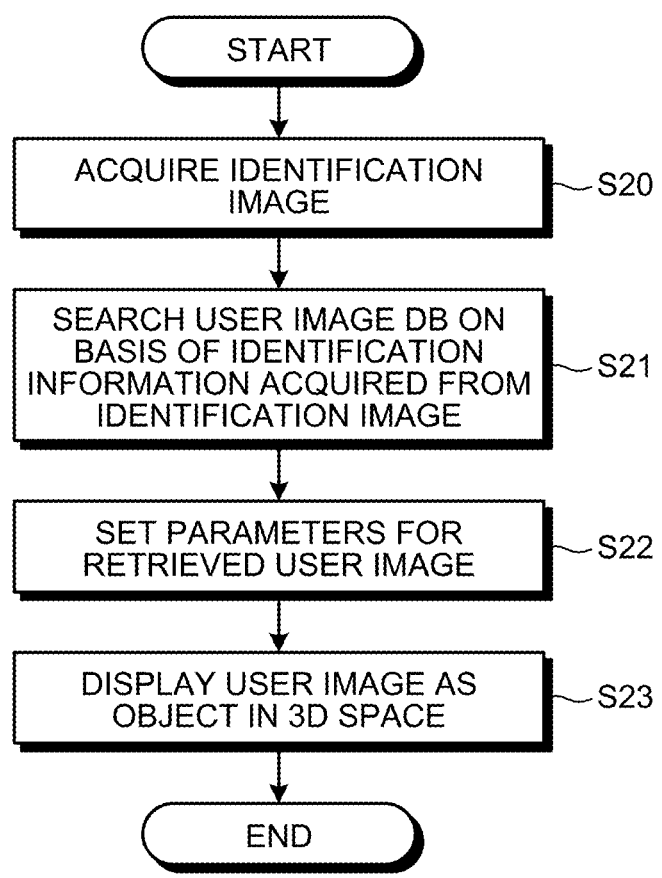
FIG. 17 is an exemplary flowchart schematically illustrating processing performed when an identification image is acquired by an identification image reading device according to the first embodiment.

FIG. 17 is an exemplary flowchart schematically illustrating processing performed when the identification image 41 is acquired by the identification image reading device 21 according to the first embodiment. Prior to the processing in the flowchart in FIG. 17, a user registers a user image in the user image DB 230 in advance in association with identification information in accordance with the above-mentioned flowchart in FIG. 16, for example.

The user sets a medium 40 on which an identification image 41 is displayed on the identification image reading device 21, and instructs the identification image reading device 21 to read the identification image 41 in response to user's operation. In response to this instruction, the identification image reading device 21 reads the identification image 41, and transmits the read identification image 41 to the PC 10a. The identification image reading device 21 may be configured to automatically recognize and read the identification image 41.

The identification image 41 transmitted from the identification image reading device 21 to the PC 10a is received by the PC 10a and supplied to the display control unit 210a. The display control unit 210a acquires the supplied identification image 41 (Step S20). At the next Step S21, the display control unit 210a decodes the identification image 41 to acquire identification information, and searches the user image DB 230 for a user image associated with the acquired identification information.

At the next Step S22, the display control unit 210a determines, on the basis of each user image retrieved from the user image DB 230, parameters $p_0$ to $p_7$ similarly to the above-mentioned processing at Step S13, and sets the parameters $p_0$ to $p_7$ for each user image.

At the next Step S23, the display control unit 210a sets coordinates in a defined region for the user image for which the parameters p have been set, and combines the user image with a background image 110 to generate an image 100. In this manner, each user image associated with identification information based on the identification image 41 in the user image DB 230 is displayed as a user object in a 3D space defined as a defined region.

Figure 18:
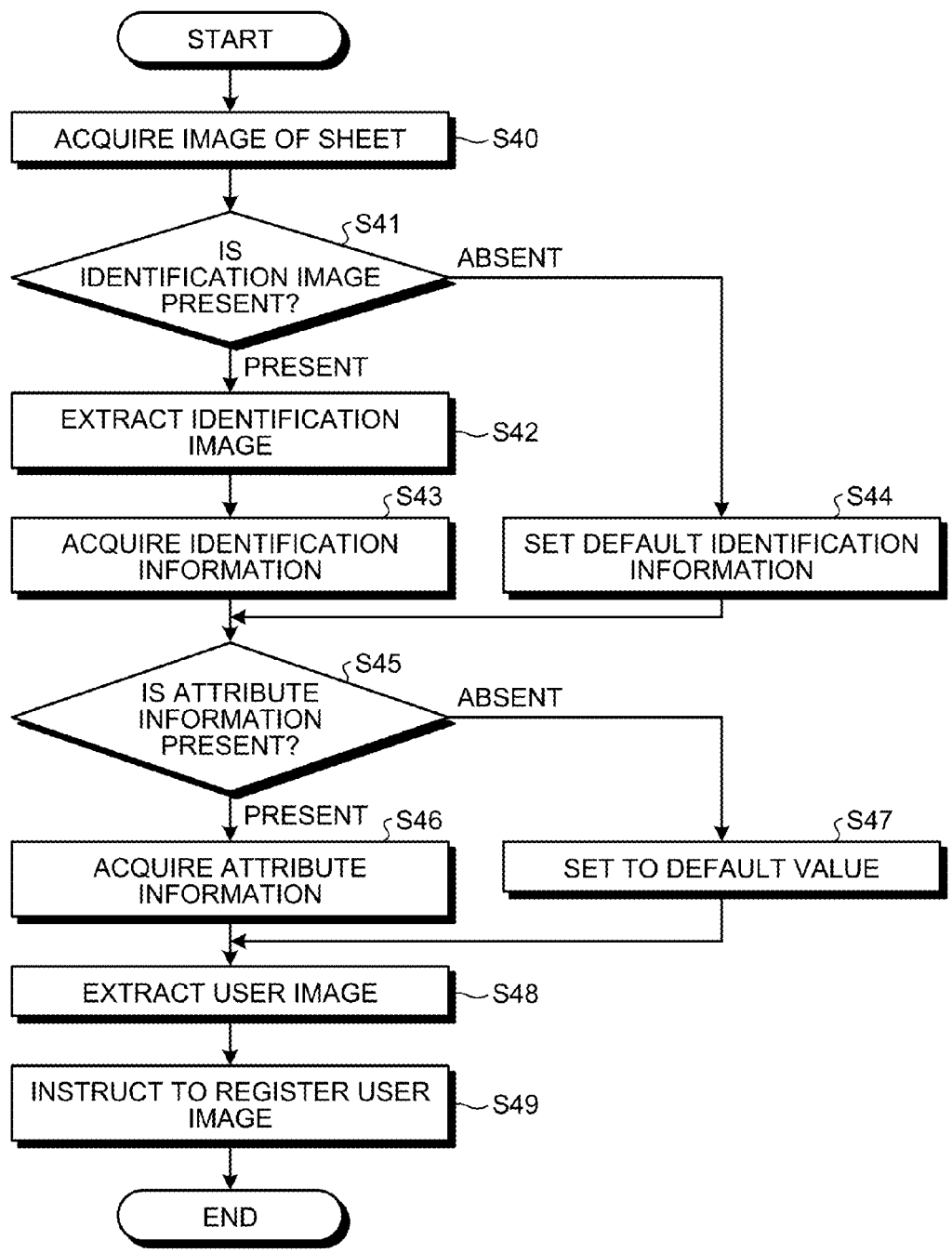
FIG. 18 is an exemplary flowchart illustrating the operation of an image analysis unit according to the first embodiment.
Figure 19:
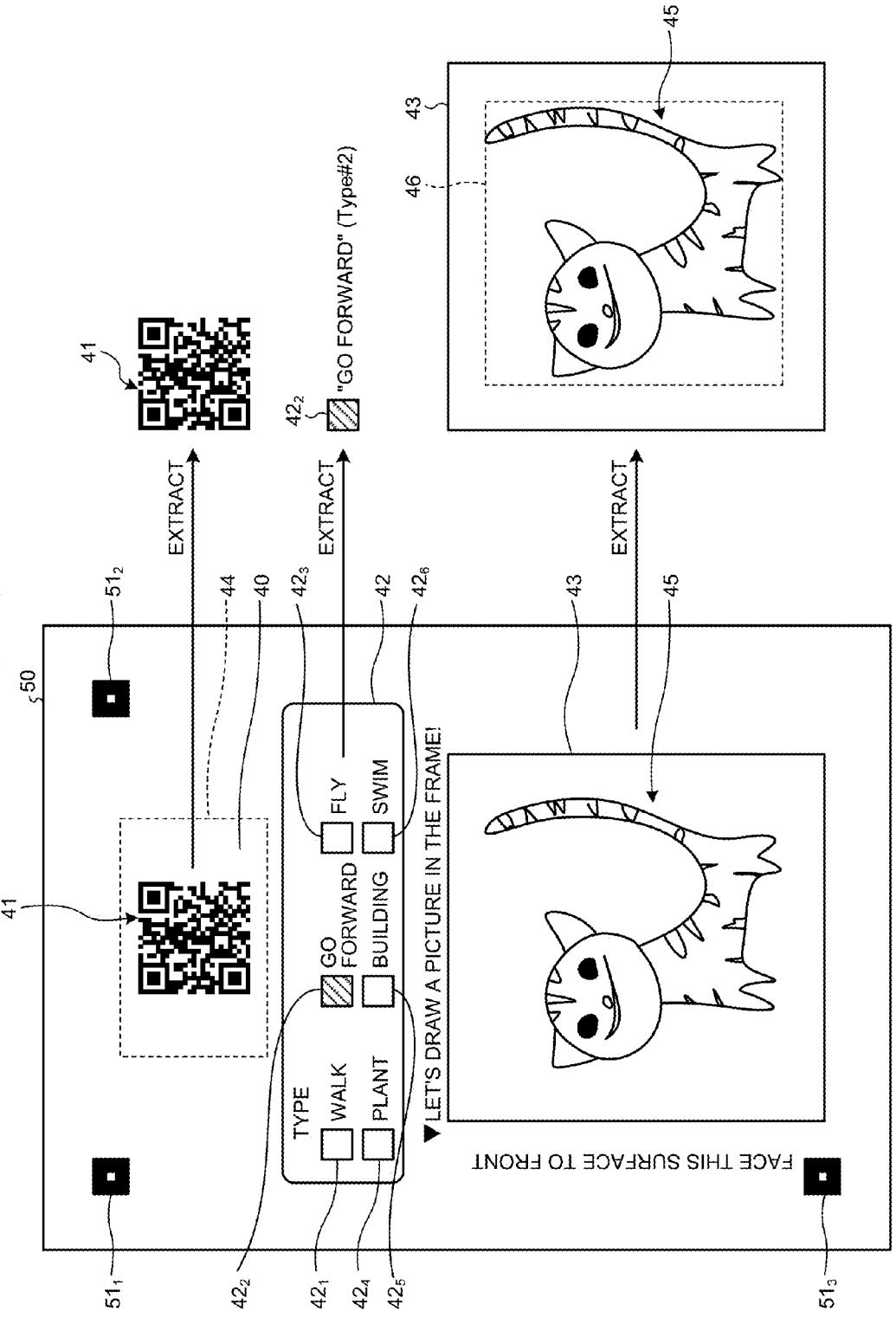
FIG. 19 is a diagram for describing processing for extracting each image from a sheet according to the first embodiment.

Referring to FIG. 18 and FIG. 19, the processing for acquiring a user image and each piece of information from the sheet 50 is described in more detail. FIG. 18 is an exemplary flowchart illustrating the operation of the image analysis unit 200a according to the first embodiment. FIG. 19 is a diagram for describing processing for extracting each image from the sheet 50 according to the first embodiment. In FIG. 19, portions common to FIG. 2 and FIG. 4 referred to above are denoted by the same reference symbols, and detailed descriptions are omitted.

In the flowchart in FIG. 18, at Step S40, the image analysis unit 200a acquires an image of the sheet 50, which is supplied from the image acquisition device 20, from the image acquisition unit 2001. The image acquisition unit 2001 supplies the acquired image to the user image extraction unit 2002, the identification information acquisition unit 2003, and the attribute information acquisition unit 2004. In this case, the image acquisition unit 2001 recognizes markers $51_1$ to $51_3$ (see left diagram in FIG. 19) arranged at three corners of the sheet 50, thereby being capable of correcting the orientation of the acquired image of the sheet 50.

At Step S41, the identification information acquisition unit 2003 determines whether an identification image 41 is included in the image of the sheet 50. When the identification information acquisition unit 2003 determines that the identification image 41 is included in the image ("present" at Step S41), the identification information acquisition unit 2003 advances the processing to Step S42 to extract the identification image 41 from the image. At the next Step S43, the identification information acquisition unit 2003 decodes the extracted identification image 41 to acquire identification information. The processing proceeds to Step S45.

On the other hand, when the identification information acquisition unit 2003 determines at Step S41 that the identification image 41 is not included ("absent" at Step S41), the identification information acquisition unit 2003 advances the processing to Step S44. At Step S44, for example, the identification information acquisition unit 2003 sets predetermined default identification information as acquired identification information. The processing proceeds to Step S45.

At Step S45, the attribute information acquisition unit 2004 extracts an image in the attribute setting region 42 from an image of the sheet 50, and determines whether attributes are designated on the basis of the extracted image of the attribute setting region 42.

For example, as illustrated in the left diagram in FIG. 19, six attribute setting parts $42_1$ to $42_6$ are arranged in the attribute setting region 42. The attribute setting parts $42_1$ to $42_6$ are used to designate desired attributes when checked by filling the inside thereof. In the example in FIG. 19, the attribute setting parts $42_1$ to $42_6$ are used to set an attribute "walk", an attribute "go forward", an attribute "fly", an attribute "plant", an attribute "building", and an attribute "swim", respectively. The attributes set in the attribute setting parts $42_1$ to $42_6$ are referred to as "attribute Type#1", "attribute Type#2", "attribute Type#3", "attribute Type#4", "attribute Type#5", and "attribute Type#6", respectively.

The attribute information acquisition unit 2004 confirms whether the attribute setting parts $42_1$ to $42_6$ are checked one by one in a predetermined order. When it is confirmed that any of the attribute setting parts is checked ("present" at Step S45). The attribute information acquisition unit 2004 acquires attribute information indicating the attribute corresponding to the checked attribute setting part (Step S46). In the example in FIG. 19, the attribute setting part 422 is checked, and attribute information indicating the attribute Type#2 is acquired. When the attribute information is acquired, the processing proceeds to Step S48.

When the attribute information acquisition unit 2004 confirms that none of the attribute setting parts $42_1$ to $42_6$ is checked ("absent" at Step S45), the processing proceeds to Step S47, and the attribute information acquisition unit 2004 sets the attribute information to a default value determined in advance, for example. The processing proceeds to Step S48.

At the time at which it is confirmed that any of the attribute setting parts $42_1$ to $42_6$ has been checked for the first time, the attribute information acquisition unit 2004 suspends the confirmation on the presence/absence of checks in the attribute setting parts. Thus, even when more than one of the attribute setting parts $42_1$ to $42_6$ have been checked, only one piece of attribute information is acquired.

At Step S48, the user image extraction unit 2002 detects the hand-drawing region 43 from the image of the sheet 50, and extracts a user image in the hand-drawing region 43. The user image extraction unit 2002 performs user object extraction processing on the image in the hand-drawing region 43. For example, the user image extraction unit 2002 performs a binary determination on the image in the hand-drawing region 43 as to whether each pixel is white (basic color of sheet 50) or color other than white, and extracts the portion of the picture 45 as a user object. The user image extraction unit 2002 sets an image in a minimum rectangular region 46 that includes the extracted portion of the picture 45 and has a base direction parallel to the base direction of the hand-drawing region 43 as a user image.

After the user image is extracted at Step S48, the image analysis unit 200a requests the registration unit 201 to register the identification information, the attribute information, and the user image acquired or extracted by the processing at Steps S40 to S48 in the user image DB 230 (Step S49).

In the above description, the processing of the user image extraction unit 2002, the processing of the identification information acquisition unit 2003, and the processing of the attribute information acquisition unit 2004 are executed in series, but the execution method is not limited to this example. Specifically, the user image extraction unit 2002, the identification information acquisition unit 2003, and the attribute information acquisition unit 2004 may be executed in parallel.

Figure 20:
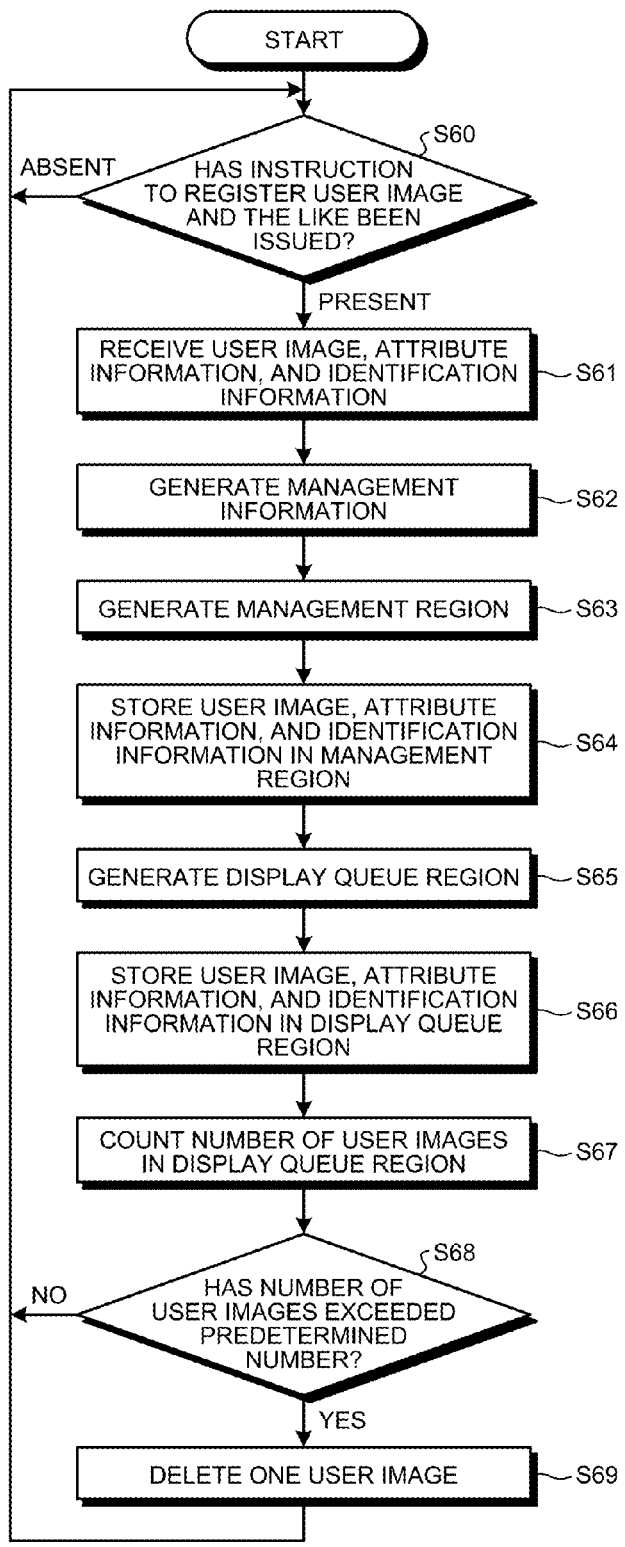
FIG. 20 is an exemplary flowchart illustrating processing for registering identification information, attribute information, and a user image to a user image DB according to the first embodiment.

FIG. 20 is an exemplary flowchart illustrating processing for registering identification information, attribute information, and a user image in the user image DB 230 by the registration unit 201 according to the first embodiment. At Step S60, the registration unit 201 determines whether an instruction to register identification information, attribute information, and a user image in the user image DB 230 has been issued from the image analysis unit 200a. When the registration unit 201 determines that there is no registering instruction ("absent" at Step S60), the registration unit 201 returns the processing to Step S60.

On the other hand, when the registration unit 201 determines that an instruction to register identification information, attribute information, and a user image in the user image DB 230 has been issued ("present" at Step S60), the processing proceeds to Step S61. At Step S61, the registration unit 201 receives the identification information, the attribute information, and the user image requested to be registered from the image analysis unit 200a.

At the next Step S62, the registration unit 201 generates management information for managing the identification information, the attribute information, and the user image received at Step S61. For example, the registration unit 201 generates the management information on the basis of the identification information. As exemplified in FIG. 21, the registration unit 201 generates the management information such that the attribute information and the user image are associated with the identification information. The user image and the attribute information are associated with each other on a one-to-one basis. On the other hand, the identification information has a one-to-many relation with a set of the user image and the attribute information. Specifically, each piece of identification information can be associated with sets of user images and attribute information.

At the next Step S63, the registration unit 201 generates a management region for storing the identification information, the attribute information, and the user image received at Step S61 in the user image DB 230. The registration unit 201 generates the management region on the basis of the above-mentioned management information generated at Step S62.

Figure 22:
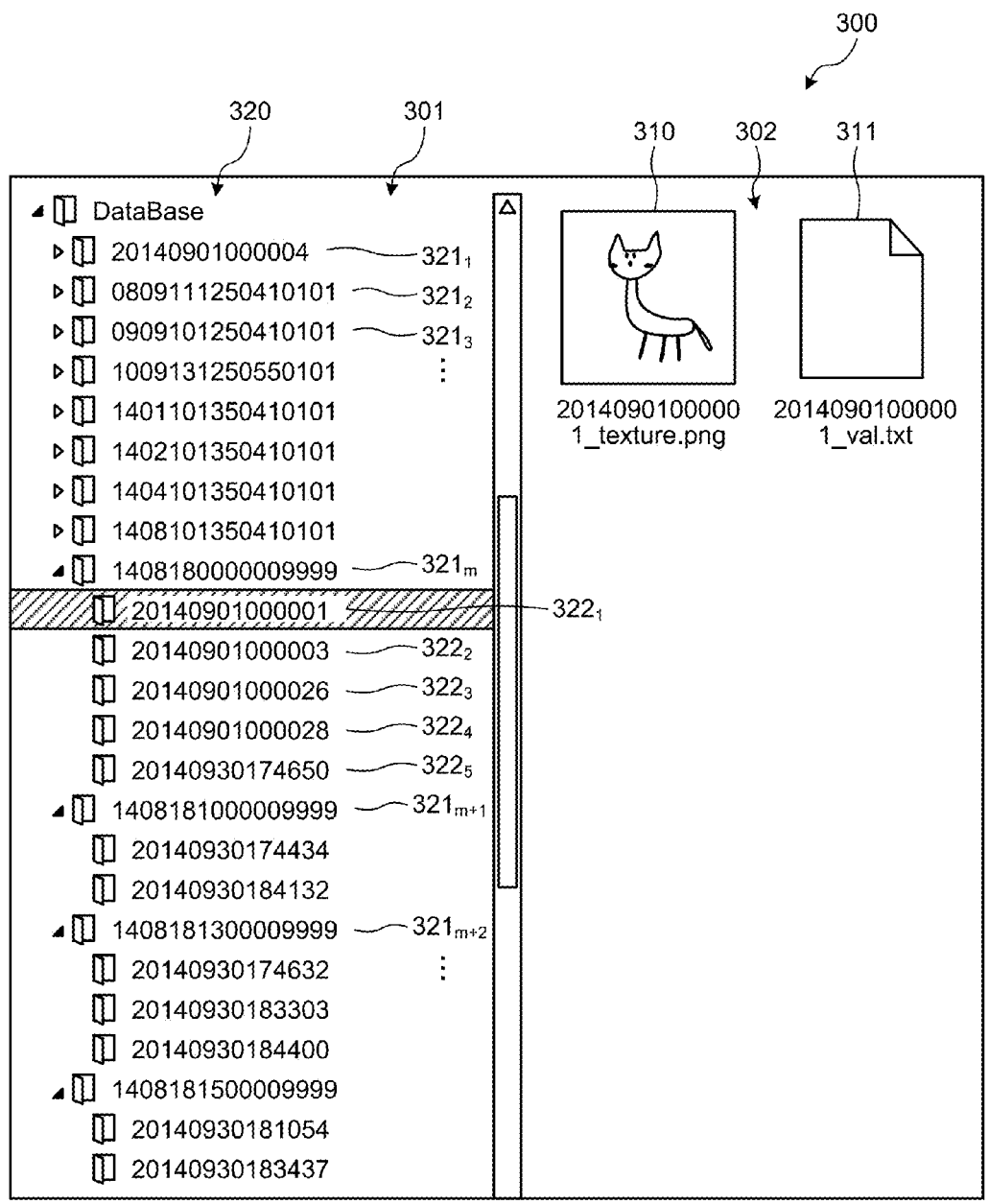
FIG. 22 is a diagram illustrating an example of a display screen indicating a folder structure of a user image DB according to the first embodiment.

In this example, the registration unit 201 generates the management region by using a hierarchical structure in a file system of a computer. Referring to FIG. 22, an example of generating a management region by using a folder structure in a file system, which is generated by the registration unit 201, is described. FIG. 22 illustrates an example of a display screen indicating a folder structure of the user image DB 230 according to the first embodiment. In FIG. 22, a display screen 300 includes display regions 301 and 302. The display region 301 indicates the folder structure, and the display region 302 indicates the contents of a folder designated in the display region 301.

In the folder structure, a folder on a certain level can include a folder on the next level below the certain level, and the hierarchies of folders are sequentially formed from a folder on an upper level to a folder on a lower level. In the display region 301 in FIG. 22, a first level folder 320 (folder "DataBase") includes second level folders $321_1$, $321_2$, $321_3$, ..., $321_m$, $321_{m+1}$, $321_{m+2}$, ... (first region). Each of the second level folders $321_1$, $321_2$, ... corresponds to identification information, and a character string of the identification information is used as the folder name.

The second level folder further includes a third level folder (second region). For example, in FIG. 22, a second level folder $321_m$ includes third level folders $322_1$ to $322_5$. A set of a user image and attribute information is stored in each of the third level folders $322_1$ to $322_5$. For the third level folder, time information indicating time at which a user image and attribute information stored in the folder were acquired by the image analysis unit 200a is used as the folder name.

In this manner, the folder name of the third level folder is determined on the basis of the time information, and hence the uniqueness of a set of user images and attribute information associated with the same identification information is guaranteed. The folder name of the second level folder is determined with use of identification information, and hence a set of a user image and attribute information associated with the same identification information as those in a second level folder is added and stored in the folder.

Such a configuration of the management region enables identification information, user images, and attribute information to be managed with use of a file system of an operating system (OS) installed on the PC 10a, which makes it easy to acquire a set of user images and attribute information associated with a designated identification image.

In FIG. 22, the contents of the third level folder $322_1$ are indicated in the display region 302. In this example, the display region 302 indicates that a file 310 for storing therein a user image and a file 311 for storing therein attribute information are stored in the third level folder $322_1$.

Figure 23:
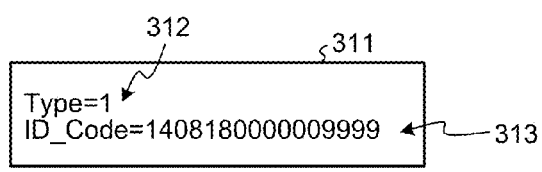
FIG. 23 is a diagram illustrating an example of the configuration of a file in which attribute information is stored according to the first embodiment.

FIG. 23 illustrates an example of the configuration of the file 311 in which the attribute information is stored according to the first embodiment. In this example, the file 311 has stored therein attribute information 312 and identification information 313 associated with the attribute information 312.

Referring back to FIG. 20, after the registration unit 201 generates the management region in the user image DB 230 at Step S63 as described above, at the next Step S64, the registration unit 201 stores the user image, the attribute information, and the identification information received from the image analysis unit 200a at Step S61 in the generated management region.

The user image, the attribute information, and the identification information stored in the management region at Step S64 are read to the display control unit 210a for display. The display control unit 210a reads the newly registered user image, attribute information, and identification information from the user image DB 230. The display control unit 210a generates a display queue region in the display image DB 231 (Step S65). For the display queue region, the same configuration as that of the management region generated at Step S63 can be applied, and hence the description of the configuration is omitted.

The display control unit 210a stores the user image, the attribute information, and the identification information, which have been read from the user image DB 230, in the generated display queue region (Step S66). The display control unit 210a uses the user image stored in the display queue region to display a user object in the image 100.

At the next Step S67, the display control unit 210a counts the number of user images stored in the display queue region. For example, the display control unit 210a counts a value obtained by totaling the numbers of third level folders in each of which a set of a user image and attribute information is stored for each second level folder corresponding to identification information in the display queue region as the number of user images stored in the display queue region. At the next Step S68, the display control unit 210a determines whether the number of user images counted at Step S67 has exceeded a predetermined number. When the display control unit 210a determines that the counted number of user images has not exceeded the predetermined number ("No" at Step S68), the processing returns to Step S60.

On the other hand, the display control unit 210a determines that the counted number of user images has exceeded the predetermined number ("Yes" at Step S68), the processing proceeds to Step S69, and the display control unit 210a deletes one user image in the display queue region. For example, the display control unit 210a deletes a folder generated at the oldest time among third level folders in the display queue region. In this manner, the number of user objects displayed in the image 100 can be limited to a constant number. The number of user images deleted at Step S69 is not limited to one, and two or more user images may be deleted.

The deletion of a user image designated from among user images stored in the display queue region can be inhibited. For example, in the display queue region, a second level folder with a predetermined folder name is created, and a user image to be inhibited from being deleted and attribute information corresponding to the user image are stored in a third level folder created in the second level folder. For example, a logo mark image of a service provider is stored in the folder as a user image. Even when user images are sequentially stored in the display queue region, the logo mark image is not deleted but continues to be displayed in the image 100.

Motion Determination Processing According to First Embodiment

Figure 24B:
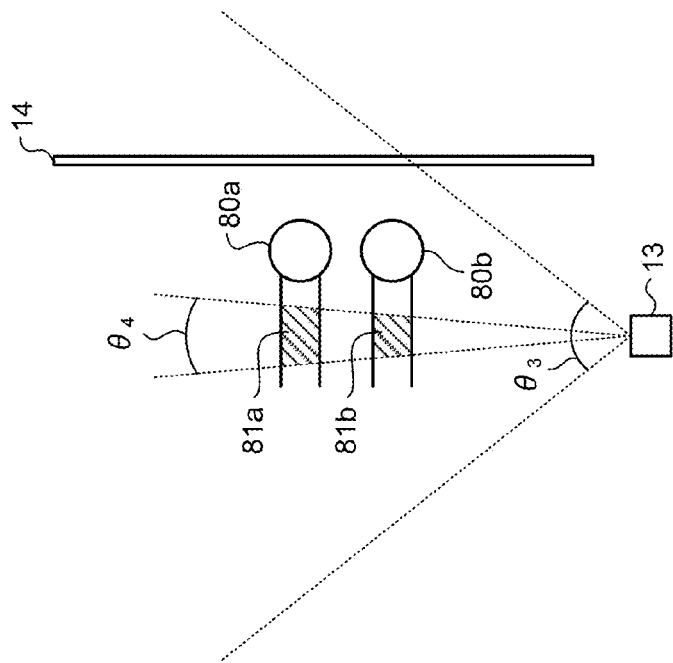
FIG. 24B is a diagram illustrating an example of a detection range of a sensor according to the first embodiment.
Figure 24A:
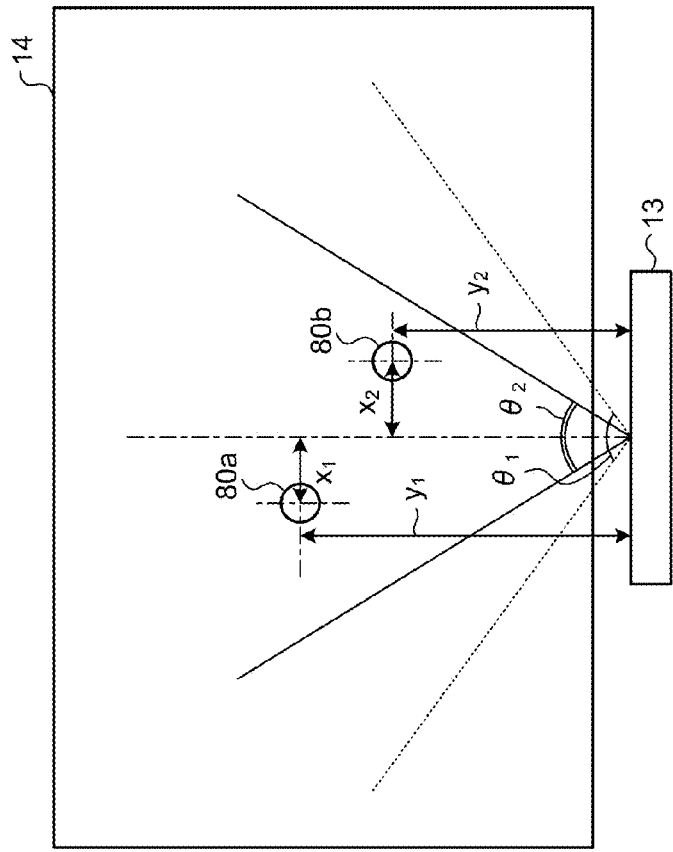
FIG. 24A is a diagram illustrating an example of a detection range of a sensor according to the first embodiment.

Next, motion determination according to the first embodiment is described. First, the detection of an object by the sensor 13 is schematically described with reference to FIGS. 24A and 24B. FIGS. 24A and 24B illustrate an example of a detection range of the sensor 13 according to the first embodiment. FIG. 24A illustrates examples of the detection range of the sensor 13 when viewed in a first direction perpendicular to a projection surface of the projection medium 14. FIG. 24B illustrates an example of the detection range of the sensor 13 when viewed in a second direction parallel to the projection surface. In the examples in FIG. 24A and FIG. 24B, the sensor 13 is installed such that a detection surface thereof faces upward, that is, the detection surface is substantially parallel to the lower end of the projection medium 14 and perpendicular to the projection surface of the projection medium 14.

Referring to FIG. 24A and FIG. 24B, the sensor 13 is capable of detecting an object in the range of an angle $\theta_1$ on a plane perpendicular to the first direction and in the range of an angle $\theta_3$ on a plane perpendicular to the second direction. In the first embodiment, the detection range of the sensor 13 on the plane perpendicular to the first direction is limited to the range of an angle $\theta_2$ smaller than the angle $\theta_1$, and the detection range of the sensor 13 on the plane perpendicular to the second direction is limited to the range of an angle $\theta_4$ smaller than the angle $\theta_3$.

For example, the angle $\theta_2$ may be set such that the detection range of the sensor 13 does not exceed the width of the projection medium 14 at the upper end of the projection medium 14. It is preferred that the angle $\theta_4$ be sufficiently smaller than the angle $\theta_3$, and, for example, be an angle that allows the detection range as seen from the first direction to be regarded as a plane.

In this manner, by setting the detection range of the sensor 13 to be narrower than that of the capacity of the sensor 13, unintended motions of a user for the display system 1a are prevented from being detected by the sensor 13. As illustrated in FIG. 24B, when the detection range in the direction perpendicular to the projection surface is limited to an extremely small angle $\theta_4$, the coordinates on the plane parallel to the projection surface can be easily Position detection of an object by the sensor 13 is described more specifically with reference to FIG. 24A and FIG. 24B. In one example, a case where the positions of objects 80a and 80b are detected is considered. For example, the objects 80a and 80b are human arms thrown out toward the projection medium 14. Objects to be detected by the sensor 13 are not limited to the human body.

The sensor 13 can detect an object in the detection range, and detect the distance of the detected object from the sensor 13 and the position of the object in a plane parallel to the detection surface of the sensor 13. As described above, the detection range of the sensor 13 is limited to extremely narrow in a direction perpendicular to the projection surface. Thus, as illustrated in FIG. 24B, the objects 80a and 80b are detected in ranges 81a and 81b that are narrowed extremely in the direction of the projection surface. In this case, the ranges 81a and 81b can each be regarded as a place parallel to the projection surface, and the orientations and angles of the objects 80a and 80b can be ignored. Thus, even when the objects 80a and 80b have a length in the direction, perpendicular to the projection surface, the position of the object in the plane parallel to the projection surface can be uniquely determined.

For example, the sensor 13 determines, for the detected object 80a, a distance $y_1$ from the sensor 13 and a position $x_1$ of the object 80a in a plane perpendicular to the detection surface of the sensor 13 and parallel to the projection surface. In this example, the position $x_1$ is determined as a distance from the line passing through the center of the sensor 13, but the determination method is not limited to this example. Similarly, the sensor 13 determines a distance $y_2$ and a position $x_2$ for the object 80b.

Figure 25:
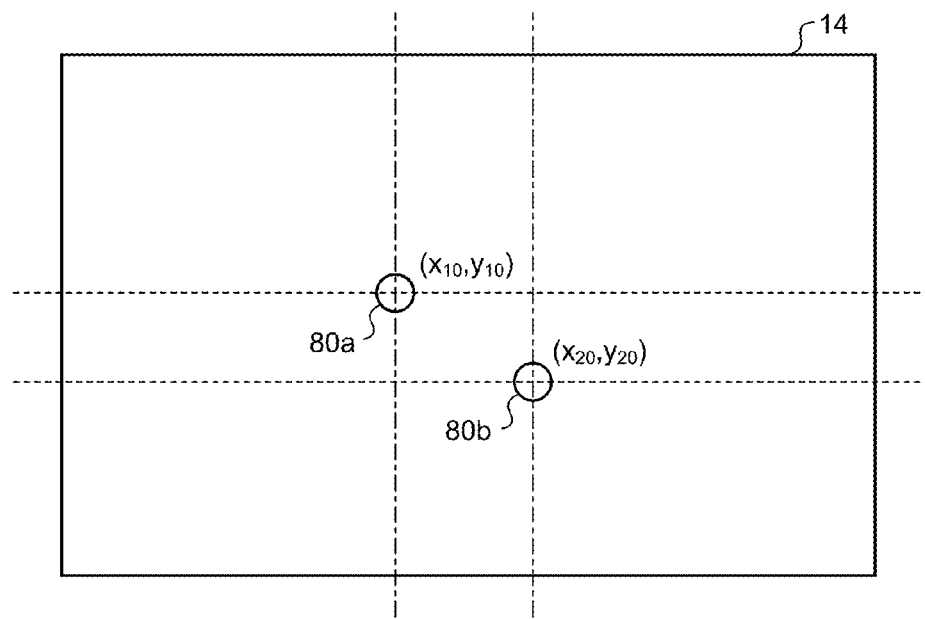
FIG. 25 is a diagram illustrating an example of coordinates in an image of an object that are determined by a method according to the first embodiment.

The sensor 13 transmits a pair of the distance $y_1$ and the position $x_1$ to the PC 10a as a detection result. Similarly, the sensor 13 transmits a pair of the distance $y_2$ and the position $x_2$ to the PC 10a as a detection result. The PC 10a receives the detection results, and supplies the received detection results to the motion analysis unit 220. The motion analysis unit 220 determines coordinates in the image 100 on the basis of the supplied detection results. FIG. 25 illustrates an example of coordinates of the objects 80a and 80b in the image 100 determined in the manner described above. In the example in FIG. 25, the coordinates of the object 80a are determined as coordinates $(x_{10}, y_{10})$, and the coordinates of the object 80b are determined as coordinates $(x_{20}, y_{20})$. As described above, the motion analysis unit 220 has the function as a coordinate generation unit configured to generate coordinates in the image 100 on the basis of detection results of the sensor 13.

The motion analysis unit 220 supplies the thus determined coordinates of the objects 80a and 80b to the display control unit 210a. The display control unit 210a determines the operation (motion) of the objects 80a and 80b on the basis of the coordinates supplied from the motion analysis unit 220 and the time information indicating the time at which the coordinates are supplied. The display control unit 210a controls the display of an icon image and the display of each user object with respect to the image 100 on the basis of the determined motion.

Attributes of User Object According to First Embodiment

Next, attributes set for a user object according to the first embodiment are described.

Figure 26:
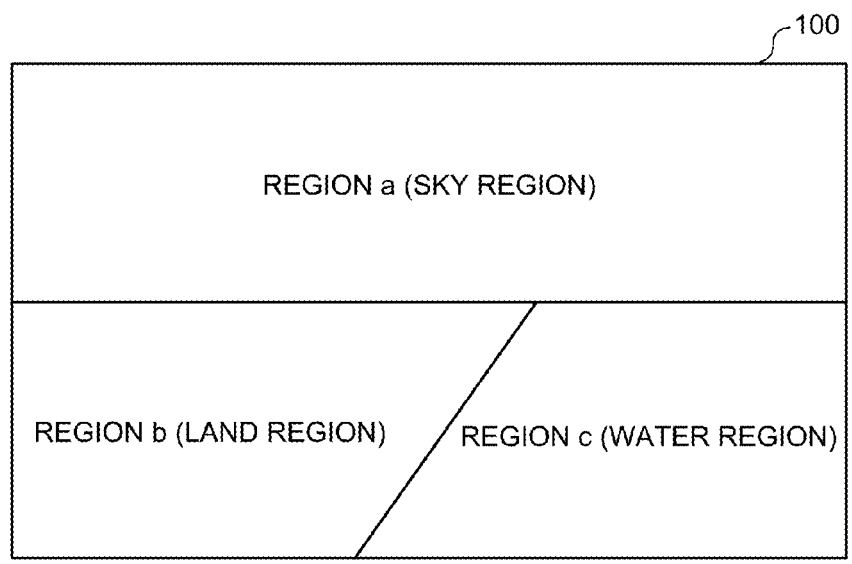
FIG. 26 is a diagram illustrating an example of setting of regions in an image according to the first embodiment.

First, as described above, regions are set in the image 100 in the first embodiment. FIG. 26 illustrates an example of the settings of the regions in the image 100 according to the first embodiment. In the example in FIG. 26, a region a, a region b, and a region c indicating a sky region, a land region, and a water region, respectively, are set in the image 100. In this case, the sky region assumes a sky, that is, a space in the air, the land region assumes a land, and the water region assumes a lake or a sea. Regions to be set in the image 100 are not limited to the sky region, the land region, and the water region. Coordinate information indicating the region a, the region b, and the region c are stored in the storage 1006, for example.

Figures 27, 28:
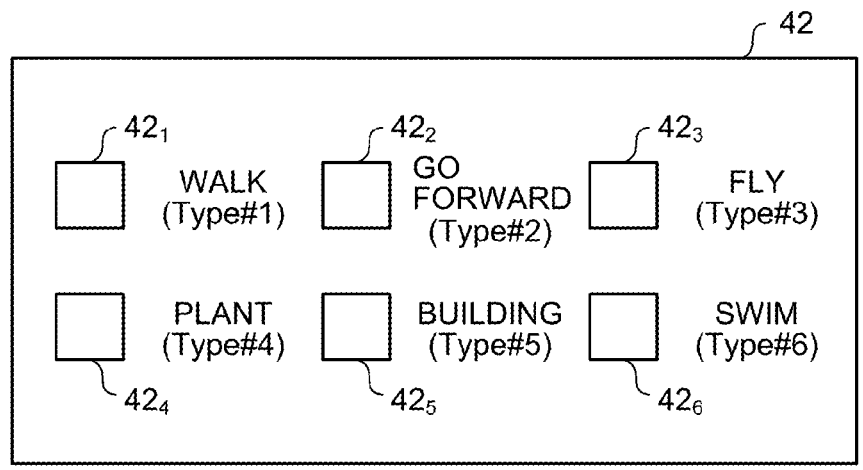
FIG. 27 is a diagram illustrating only an attribute setting region arranged on a sheet according to the first embodiment.
FIG. 28 is a diagram illustrating an example of association between an attribute and a region according to the first embodiment.

Next, each attribute set for a user object according to the first embodiment is described in more detail. In the first embodiment, attributes are set for a user image, that is, a user object. FIG. 27 illustrates only the attribute setting region 42 arranged on the sheet 50 according to the first embodiment. In the example in FIG. 27, six attribute setting parts $42_1$ to $42_6$ are arranged in the attribute setting region 42. An attribute set in the attribute setting region 42 is associated with a user object based on a picture 45 drawn in the hand-drawing region 43 on the sheet 50.

Of the six attributes exemplified in FIG. 27, the attribute "walk" (attribute Type#1) is an attribute corresponding to a motion indicating a manner that a human or an animal walks, and the motion moves at a first speed (low speed), for example. The attribute "go forward" (attribute Type#2) is an attribute corresponding to a motion indicating a manner that a car moves, and the motion moves at a second speed (high speed) higher than the first speed, for example. The attribute "fly" (attribute Type#3) is an attribute corresponding to a motion indicating a manner that a bird flies, and the motion moves at a third speed (middle speed) at the middle between the first speed and the second speed, for example. The attribute "plant" (attribute Type#4) is an attribute corresponding to a motion indicating a plant, which does not move. The attribute "building" (attribute Type#5) is an attribute indicating a building, which does not move. The attribute "swim" (attribute Type#6) is an attribute corresponding to a motion indicating a manner that a fish swims in the water, and the motion moves at the above-mentioned third speed, for example.

In the first embodiment, each of the attributes is associated with each region set in the image 100. FIG. 28 illustrates an example of association between an attribute and a region according to the first embodiment. In the example in FIG. 28, the attribute "fly" is associated with the region a (sky region) in the image 100. Each of the attributes "walk", "go forward", "plant", and "building" is associated with the region b (land region). The attribute "swim" is associated with the region c (water region).

The arrangement position of a user object in the image 100 is limited in accordance with an attribute set for the user object. In the example in FIG. 28, for example, the arrangement of a user object to which any one of the attributes "walk", "go forward", "plant", and "building" has been set is limited to the region b as the land region. More specifically, a user object to which the attributes are set is set such that the coordinate z of a lower end of the image range has a value of 0. For another example, the arrangement of a user object to which the attribute "swim" has been set is limited to the region c as the water region. In this case, for example, a user object to which the attribute "swim" has been set is controlled such that the value of the coordinate z at the center in the image range is 0, thereby indicating that the user object relates to water.

In the first embodiment, an attribute and an icon image are further associated with each other. FIG. 29 illustrates an example of association between an attribute and an icon image according to the first embodiment. In the example in FIG. 29, icon images Icon#1, Icon#2, Icon#3, Icon#4, Icon#5, and Icon#6 that represent "apple", "grape", "rice ball", "watering pot", "paint", and "feed", respectively, are defined as icon images. The icon image Icon#1 is associated with the attributes Type#1 and Type#2. Similarly, the icon image Icon#2 is associated with an attribute Type#3, the icon image Icon#4 is associated with an attribute Type#4, the icon image Icon#5 is associated with an attribute Type#5, and the icon image Icon#6 is associated with an attribute Type#6. The icon image Icon#3 is associated with all the attributes Type#1 to Type#6.

Each of the icon images Icon#1 to Icon#6 is associated with an effect. In the example in FIG. 29, the icon images Icon#1, Icon#2, and Icon#6 are associated with the effect "speed-up" for temporarily increasing the movement speed of the user object, and the icon images Icon#4 and Icon#5 are associated with the effect "enlargement" for temporarily enlarging the display size of the user object. The icon image Icon#3 is associated with the effect "speed-up" and the effect "enlargement".

Each of the icon images Icon#1 to Icon#6 is stored in the user image DB 230, for example. Without being limited thereto, each of the icon images Icon#1 to Icon#6 may be stored in a predetermined region in the storage 1006.

Motion Determination Processing According to First Embodiment

Figure 30:
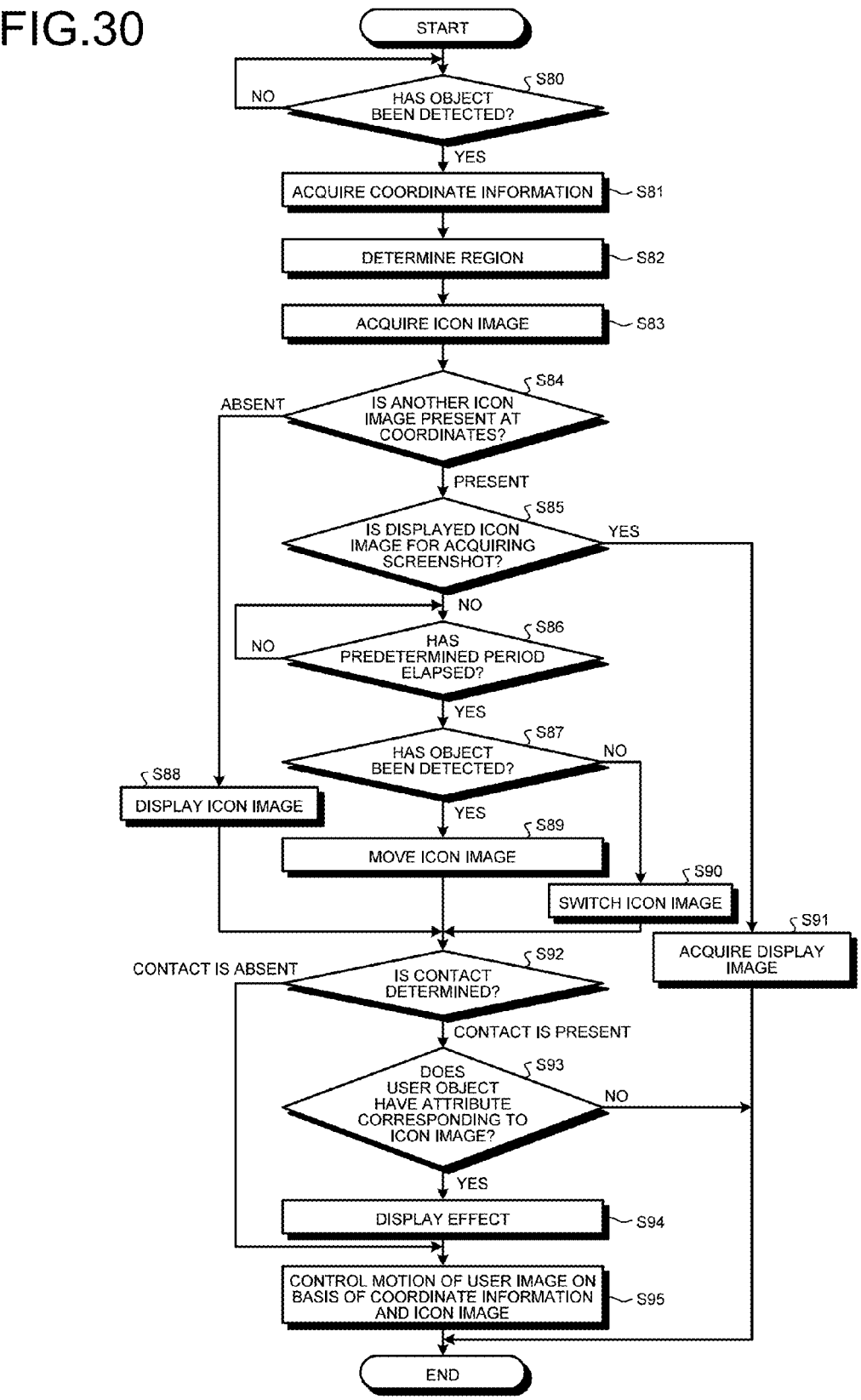
FIG. 30 is an exemplary flowchart illustrating motion determination processing according to the first embodiment.

Next, motion determination processing according to the first embodiment is described. FIG. 30 is an exemplary flowchart illustrating motion determination processing by the display control unit 210a according to the first embodiment. At the first Step S80, the display control unit 210a determines whether an object has been detected in a detection range of the sensor 13 on the basis of a detection result of the sensor 13. When the display control unit 210a determines that no object has been detected ("No" at Step S80), the display control unit 210a returns the processing to Step S80. When the display control unit 210a determines that an object has been detected ("Yes" at Step S80), on the other hand, the display control unit 210a advances the processing to Step S81.

At Step S81, the display control unit 210a acquires, on the basis of the detection result of the sensor 13, coordinate information indicating coordinates of the position at which the object is detected in the image 100. At the next Step S82, the display control unit 210a determines which of regions set in the image 100 the coordinates indicated by the coordinate information acquired at Step S81 are included.

At the next Step S83, the display control unit 210a acquires an icon image. In this case, for example, the display control unit 210a randomly selects an icon image from among the above-mentioned icon images Icon#1 to Icon#6. Without being limited thereto, the display control unit 210a may select the icon images Icon#1 to Icon#6 in accordance with a predetermined order.

At the next Step S84, the display control unit 210a determines whether another icon image has already been displayed at the coordinates in the image 100 indicated by the coordinate information acquired at Step S81. In this case, the display control unit 210a can make the determination with a margin for the coordinates indicated by the coordinate information acquired at Step S81. When the display control unit 210a determines that another icon image is not displayed ("ABSENT" at Step S84), the display control unit 210a advances the processing to Step S88, and displays the icon image acquired at Step S83 in the image 100 on the basis of the coordinate information acquired at Step S81.

On the other hand, when the display control unit 210a determines at Step S84 that another icon image has already been displayed at the coordinates ("PRESENT" at Step S84), the display control unit 210a advances the processing to Step S85. At Step S85, the display control unit 210a determines whether the displayed icon image is an icon image 112 for acquiring a screenshot. When the display control unit 210a determines that the icon image is the icon image 112 ("Yes" at Step S85), the display control unit 210a advances the processing to Step S91. The display control unit 210a stores the image 100 that reflects each user object and the icon image at that time point in a memory or the like as a screenshot image, and acquires a display image by the image 100. The display control unit 210a finishes a series of processing in the flowchart in FIG. 30.

When the display control unit 210a determines at Step S85 that the displayed icon image is not the icon image 112 ("No" at Step S85), the display control unit 210a advances the processing to Step S86. At Step S86, the display control unit 210a waits for the lapse of a predetermined time. The predetermined time is a relatively short time, such as 1 second or less and several seconds. When the display control unit 210a determines that the predetermined time has not elapsed ("No" at Step S86), the display control unit 210a returns the processing to Step S86. On the other hand, when the display control unit 210a determines that the predetermined time has elapsed ("Yes" at Step S86), the display control unit 210a advances the processing to Step S87.

At Step S87, the display control unit 210a determines whether the object detected at Step S80 has been continuously detected. For example, the display control unit 210a may acquire the coordinates of the currently detected object on the basis of the detection result of the sensor 13, determine a difference between the acquired coordinates and the coordinates acquired at Step S81, and determine that the object has been continuously detected when the determined difference is within a predetermined range. In this manner, the display control unit 210a can detect the motion of the object detected by the sensor 13, and the display control unit 210a functions as a motion detection unit configured to detect the motion of an object. When the display control unit 210a determines that the object has been continuously detected ("Yes" at Step S87), the display control unit 210a advances the processing to Step S89.

At Step S89, the display control unit 210a moves the icon image that has been determined to be displayed at Step S84. For example, the display control unit 210a moves the icon image determined to be displayed at Step S84 to the coordinates acquired at Step S87.

On the other hand, when the display control unit 210a determines at Step S87 that the object detected at Step S80 has not already been detected ("No" at Step S87), the processing proceeds to Step S90. At Step S90, the display control unit 210a deletes the icon image determined to have already been displayed at Step S84, and displays the icon image acquired at Step S83 at the coordinates indicated by the coordinate information acquired at Step S81. In this manner, the icon images are switched.

When any one of the above-mentioned processing at Step S88, Step S89, and Step S90, the display control unit 210a advances the processing to Step S92. At Step S92, the display control unit 210a determines whether the icon image displayed at Step S88, Step S89, or Step S90 contacts with each user object displayed in the image 100.

For example, the display control unit 210a acquires, on the basis of the coordinates and size of the icon image displayed at Step S88, Step S89, or Step S90, the coordinates indicating the range of the icon image in the image 100. The display control unit 210a acquires, on the basis of the position and size of each user object that has already been displayed in the image 100, coordinates indicating the range of each user object in the image 100.

The display control unit 210a determines, on the basis of the acquired coordinates of the ranges of the icon image and the user object, whether the range of the icon image overlaps with the range of the user object. When the result of the determination indicates that the range of the icon image overlaps with the range of the user object as a result of the determination, the display control unit 210a determines that the icon image is in contact with the user object (contact is present). When the display control unit 210a determines that contact is absent ("contact is absent" at Step S92), the display control unit 210a advances the processing to Step S95.

On the other hand, when the display control unit 210a determines at Step S92 that contact is present ("contact is present" at Step S92), the display control unit 210a advances the processing to Step S93. At Step S93, the display control unit 210a determines whether an attribute set for the user object determined at Step S92 to be in contact with the icon image corresponds to the attribute of the icon image based on which the contact determination is made (icon image displayed at Step S88, Step S89, or Step S90).

For example, the attribute set for the user object that has been determined to be in contact with the icon image is the attribute Type#1, and the icon image based on which the determination is made is the icon image Icon#1. In this case, in the example in FIG. 29, because the attributes associated with the icon image Icon#1 are the attributes Type#1 and Type#2, the display control unit 210a determines that the attribute set for the user object determined at Step S92 to be in contact with the icon image corresponds to the attribute of the icon image based on which the contact determination is made.

When the display control unit 210a determines at Step S93 that the attribute set for the user object does not correspond to the attribute of the icon image ("No" at Step S93), the display control unit 210a finishes a series of processing in the flowchart in FIG. 30. On the other hand, when the display control unit 210a determines at Step S93 that the attribute set for the user object corresponds to the attribute of the icon image ("Yes" at Step S93), the display control unit 210a advances the processing to Step S94. At Step S94, for example, the display control unit 210a acquires an effect image from, the DB 12a, and displays the acquired effect image (effect) in the image 100 on the basis of the coordinates of the icon image determined to be in contact with the user object. After displaying the effect, the display control unit 210a advances the processing to Step S95.

At Step S95, for example, when the display control unit 210a determines at Step S92 that contact is absent, the display control unit 210a changes the display of a user object, displayed near the icon image in the image 100. In this case, the display control unit 210a selectively changes the display of a user object to which an attribute associated with the icon image has been set. For example, the display control unit 210a changes the display of the user object such that the user object moves toward the icon image at a predetermined speed.

For example, when the display control unit 210a determines at Step S92 that contact is present, the display control unit 210a changes the display of a user object which is in contact with the icon image and to which an attribute associated with the icon image has been set. In this case, the display control unit 210a can display the user object with emphasis by swinging the user object, for example.

Figure 31A:
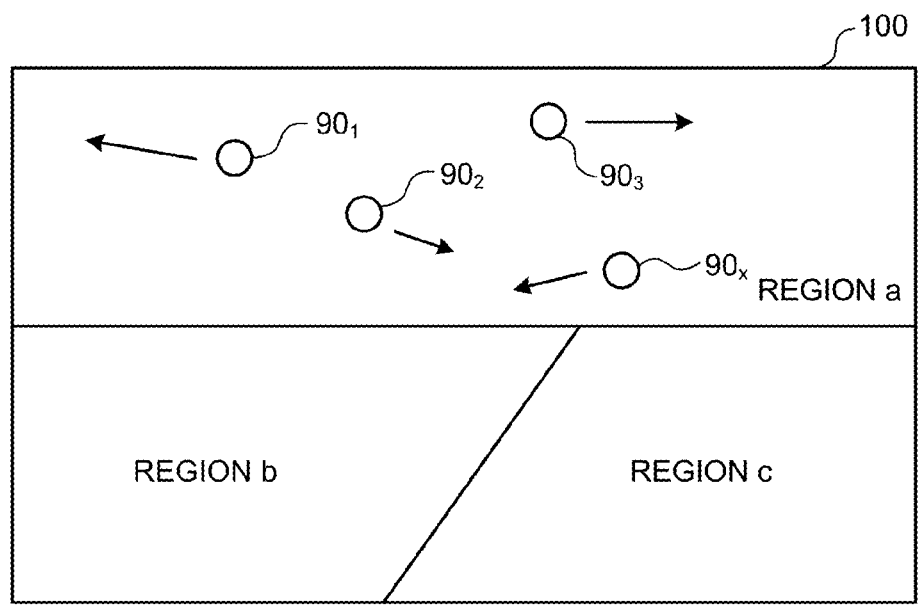
FIG. 31A is a diagram illustrating an example of the motion of a user object in an image when it is determined that contact is absent according to the first embodiment.
Figure 31B:
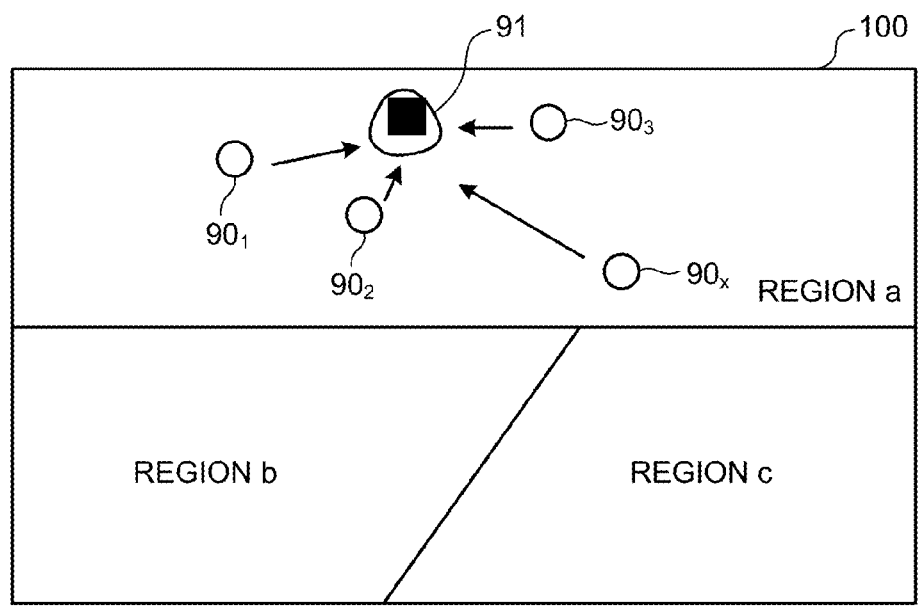
FIG. 31B is a diagram illustrating an example of the motion of a user object in an image when it is determined that contact is absent according to the first embodiment.

FIGS. 31A and 31B illustrate an example of the motion of user objects in the image 100 when it is determined at Step S92 that contact is absent according to the first embodiment. For example, as illustrated in FIG. 31A, in the image 100, user objects $90_1$, $90_2$, $90_3$, ..., and $90_x$ to which the attribute Type#3 (fly) has been set originally move in random directions in accordance with set corresponding parameters p as indicated by the arrows in FIG. 31A.

In this state, the objects are detected in accordance with the processing in the flowchart in FIG. 30, and, for example, an icon image 91 as the icon image Icon#3 (rice ball) illustrated in FIG. 29 is displayed in accordance with the detection results as illustrated in FIG. 31B. The icon image Icon#3 corresponds to all the attributes Type#1 to Type#6. Thus, the display control unit 210a controls the operation of each of the user objects $90_1$, $90_2$, $90_3$, ..., and $90_x$ such that the user objects move toward the icon image 91 at predetermined speeds as indicated by the arrows in FIG. 31B.

Modification of First Embodiment

Next, a modification of the first embodiment is described. The modification of the first embodiment relates to display control performed when a motion is not detected by the sensor 13 for a relatively long period in addition to the display control in the above-mentioned first embodiment.

More specifically, in the modification of the first embodiment, when a motion is not detected by the sensor 13 for a relatively long period, such as several minutes or more, in the state in which each user object in the image 100 moves randomly in accordance with parameters p, each user object is caused to execute a predetermined operation. In this manner, the lines of sight of users who visit an event venue where a service is provided by the display system can be gathered.

In the modification of the first embodiment, the above-mentioned display system 1a according to the first embodiment can be directly used, and hence the description of each configuration is omitted.

Figure 32:
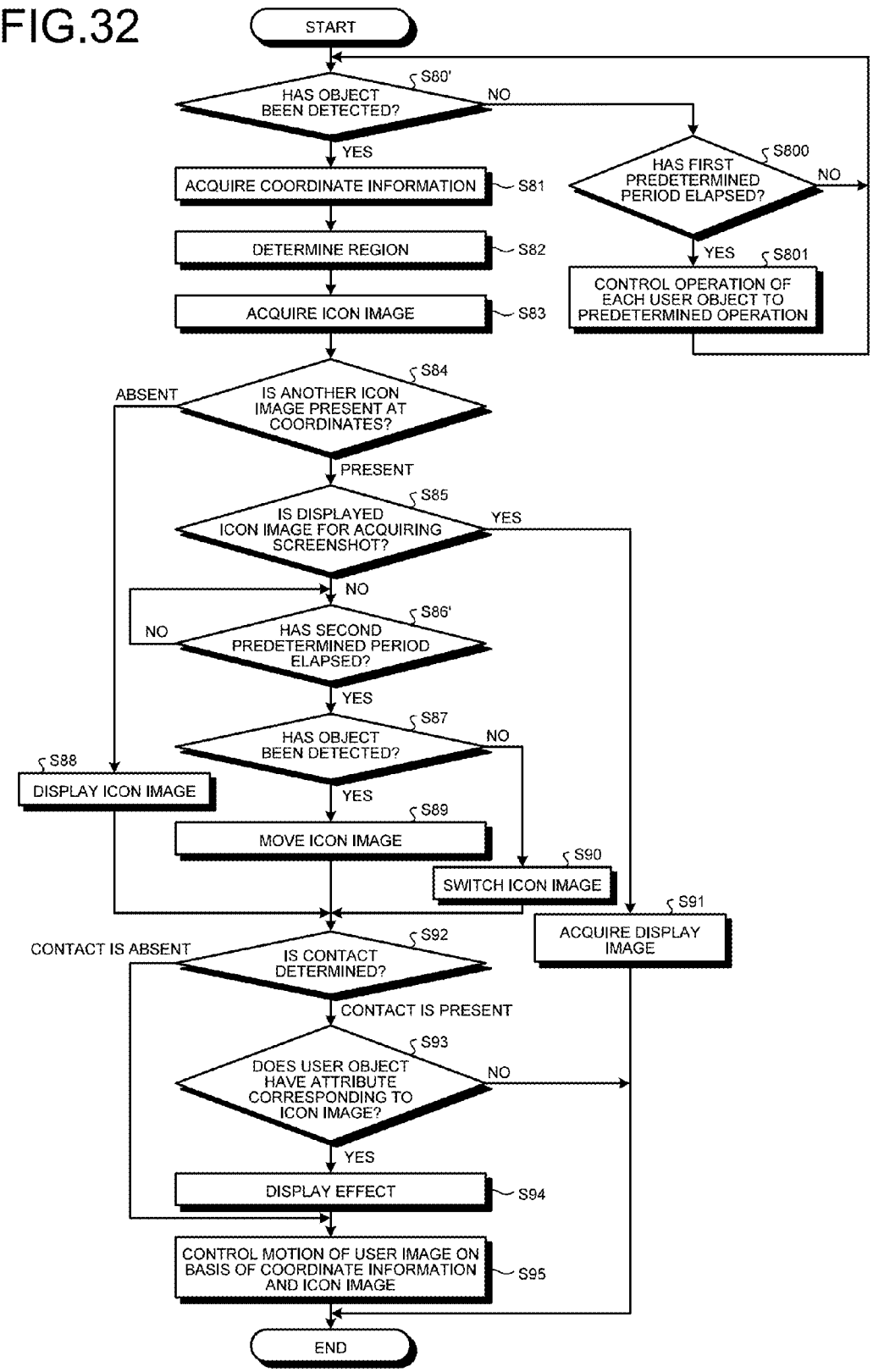
FIG. 32 is an exemplary flowchart illustrating motion determination processing according to a modification of the first embodiment.

FIG. 32 is an exemplary flowchart illustrating motion determination processing by the display control unit 210a according to the modification of the first embodiment. In FIG. 32, processing corresponding to the flowchart in FIG. 30 referred to above is denoted by the same reference symbol, and a detailed description is omitted.

In FIG. 32, at the first. Step S80', the display control unit 210a determines whether an object has been detected in a detection range of the sensor 13 on the basis of a detection result of the sensor 13. When determining that an object has been detected ("Yes" at Step S80'), the display control unit 210a advances the processing to Step S81. When determining that no object has been detected ("No" at Step S80'), on the other hand, the display control unit 210a advances the processing to Step S800.

At Step S800, for example, the display control unit 210a determines whether a first predetermined period has elapsed since the object was detected by the sensor 13. When the display control unit 210a determines that the first, predetermined period has not elapsed ("No" at Step S800), the display control unit 210a returns the processing to Step S80'.

For example, the first predetermined period is a period for which whether the lines of sight of users who visit an event venue where a service is provided by the display system 1a gather on the image 100 projected on the projection medium 14 in the event venue can be determined. Examples of the first predetermined period include several minutes or longer.

Step S86' in FIG. 32 is common in processing to Step S86 in the flowchart in FIG. 30. A period used to determine the elapse is a second predetermined period, which discriminates from the period (first predetermined period) determined at Step S800.

When the display control unit 210a determines at Step S800 that the first predetermined period has elapsed ("Yes" at Step S800), the display control unit 210a advances the processing to Step S801. At Step S801, the display control unit 210a controls the display of the image 100 such that the operation of each user object displayed in the image 100 becomes a predetermined operation.

Examples of the predetermined operation include an operation in which user objects that have moved in random directions now move in one direction. Another example of the predetermined operation is an operation in which the movement of each user object is stopped and each user object swings in a predetermined manner on the moment. Still another example of the predetermined operation is an operation in which each user object represents an image of a predetermined character string.

After the operation of each user object is controlled at Step S801, the display control unit 210a returns the processing to Step S80'. When the display control unit 210a determines at Step S80' after the processing at Step S801 that an object has been detected on the basis of a detection result of the sensor 13, for example, the display control unit 210a may return the operation of each user object to the random operation in accordance with the parameters p.

The processing after Step S81 is not different at all from the processing after Step S81 in the above-mentioned flowchart in FIG. 30, and hence the descriptions thereof are omitted.

Second Embodiment

Figure 33:
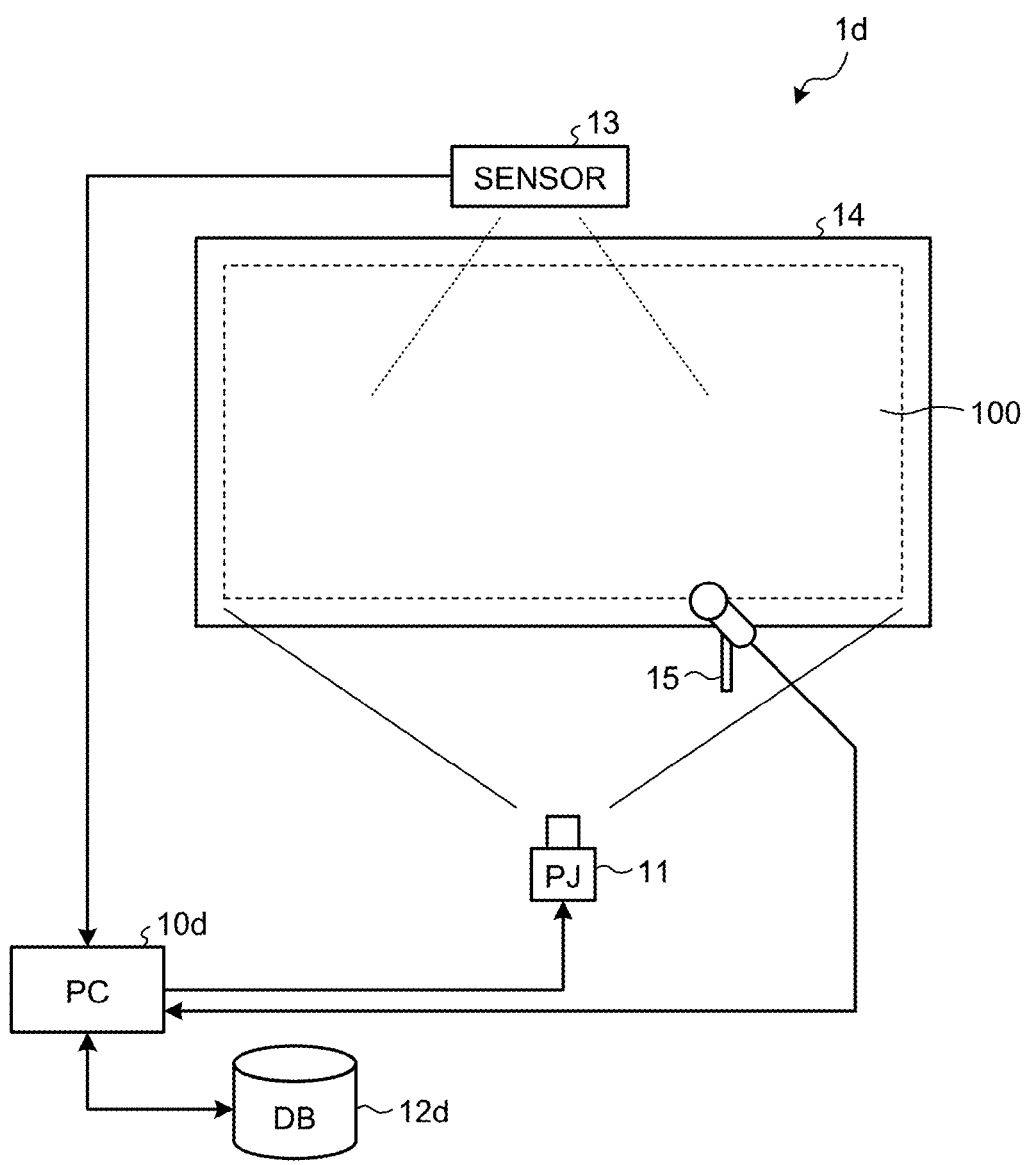
FIG. 33 is a diagram illustrating an exemplary configuration of a display system according to a second embodiment.

Next, a second embodiment is described. In the second embodiment, sound information is acquired, and a user object displayed in an image 100 is changed on the basis of the acquired sound information. FIG. 33 illustrates an exemplary configuration of a display system according to the second embodiment. In FIG. 33, portions common to FIG. 1 referred to above are denoted by the same reference symbols, and detailed descriptions are omitted.

In FIG. 33, the illustration of the image acquisition device 20 and the identification image reading device 21 illustrated in FIG. 1 is omitted. For a PC 10d illustrated in FIG. 33, the configuration described above with reference to FIG. 12 can be directly applied.

In FIG. 33, in a display system 1d, a microphone 15 for collecting sound is installed near a projection medium 14, and a sound signal output from the microphone 15 is supplied to the PC 10d. The sound signal output from the microphone 15 in an analog format is supplied to the PC 10d after being converted into a digital format sound signal by an A/D converter. For example, the digital format sound signal is input to a data I/F 1007 included in the PC 10d.

A DB 12d stores therein information related to sound in addition to the information stored in the above-mentioned DB 12a. For example, the DB 12d can store therein a sound pattern and a user image in association with each other.

With such a configuration, a user stores a user image and attribute information in the DB 12d in association with identification information in advance. The user designates a sound pattern, and stores the designated sound pattern in the DB 12d in association with the identification information in advance. In this state, the user generates sound corresponding to the registered sound pattern, for example, at a position at which the sound can be collected by the microphone 15. For example, the sound pattern is a given rhythm pattern and can be expressed by handclaps.

The sound corresponding to the sound pattern is collected by the microphone 15 and converted into a sound signal to be supplied to the PC 10d. The PC 10d analyzes the supplied sound signal to extract a sound pattern, and searches the DB 12d for a sound pattern that matches with the extracted sound pattern. When a sound pattern matching with the extracted sound pattern is retrieved from the DB 12d as a result, the PC 10d acquires identification information associated with the retrieved sound pattern.

Figure 34:
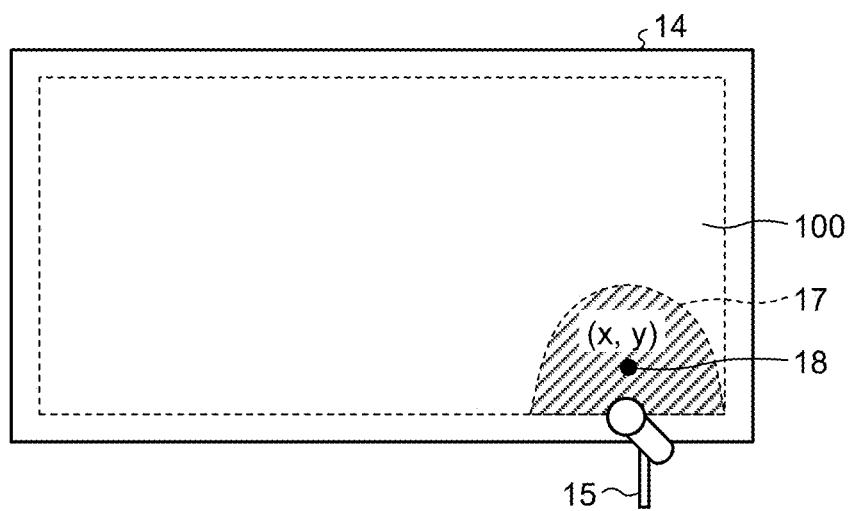
FIG. 34 is a diagram for describing how to control the movement of a user object in correspondence with the position of a microphone according to the second embodiment.

When user objects for a user image associated with the acquired identification information have already been displayed in an image 100, each user object moves toward the position at which the sound was generated, that is, the position of the microphone 15. In this case, for example, as exemplified in FIG. 34, a user object that is present in a predetermined range 17 in the image 100 with respect to the position 16 of the image 100 corresponding to the position of the microphone 15 is selectively controlled to move toward the position 18.

When any user object for a user image associated with the acquired identification information is not displayed in the image 100, the PC 10d acquires the user image associated with the identification information from the DB 12d, and displays the acquired user image in the image 100 as a user object. In this case, an appearance position of the user object can be determined in advance. For example, the appearance position may be either a right or left end portion in the image 100.

Figure 35:
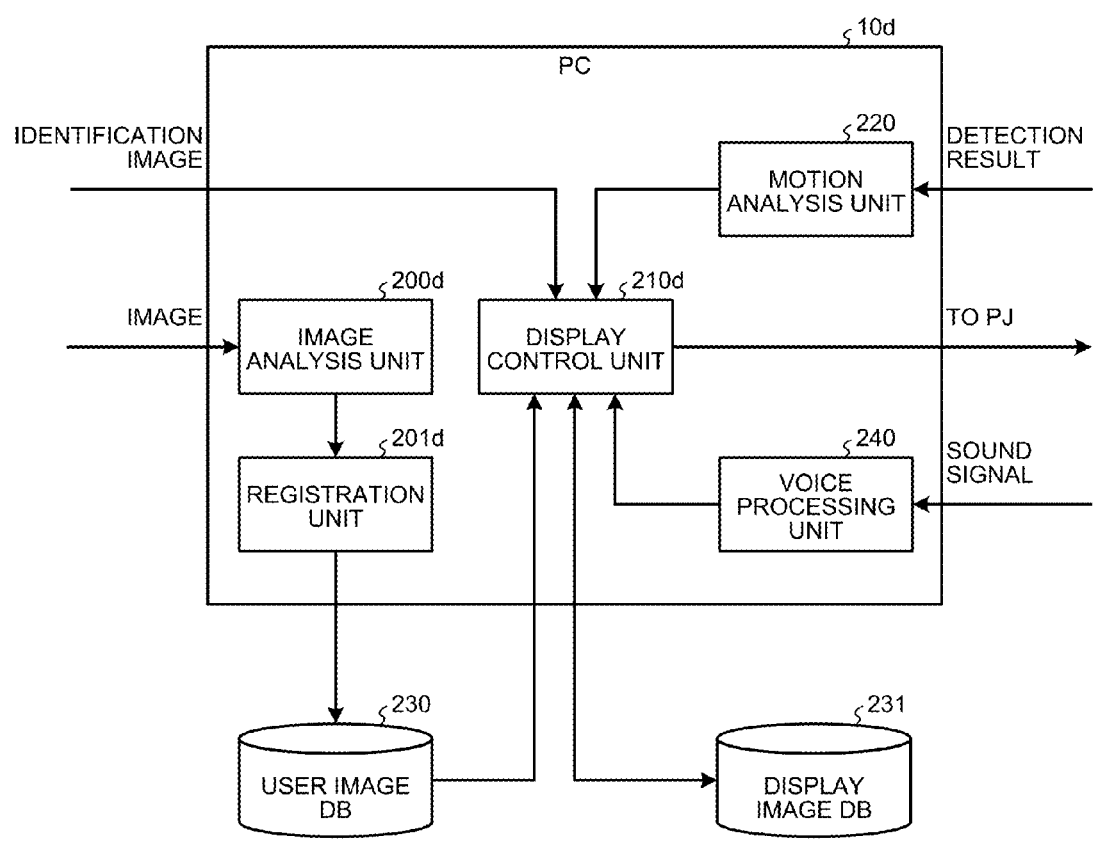
FIG. 35 is an exemplary function block diagram illustrating the function of a PC according to the second embodiment.

FIG. 35 is an exemplary function block diagram illustrating the function of the PC 10d according to the second embodiment. In FIG. 35, portions common to FIG. 13 referred to above are denoted by the same reference symbols, and detailed descriptions are omitted. In FIG. 35, the PC 10d is obtained by adding a voice processing unit 240 to the configuration of the PC 10a illustrated in FIG. 13. An image analysis unit 200d, a registration unit 201d, and a display control unit 210d are obtained by adding the function related to processing of sound information to the image analysis unit 200, the registration unit 201, and the display control unit 210a illustrated in FIG. 13. A user image DB 230 can store therein identification information or a user image in association with sound information as well.

Figure 36:
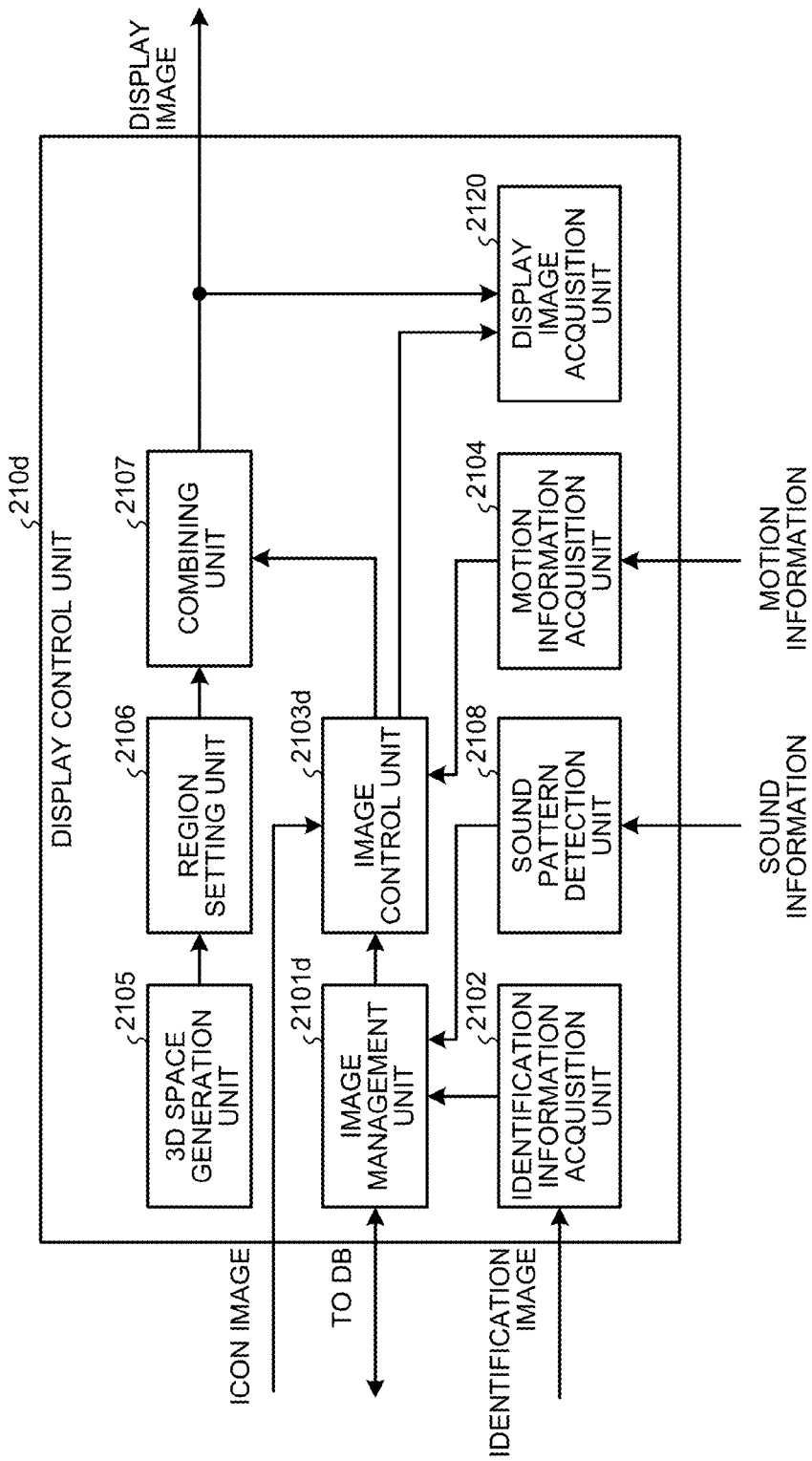
FIG. 36 is an exemplary function block diagram illustrating the function of a display control unit according to the second embodiment.

FIG. 36 is an exemplary function block diagram illustrating the function of the display control unit 210d according to the second embodiment. In FIG. 36, portions common to FIG. 15 referred to above are denoted by the same reference symbols, and detailed descriptions are omitted. In FIG. 36, the display control unit 210d is obtained by adding a sound pattern detection unit 2108 to the display control unit 210a illustrated in FIG. 15. An image management unit 2101d and an image control unit 2103d are obtained by adding the function for performing processing based on sound information to the image management unit 2101 and the image control unit 2103a described above, respectively.

A sound signal output from the microphone 15 and converted into a digital format signal is supplied to the voice processing unit 240. The voice processing unit 240 performs predetermined signal processing on the supplied sound signal, and supplies the resultant to the display control unit 210d as sound information. The sound information is supplied to the sound pattern detection unit 2108 in the display control unit 210d. The sound pattern detection unit 2108 detects a sound pattern on the basis of the supplied sound information. The detected sound pattern is supplied to the image management unit 2101d. The image management unit 2101d searches the user image DB 230 on the basis of the supplied sound pattern, and supplies the identification information or the information indicating the user image obtained as a result of the search to the image control unit 2103d.

Figure 37A:
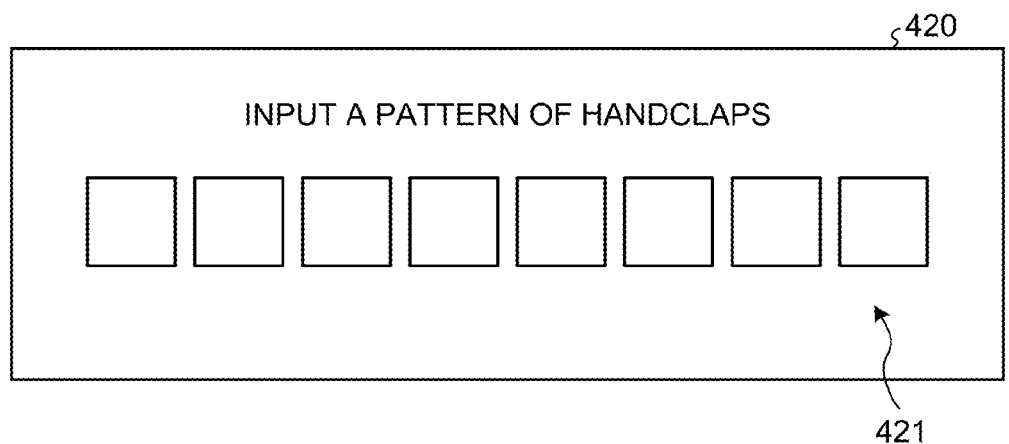
FIG. 37A is a diagram illustrating an exemplary format for a user to designate a sound pattern according to the second embodiment.
Figure 37B:
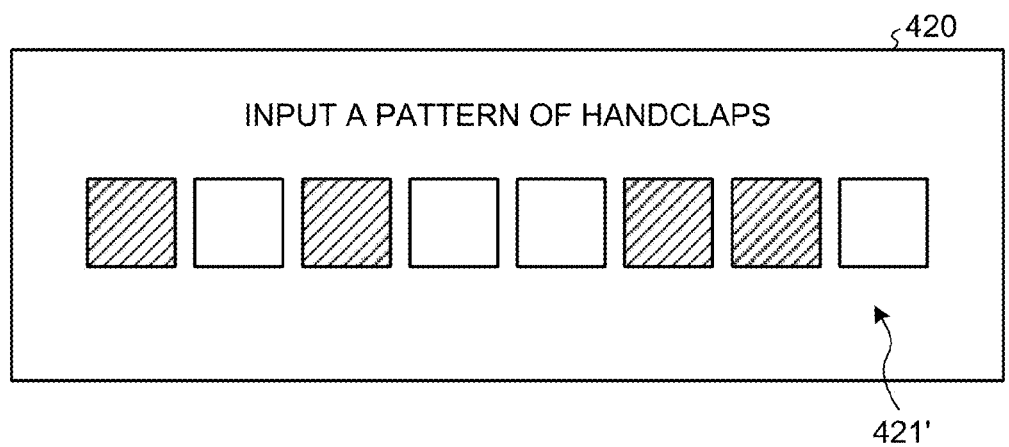
FIG. 37B is a diagram illustrating an exemplary format for a user to designate a sound pattern according to the second embodiment.

FIGS. 37A and 37B illustrate an exemplary format used for a user to designate a sound pattern according to the second embodiment. As illustrated in FIG. 37A, a pattern designation unit 421 for designating a sound pattern is provided in a sound pattern designation region 420. In this example, the pattern designation unit 421 is formed by arranging eight checkboxes. The eight checkboxes can correspond to octuple beats, such that a blank checkbox is regarded as a rest, and a filled and checked checkbox is regarded as a note. FIG. 37B illustrates an example of a pattern designation unit 421' in which some of the checkboxes are filled. For example, when sound is generated at a given speed in accordance with notes and rests indicated by the pattern designation unit 421', a sound pattern designated by the pattern designation unit 421' can be generated.

For example, the sound pattern designation region 420 exemplified in FIG. 37A is arranged on the sheet 50 in addition to the attribute setting region 42, the hand-drawing region 43, and the placement region 44. In this case, a sound pattern designated in the sound pattern designation region 420 is associated with a user image. Without being limited thereto, the sound pattern designation region 420 may be arranged on a sheet different from the sheet 50 on which the attribute setting region 42, the hand-drawing region 43, and the placement region 44 are arranged. In this case, for example, a sound pattern designated in the sound pattern designation region 420 can be associated with identification information.

In the following, for the sake of description, the sound pattern designation region 420 is arranged on the sheet 50 together with the attribute setting region 42, the hand-drawing region 43, and the placement region 44. In other words, a sound pattern is associated with a user image.

Also in this case, for example, a sheet including the sound pattern designation region 420 is prepared in addition to the sheet 50, and is placed on the sheet 50 similarly to the medium 40. In this manner, the sound pattern can be associated with user images.

In the above description, the sound pattern is directly designated in the sound pattern designation region 420, but the designation method is not limited to this example. For example, a desired sound pattern may be selected from sound patterns prepared in advance.

In the above description, a checkbox in the sound pattern designation region 420 is checked to register a sound pattern, but the registration method is not limited to this example. For example, a sound pattern may be registered on the basis of a sound pattern that has actually been generated by a user. For example, a sound pattern generated by a user through actions such as handclaps is collected by the microphone 15, and supplied to the PC 10d as a sound signal. The PC 10d analyzes the supplied sound signal to detect a sound pattern, associates the detected sound pattern with identification information acquired from the identification image 41 displayed on the medium 40, and registers the sound pattern in the user image DB 230.

In this case, it is preferred that the PC 10d or the like be used to display a message to prompt the registration of a sound pattern and a user interface for instructing the start of registration (start of recording). Generating clicking sound at given intervals makes it easier to register a sound pattern.

Figure 38:
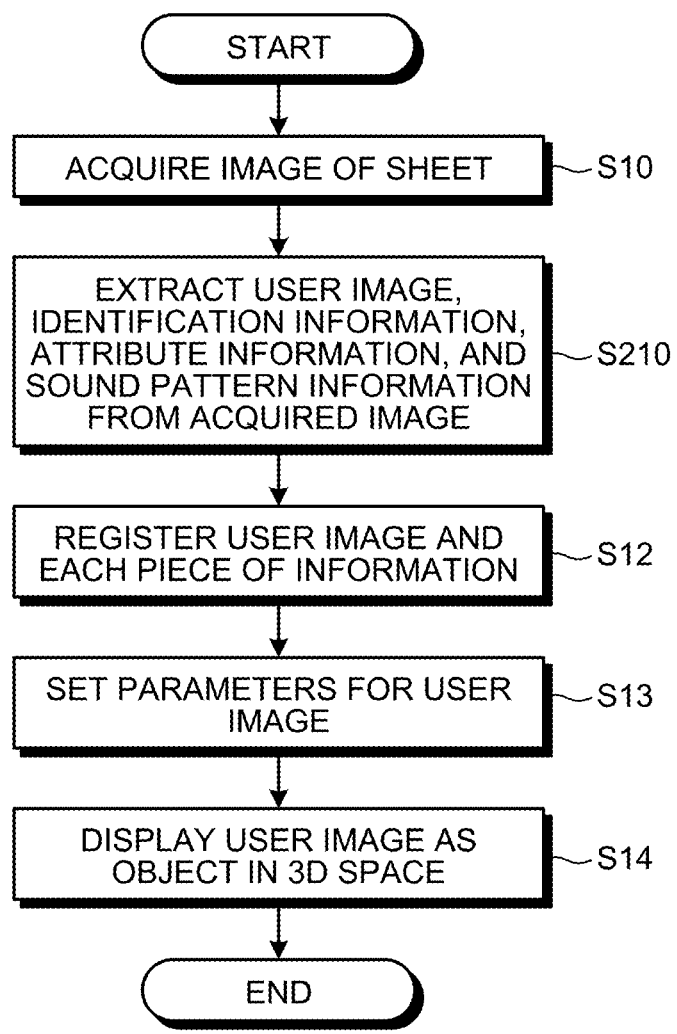
FIG. 38 is an exemplary flowchart schematically illustrating processing for displaying an image acquired by an image acquisition device according to the second embodiment.

FIG. 38 is an exemplary flowchart schematically illustrating processing for displaying an image acquired by the image acquisition device 20 according to the second embodiment. In FIG. 38, processing common to FIG. 16 referred to above is denoted by the same reference symbol, and a detailed description is omitted.

Prior to the processing in FIG. 38, a user prepares a medium 40 on which an identification image 41 based on processing identification information and a sheet 50, draws a predetermined picture on the sheet 50, and designates a sound pattern in the sound pattern designation region 420 arranged in the sheet 50. After that, the user sets the sheet 50 on the image acquisition device 20, places the medium 40 in the placement region 44 on the sheet 50, and causes the image acquisition device 20 to start image acquisition processing. The image acquisition device 20 transmits the acquired image to the PC 10 d.

The PC 10d receives the image transmitted from the image acquisition device 20, and supplies the received image to the image analysis unit 200d. The image analysis unit 200d acquires the supplied image (Step S10). At the next Step S210, the image analysis unit 200b detects a hand-drawing region 43, an attribute setting region 42, and a sound pattern designation region 420 from the supplied image, and extracts a user image, attribute information, and sound pattern information from the respective detected regions. The image analysis unit 200d extracts an identification image from the supplied image, and decodes the extracted identification image to acquire identification information.

At the next Step S12, the registration unit 201d stores the user image, the attribute information, and the sound pattern information extracted at Step S210 in the user image DB 230 in association with the identification information, thereby registering the user image. For example, the registration unit 201d stores the sound pattern information together with the user image and the attribute information in the third level folder described above with reference to FIG. 23. By storing the sound pattern information directly in the second level folder, common sound pattern information can be associated with each user image stored in each third level folder.

At the next Step S13, the display control unit 210d sets parameters $p_0$ to $p_7$ for controlling display of the user image as described above. At Step S14, the display control unit 210d sets coordinates in a defined region for the user image to which the parameters p have been set, and combines the user image with the background image 110 to generate an image 100. In this manner, the user image is displayed as a user object in a 3D space defined as a defined region.

Figure 39:
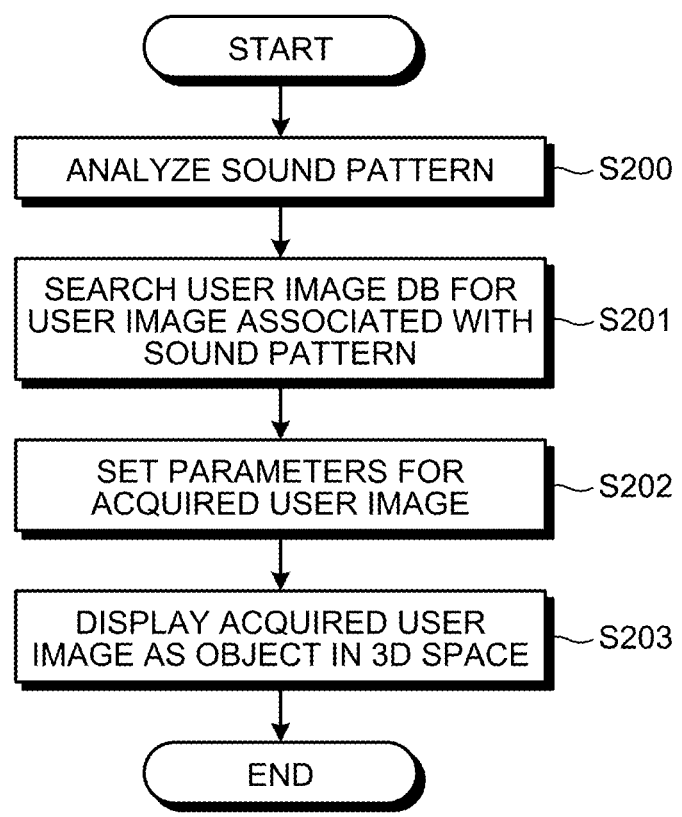
FIG. 39 is an exemplary flowchart schematically illustrating user image display processing based on sound patterns according to the second embodiment.

FIG. 39 is an exemplary flowchart schematically illustrating user image display processing based on a sound pattern according to the second embodiment. Prior to the processing in the flowchart in FIG. 39, a user registers a user image, attribute information, and sound pattern information in the user image DB 230 in advance in association with identification information in accordance with the above-mentioned flowchart in FIG. 38, for example.

For example, the user generates a sound pattern designated in the sound pattern designation region 420 on the sheet 50 toward the microphone 15 by handclaps. A sound signal output from the microphone 15 is input to the PC 10d, and supplied to the display control unit 210d via the voice processing unit 240 as sound information. The display control unit 210d uses the sound pattern detection unit 2108 to analyze the sound pattern on the basis of the supplied sound information (Step S200). For example, the sound pattern detection unit 2108 may normalize the level of the sound signal on the basis of the sound information, and perform threshold determination on the normalized level to detect a sound pattern.

At the next Step S201, the display control unit 210d searches the user image DB 230 on the basis of the detected sound pattern, and acquires a user image associated with the sound pattern from the user image DB 230. At the next Step S202, the display control unit 210d determines parameters $p_0$ to $p_7$ for the user image acquired at Step S201 similarly to the processing at Step S13 in FIG. 16, and sets the parameters $p_0$ to $p_7$ for the respective user images.

At the next Step S203, the display control unit 210d sets coordinates in a defined region for the user image to which the parameters p have been set, and combines the user image with a background image 110 to generate an image 100. In this manner, each user image associated with a sound pattern is displayed as a user object in a 3D space defined as a defined region.

At Step S203, each user object newly appears and is displayed in the image 100. In this case, the appearance position of the user object can be determined in advance. For example, the appearance position may be either the right or left end portion in the image 100.

Figure 40:
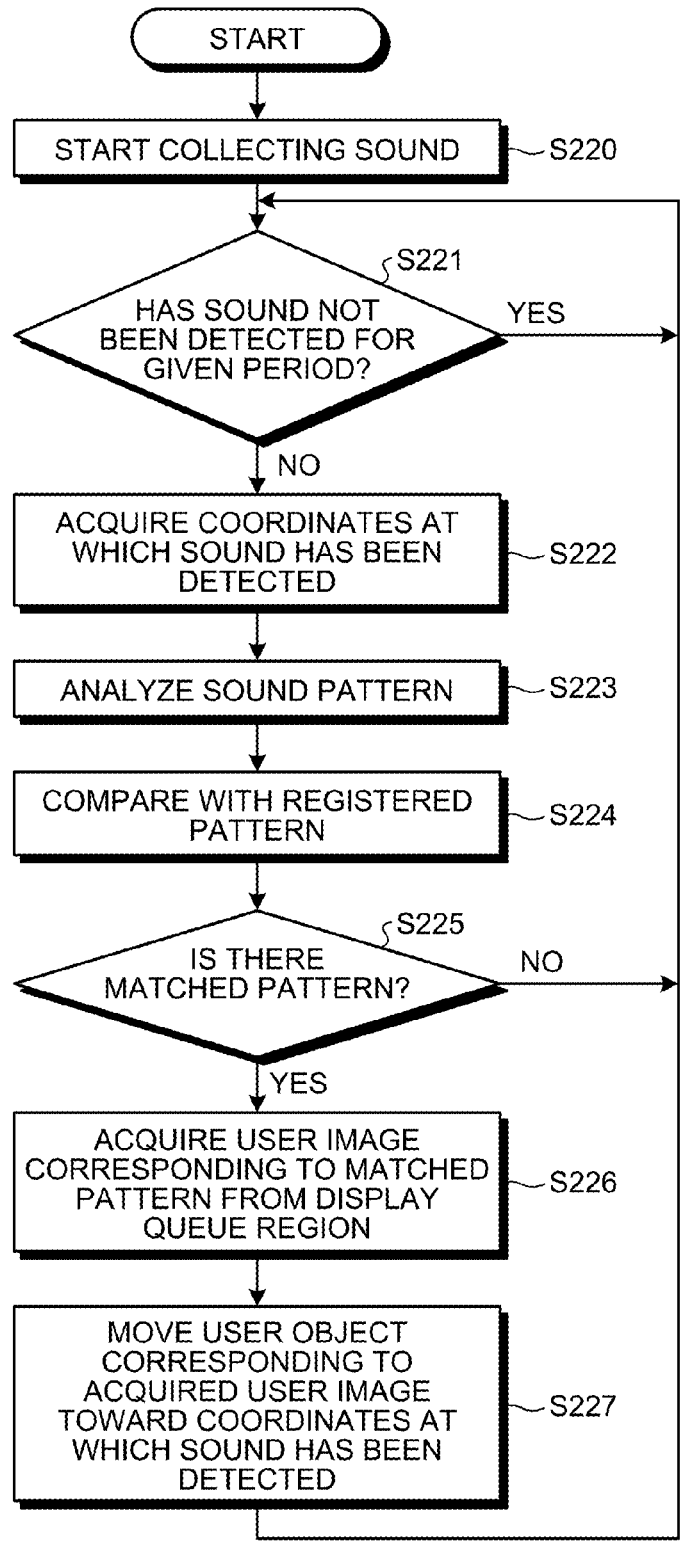
FIG. 40 is an exemplary flowchart illustrating display processing performed when a user object for a user image associated with a sound pattern has already been displayed in an image according to the second embodiment.

FIG. 40 is an exemplary flowchart illustrating display processing performed when a user object for a user image associated with a sound pattern has already been displayed in the image 100 according to the second embodiment. In the PC 10d, the display control unit 210d starts to collect sound with the microphone 15 (Step S220).

At the next Step S221, the display control unit 210d determines whether sound has not been detected for a given period. For example, the display control unit 210d uses the RAM 1003 as a buffer memory to store therein a sound signal having a length corresponding to an assumed sound pattern, and determines whether sound is present on the basis of the stored sound signal. When the display control unit 210d determines that sound has not been detected for a given period ("Yes" at Step S221), the display control unit 210d returns the processing to Step S221.

The processing at Step S221 is repeatedly executed while the period is shifted little by little. In the buffer memory, a sound signal for a given period is always stored while the period is shifted little by little until the sound collection is finished.

When the display control unit 210d determines that sound has been detected within a given period ("No" at Step S221), the display control unit 210d advances the processing to Step S222. At Step S222, the display control unit 210d acquires coordinates in the image 100 corresponding to the position at which the sound has been detected.

In the above-mentioned example in FIG. 33, only one microphone 15 is arranged, and hence the position at which sound is detected corresponds to the position of the microphone 15. Without being limited thereto, one microphone may be installed at each end of the projection medium 14 to collect sound in stereo. When sound is collected in stereo, any position in the horizontal direction of the projection medium 14 can be a sound detection position.

At the next Step S223, the display control unit 210d analyzes a sound pattern on the basis of the sound signal stored in the buffer memory. At the next Step S224, the display control unit 210d compares the sound pattern analyzed and acquired at Step S223 with sound patterns registered in the user image DB 230. At the next Step S225, the display control unit 210d determines whether the user image DB 230 has a sound pattern that matches with the sound pattern acquired at Step S223. When the display control unit 210d determines that the user image DB 230 does not have any sound pattern that matches with the sound pattern acquired at. Step S223 ("No" at Step S225), the display control unit 210d returns the processing to Step S221.

On the other hand, when the display control unit 210d determines that the user image DB 230 has a sound pattern that matches with the sound pattern acquired at Step S223 ("Yes" at Step S225), the display control unit 210d advances the processing to Step S226. At Step S226, the display control unit 210d acquires a user image associated with the matched sound pattern from the display queue region. At the next Step S227, the display control unit 210d moves a user object corresponding to the user image acquired from the display queue region toward the coordinates acquired at Step S222 at which the sound has been detected. The display control unit 210d returns the processing to Step S221.

Controlling the motion of a user object in accordance with the detection of sound in this manner enables the motion of the user object to have interactiveness.

While the sound pattern is detected on the basis of sound collected by the microphone 15 in the above, the detection method is not limited to this example. For example, the sound pattern may be detected with use of an instrument such as a musical instrument. Examples of the instruments include an instrument formed by providing a switch to a percussion instrument such as castanets so that a signal is output when the instrument is tapped. The signal output from the instrument is supplied to the PC 10d. The PC 10d analyzes the signal supplied from the instrument to detect a sound pattern. In this case, by including positional information on the instrument in the output signal of the instrument, the control based on coordinates at Step S227 can be performed. The positional information on the instrument may be set to the instrument in advance. The positional information on the instrument may be detected by the sensor 13.

First Modification of Second Embodiment

Next, a first modification of the second embodiment is described. In the first modification of the second embodiment, the control of a user object by sound in the second embodiment is combined with the acquisition of a user image from the identification image 41 in the above-mentioned first embodiment.

Figure 41:
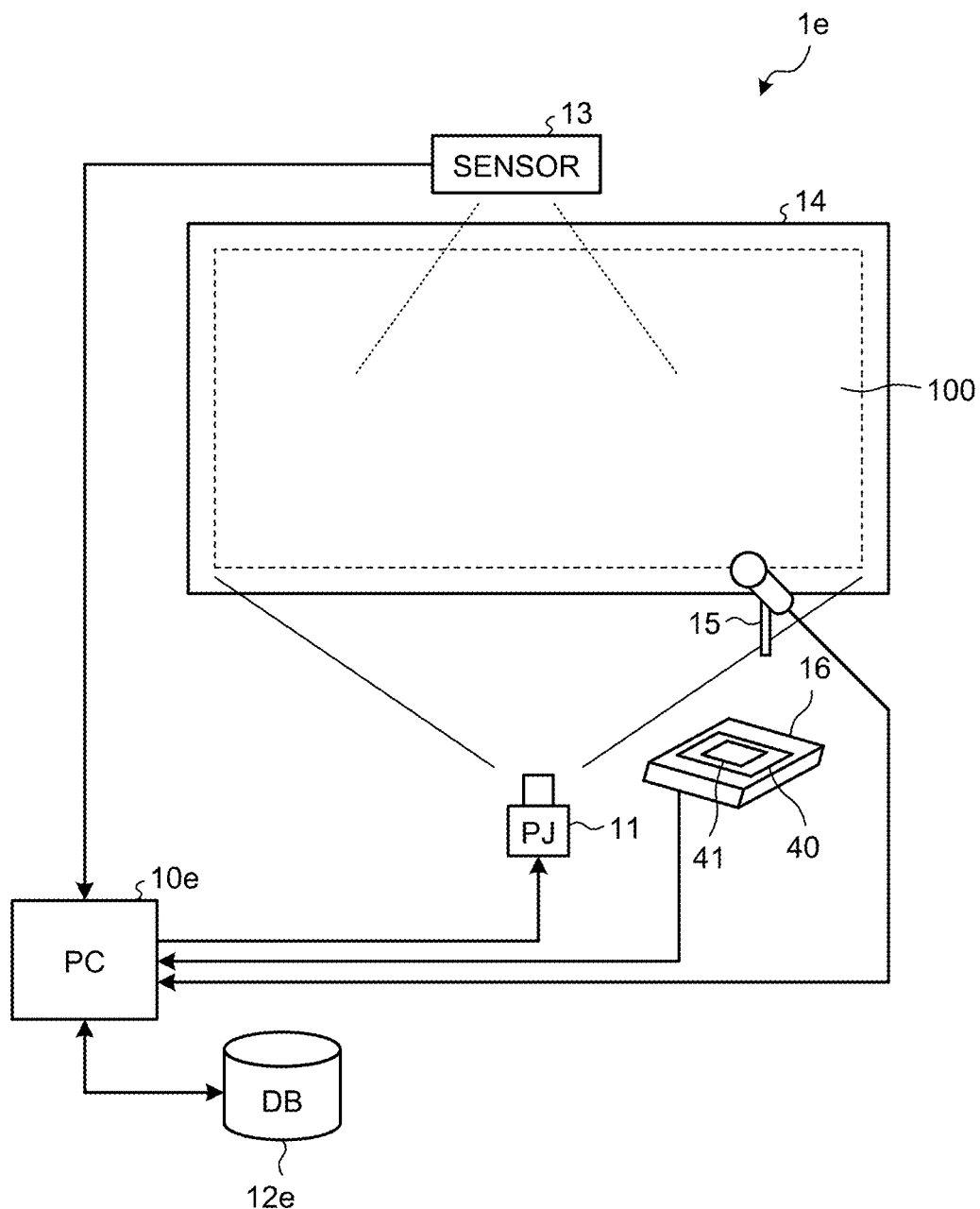
FIG. 41 is a diagram illustrating an exemplary configuration of a display system according to a first modification of the second embodiment.

FIG. 41 illustrates an exemplary configuration of a display system according to the first modification of the second embodiment. In FIG. 41, the portions common to FIG. 1 and FIG. 33 referred to above are denoted by the same reference symbols, and detailed descriptions are omitted. In FIG. 41, the illustration of the image acquisition device 20 and the identification image reading device 21 illustrated in FIG. 1 is omitted.

In FIG. 41, in a display system 1e, an identification image reading device 16 is provided near a projection medium 14, desirably near a microphone 15. The identification image reading device 16 has the same function as that of the above-mentioned identification image reading device 21. The identification image reading device 16 acquires an image of the medium 40, reads an identification image 41 displayed on the medium 40 from the acquired image, and supplies the identification image 41 to a PC 10e.

The identification image reading device 16 may be provided as a device independently from the identification image reading device 21, or may be shared with the identification image reading device 21. For the PC 10e, the configuration of the PC 10a described above with reference to FIG. 12 can be directly applied, and the function described above with reference to FIG. 35 can be directly applied. Thus, the descriptions of the configuration and the function of the PC 10e are omitted. For example, the output from the identification image reading device 16 is supplied to a display control unit (corresponding to the display control unit 210d in FIG. 35) in the PC 10e.

Similarly to the DB 12d in the above-mentioned second embodiment, a DB 12e can store therein a sound pattern and a user image in association with each other. More specifically, the DB 12e includes a user image DB 230 and a display image DB 231, and the user image DB 230 stores therein a user image, attribute information, and sound pattern information in association with identification information.

Figure 42:
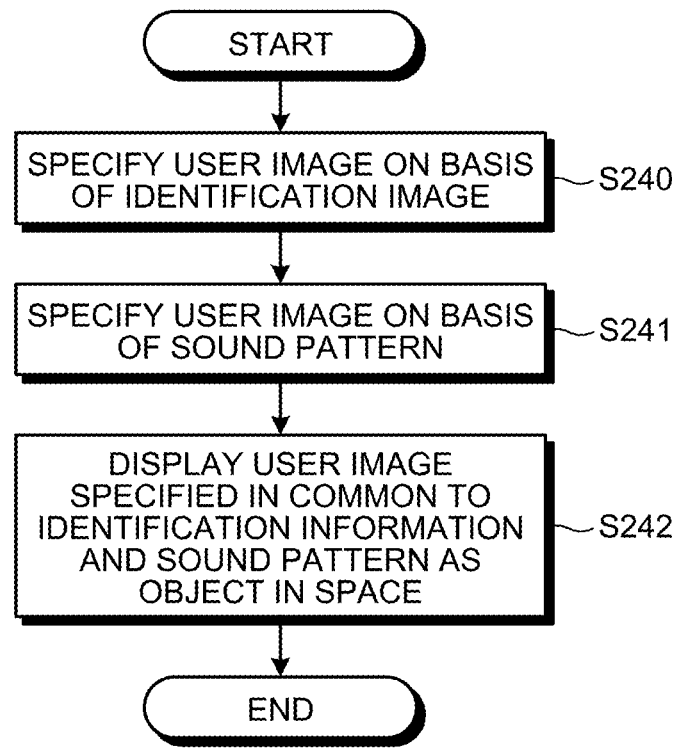
FIG. 42 is an exemplary flowchart schematically illustrating processing according to the first modification of the second embodiment.

FIG. 42 s an exemplary flowchart schematically illustrating processing according to the first modification of the second embodiment. Prior to the processing in the flowchart in FIG. 42, a user registers in advance a user image, attribute information, and sound pattern information in the user image DB 230 in association with identification information in accordance with, for example, the above-mentioned flowchart in FIG. 38.

At Step S240, the PC 10e searches DB 12e on the basis of identification information acquired from an image of the medium 40 read by the identification image reading device 16, and specifies a user image associated with the identification information.

For example, the user sets the medium 40 on which the identification image 41 is displayed on the identification image reading device 16. In response to an instruction from the user's operation, the identification image reading device 16 reads the image of the medium 40, and transmits the read image to the PC 10e. The PC 10e decodes the identification image 41 included in the image transmitted from the identification image reading device 16, and acquires identification information. The PC 10e searches the user image DB 230 included in the DB 12e on the basis of the acquired identification information, and specifies the user image associated with the identification information.

Next, at Step S241 the PC 10e acquires a sound pattern on the basis of a sound signal supplied from the microphones 15, and searches the DB 12e on the basis of the acquired sound pattern to specify the user image associated with the sound pattern.

For example, the user generates the sound pattern registered in advance in association with the user image toward the microphone 15 by handclaps. The sound signal output from the microphones 15 is input to the PC 10e. As described above for Step S201 in FIG. 39, the PC 10e detects a sound pattern from the input sound signal. On the basis of the detected sound pattern, the PC 10e searches the user image DB 230 included in the DB 12e to specify a user image associated with the sound pattern.

At the next Step S242, the PC 10e displays, on the basis of the processing results at Step S240 and Step S241, the user image specified in common to the identification information and the sound pattern on the image 100 as an object in a 3D space.

For example, the PC 10e acquires the user image specified in common to the identification information and the sound pattern from the user image DB 230 included in the DB 12e together with corresponding attribute information. On the basis of the attribute information, the PC 10e determines parameters $p_0$ to $p_7$ for the acquired user image similarly to the processing at Step S13 in FIG. 16. The PC 10e sets coordinates in a defined region for the user image to which each of the parameters p has been set, and combines the user image with the background image 110 to generate an image 100. In this manner, each user image specified in common to the identification information and the sound pattern is displayed as a user object in a 3D space defined as the defined region.

An application example of the first modification of the second embodiment is schematically described. For example, parent and child users (parent is user A, child is user B) are assumed as users who use the display system 1e according to the first modification of the second embodiment. The user A sets a medium 40 on which an identification image 41 is displayed on the identification image reading device 16, and causes the identification image reading device 16 to read an image of the medium 40. It is preferred that the identification image reading device 16 be configured to detect that the medium 40 has been set, and automatically start reading the image.

The user B generates a sound pattern registered in advance near the microphone 15 by handclaps, for example. In this manner, a user object related to the user image specified in common to identification information based on the identification image 41 and the sound pattern appears on the image 100.

This configuration enables a user A who is a parent to watch a user B who is a child, and enables the display system 1e to specify a user image associated with identification information based on an identification image 41 on a medium 40. Thus, for example, the user keeps rhythm with handclaps in front of the microphone 15, the display system 1e can specify a user image associated with the rhythm and associated with identification information, and display the specified user image in the image 100 as a user object.

For example, a part of the image 100 (either the right or left end is preferred) is set as a re-entry region for a user object in advance. In order to cause a user object that has exited from the image 100, for example, a user object that has moved out of the image 100 to appear in the image 100 again, a user A sets a medium 40 on which an identification image 41 is displayed on the identification image reading device 16, and a user B is requested to perform an operation of clapping with the rhythm registered in advance. In this manner, a sense of rhythm of the user B can be improved while the game enjoyment is given.

Second Modification of Second Embodiment

Figure 43:
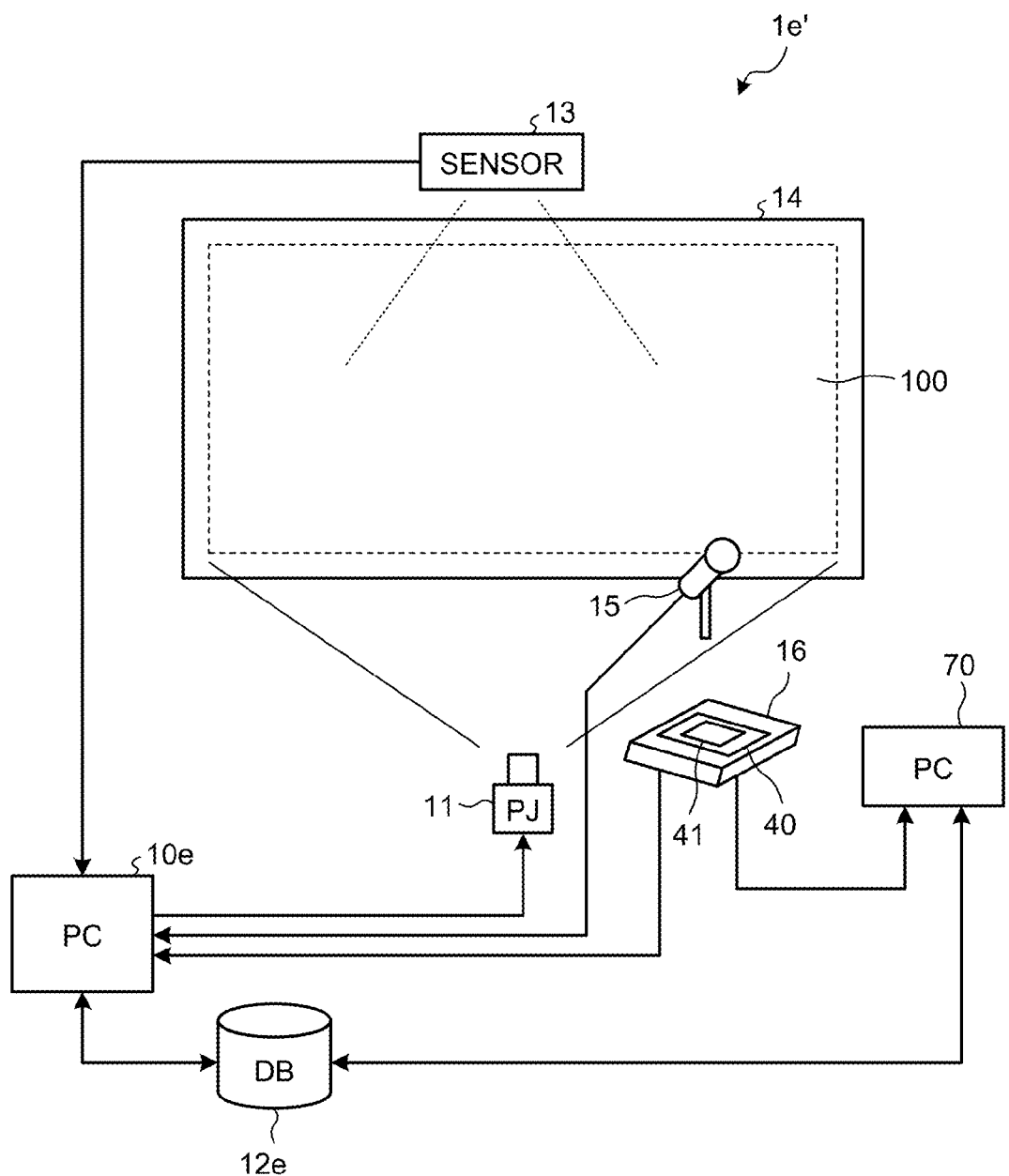
FIG. 43 is a diagram illustrating an exemplary configuration of a display system in which a PC for operation guidance is provided according to a second modification of the second embodiment.

It is more preferred, that the display system 1e according to the first modification of the second embodiment illustrated in FIG. 41 be provided with a PC configured to present an operation guidance near the identification image reading device 16. FIG. 43 illustrates an exemplary configuration of a display system provided with an operation guidance PC according to a second modification of the second embodiment. In FIG. 43, the portions common to FIG. 1 and FIG. 41 referred to above are denoted by the same reference symbols, and detailed descriptions are omitted. In FIG. 43, the illustration of the image acquisition device 20 and the identification image reading device 21 illustrated in FIG. 1 is omitted.

In FIG. 43, a display system 1e' is obtained by adding a PC 70 to the display system 1e in FIG. 41. Similarly to the PC 10e, the PC 70 can acquire identification information on the basis of an image output from the identification image reading device 16. In addition thereto, the PC 70 can acquire a set of a user image, attribute information, and sound pattern information associated with the identification information from a user image DB 230 included in a DB 12e.

For the PC 70, the configuration of the PC 10a described above with reference to FIG. 12 can be directly applied, and hence the description of the configuration of the PC 70 is omitted.

The PC 70 can acquire, from the DB 12e, a user image associated with identification information based on an image output from the identification image reading device 16, and display the acquired user image on a monitor included in the PC 70. In this case, the PC 70 may generate thumbnail images by reducing the size of the acquired user image, and display a list of the thumbnail images on the monitor.

For example, in the case where a name writing region for writing a name of an image in the hand-drawing region 43 is provided on the sheet 50, name information written in the name writing region may be displayed on a monitor. For example, the PC 10e further extracts an image in the name writing region from the image of the sheet 50 acquired from the image acquisition device 20, and stores the extracted image in the user image DB 230 included in the DB 12e as name information in association with identification information together with the user image, the attribute information, and the sound pattern information. The PC 10e may use a character string obtained by performing character recognition on the image in the name writing region as name information. The PC 70 acquires, from the DB 12e, name information associated with identification information based on the image output from the identification image reading device 16, and displays a list of name information on the monitor.

The PC 70 can acquire, from the DB 12e, sound pattern information corresponding to a thumbnail image or name information designated from the above-mentioned list of thumbnail images or name information by user's operation, and present the acquired sound pattern information to a user as a guidance for a sound pattern to be generated. The guidance for the sound pattern may be presented to the user by being displayed on a monitor as visual information such as a musical score, or may be presented to the user as acoustic information by generating sound in accordance with the sound pattern.

For another example, the position of the user B may be detected by the sensor 13, and a user object for a user image associated with identification information in an image 100 may be moved in accordance with the detected position. In one example, when the user B moves from side to side in front of the image 100 (projection medium 14), user objects for a user image associated with identification information move in a row in accordance with the movement of the user B. An instrument such as castanets provided with a switch as described above may be used. In this case, the position of the instrument may be detected by providing a position detection mechanism using a gyro sensor inside the instrument, or a sensor configured to detect the position of the instrument may be additionally provided.

While each of the above-mentioned embodiments is a preferred embodiment of the present invention, the present invention is not limited thereto and can be variously modified in the range not departing from the gist of the present invention.

The embodiments exhibit an advantageous effect that the motion of an object in a three-dimensional space can be reflected to operation of a user image displayed in a screen.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A display apparatus, comprising:
an image acquisition unit configured to acquire an image including a drawing region drawn by a user;
an image extraction unit configured to extract, from the acquired image, a first image being an image in the drawing region;
a registration unit configured to register attribute information indicating attributes that is set with respect to the extracted first image and is used for controlling of moving the first image on a screen;
a display control unit configured to control display on the screen;
a coordinate generation unit configured to generate, based on a detection result of a detection unit configured to detect a position of an object in a three-dimensional space, coordinates of the object in the screen; and
a motion detection unit configured to detect a motion of the object based on the coordinates, wherein
the display control unit is configured to further display, when the motion is detected by the motion detection unit, a second image on the screen based on the coordinates corresponding to the detected motion, and change the display of the first image to which attribute information of a certain attribute among the attributes of the first image displayed on the screen is set.

2. The display apparatus according to claim 1, wherein
the display control unit is configured to move, when the motion is detected by the motion detection unit, a position of the first image toward a position of the second image.

3. The display apparatus according to claim 1, wherein
the display control unit is configured to execute, when the second image is displayed on the screen, an emphasis processing for emphasizing that the second image is displayed.

4. The display apparatus according to claim 3, wherein
the display control unit is configured to further display a third image in vicinity of the second image as the emphasis processing.

5. The display apparatus according to claim 3, wherein
the display control unit is configured to determine whether at least a part of the second image overlaps with the first image based on the coordinates, and when determining that at least a part of the second image overlaps with the first image, change the display of the first image as the emphasis processing.

6. The display apparatus according to claim 1, wherein
the display control unit is configured to arrange the first image in a region having an attribute corresponding to an attribute of the first image within the screen.

7. The display apparatus according to claim 1, further comprising a display image acquisition unit configured to acquire display contents on the screen as a capture image, wherein
the display control unit is configured to instruct the display image acquisition unit to acquire the capture image when the coordinates are included in a predetermined region in the screen.

8. The display apparatus according to claim 1, wherein
the display control unit is configured to change the display of the first image when the detection result is not obtained for a given period.

9. The display apparatus according to claim 1, wherein
the first image is a display image presented by a user, and the second image is an image stored in a storage unit in advance.

10. A display control method, comprising:
acquiring an image including a drawing region drawn by a user;
extracting, from the acquired image, a first image being an image in the drawing region;
registering attribute information indicating attributes that is set with respect to the extracted first image and is used for controlling of moving the first image on a screen;
controlling display on the screen;
generating, based on a detection result of a detection unit configured to detect a position of an object in a three-dimensional space, coordinates of the object in the screen; and
detecting a motion of the object based on the coordinates, wherein
the displaying comprises displaying, when the motion is detected at the motion detection step, further displaying a second image on the screen based on the coordinates corresponding to the detected motion, and changing the display of the first image to which attribute information of a certain attribute among the attributes of the first image displayed on the screen is set.

11. A display system, comprising:
an image acquisition unit configured to acquire an image including a drawing region drawn by a user;
an image extraction unit configured to extract the first image from the image acquired by the image acquisition unit, the first image being an image in the drawing region;

a registration unit configured to register attribute information indicating attributes that is set with respect to the extracted first image and is used for controlling of moving the first image on a screen;
a storage unit configured to store therein a second image;
a display control unit configured to control display on the screen;
a coordinate generation unit configured to generate, based on a detection result of a detection unit configured to detect a position of an object in a three-dimensional space, coordinates of the object in the screen; and
a motion detection unit configured to detect a motion of the object based on the coordinates, wherein
the display control unit is configured to display the first image on the screen, and when the motion is detected by the motion detection unit, further display the second image on the screen based on the coordinates corresponding to the detected motion, and changes the display of the first image to which attribute information of a certain attribute among the attributes of the first image displayed on the screen is set.

* * * * *